US012396055B2

(12) United States Patent
Wang et al.

(10) Patent No.: US 12,396,055 B2
(45) Date of Patent: Aug. 19, 2025

(54) DISCONTINUOUS RECEPTION ALIGNMENT FOR WIRELESS COMMUNICATIONS

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Qing Li, Princeton Junction, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 17/565,245

(22) Filed: Dec. 29, 2021

(65) Prior Publication Data

US 2023/0209643 A1  Jun. 29, 2023

(51) Int. Cl.
*H04W 76/28* (2018.01)
*H04W 52/02* (2009.01)
*H04W 72/20* (2023.01)

(52) U.S. Cl.
CPC ....... *H04W 76/28* (2018.02); *H04W 52/0216* (2013.01); *H04W 72/20* (2023.01)

(58) Field of Classification Search
CPC . H04W 76/28; H04W 52/0216; H04W 72/20; H04W 76/27; H04W 88/04; H04W 92/18
See application file for complete search history.

(56) References Cited

U.S. PATENT DOCUMENTS

2023/0389045 A1\* 11/2023 Ko .................. H04W 72/25
2024/0015838 A1\* 1/2024 Ashraf ............. H04W 76/23

FOREIGN PATENT DOCUMENTS

WO   WO-2022081730 A1 \*   4/2022   .......... H04W 68/005

OTHER PUBLICATIONS

Interdigital: "Stage 2 Running CR of TS 38.300 for eSL", 3GPP TSG-RAN WG2 Meeting #116bis Electronic, R2-2201808, 3rd Generation Partnership Project (3GPP), Mobile Competence Centre, 650, Route Des Lucioles, F-06921 Sophia-Antipolis Cedex, France, vol. RAN WG2, No. Electronic, Online Meeting, Jan. 1, 2022, 21 Pages, Jan. 31, 2022 (Jan. 31, 2022), XP052104348, Section 16.9.5.1, 16.9.5.2, 16.9.5.4.

(Continued)

*Primary Examiner* — Ayanah S George
(74) *Attorney, Agent, or Firm* — Holland & Hart LLP/Qualcomm Incorporated

(57) ABSTRACT

Methods, systems, and devices for wireless communications are described. Wireless devices may be configured to support techniques for bi-directional discontinuous reception (DRX) alignment and centralized DRX alignment. In the context of bi-directional DRX alignment, DRX configurations at two respective user equipments (UEs) are first established in a first direction, and then DRX configurations are then established in the reverse direction based on the previously-established DRX configurations. In particular, DRX configurations in the reverse direction may be selected such that the Uu and sidelink DRX configurations are aligned at the respective UEs and across the UEs. Comparatively, in the context of centralized DRX alignment, a master base station receives "candidate" Uu and sidelink DRX configurations for multiple UEs, and selects Uu and sidelink DRX configurations for each UE from the sets of candidate DRX configurations in order to ensure DRX alignment across the respective UEs.

30 Claims, 20 Drawing Sheets

(56) References Cited

OTHER PUBLICATIONS

International Search Report and Written Opinion—PCT/US2022/080126—ISA/EPO—Mar. 3, 2023.

* cited by examiner

DISCONTINUOUS RECEPTION ALIGNMENT FOR WIRELESS COMMUNICATIONS

FIELD OF TECHNOLOGY

The following relates to wireless communications, including discontinuous reception (DRX) alignment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless devices (e.g., UEs) may be configured with discontinuous reception (DRX) configurations including active and inactive durations. DRX configurations may enable UEs to communicate during active durations, and go to "sleep" or otherwise enter low-power states during inactive durations.

SUMMARY

The described techniques relate to improved methods, systems, devices, and apparatuses that support techniques for discontinuous reception (DRX) alignment, which may refer to the alignment of DRX configurations for multiple user equipments (UEs). Generally, the present disclosure supports techniques for bi-directional DRX alignment and centralized DRX alignment. In the context of bi-directional DRX alignment, DRX configurations at two respective UEs are first established in a first direction, and then DRX configurations are then established in the reverse direction based on the previously-established DRX configurations. In particular, DRX configurations in the reverse direction may be selected such that the Uu and sidelink DRX configurations are aligned at the respective UEs and across the UEs. Comparatively, in the context of centralized DRX alignment, a master base station receives "candidate" downlink and sidelink DRX configurations for multiple UEs, and selects downlink and sidelink DRX configurations for each UE from the sets of candidate DRX configurations in order to ensure DRX alignment across the respective UEs. In this regard, the master base station aggregates assistance information from the respective UEs, and determines downlink and sidelink DRX configurations for each UE such that Uu and sidelink DRX configurations are aligned at each respective UE, as well as aligned across UEs. As used herein, a downlink DRX configuration may refer to a DRX configuration for any interface that supports downlink signaling, including interfaces that also support uplink signaling, such as a Uu interface as one example.

A method for wireless communication at a first base station is described. The method may include receiving, from a first UE, first control signaling including an indication of one or more DRX configurations for the first UE, an indication of one or more additional DRX configurations for a second UE in wireless communication with the first UE, or both, transmitting, to the first UE based on the first control signaling, second control signaling including an indication of a downlink DRX configuration for the first UE, an indication of a sidelink DRX configuration for the second UE, or both, where a first set of active durations associated with the downlink DRX configuration for the first UE at least partially overlap in a time domain with a second set of active durations associated with the sidelink DRX configuration for the second UE based on the first control signaling, and communicating with the first UE in accordance with the downlink DRX configuration at the first UE.

An apparatus for wireless communication at a first base station is described. The apparatus may include memory, a transceiver, and at least one processor of a first base station, the at least one processor coupled with the memory and the transceiver. The at least one processor may be configured to cause the apparatus to receive, from a first UE, first control signaling including an indication of one or more DRX configurations for the first UE, an indication of one or more additional DRX configurations for a second UE in wireless communication with the first UE, or both, transmit, to the first UE based on the first control signaling, second control signaling including an indication of a downlink DRX configuration for the first UE, an indication of a sidelink DRX configuration for the second UE, or both, where a first set of active durations associated with the downlink DRX configuration for the first UE at least partially overlap in a time domain with a second set of active durations associated with the sidelink DRX configuration for the second UE based on the first control signaling, and communicate with the first UE in accordance with the downlink DRX configuration at the first UE.

Another apparatus for wireless communication at a first base station is described. The apparatus may include means for receiving, from a first UE, first control signaling including an indication of one or more DRX configurations for the first UE, an indication of one or more additional DRX configurations for a second UE in wireless communication with the first UE, or both, means for transmitting, to the first UE based on the first control signaling, second control signaling including an indication of a downlink DRX configuration for the first UE, an indication of a sidelink DRX configuration for the second UE, or both, where a first set of active durations associated with the downlink DRX configuration for the first UE at least partially overlap in a time domain with a second set of active durations associated with the sidelink DRX configuration for the second UE based on the first control signaling, and means for communicating with the first UE in accordance with the downlink DRX configuration at the first UE.

A non-transitory computer-readable medium storing code for wireless communication at a first base station is described. The code may include instructions executable by a processor to receive, from a first UE, first control signaling including an indication of one or more DRX configurations for the first UE, an indication of one or more additional DRX configurations for a second UE in wireless communication with the first UE, or both, transmit, to the first UE based on the first control signaling, second control signaling including an indication of a downlink DRX configuration for the first UE, an indication of a sidelink DRX configuration for the second UE, or both, where a first set of active durations associated with the downlink DRX configuration for the first UE at least partially overlap in a time domain with a second set of active durations associated with the sidelink DRX configuration for the second UE based on the first control signaling, and communicate with the first UE in accordance with the downlink DRX configuration at the first UE.

Some examples of the method, apparatuses, and non-transitory computer-readable medium described herein may further include operations, features, means, or instructions for receiving, from the first UE and based on the second control signaling, third control signaling including an indication of a sidelink DRX configuration for the first UE, where a third set of active durations associated with the sidelink DRX configuration for the first UE at least partially overlap in the time domain with the first and second sets of active durations.

Some examples of the method, apparatuses, and non-transitory computer-readable medium described herein may further include operations, features, means, or instructions for receiving, via the first control signaling, an indication of a downlink DRX configuration for the second UE and determining the downlink DRX configuration for the first UE and the sidelink DRX configuration for the second UE such that the first set of active durations associated with the downlink DRX configuration for the first UE and the second set of active durations associated with the sidelink DRX configuration for the second UE at least partially overlap with the downlink DRX configuration for the second UE.

Some examples of the method, apparatuses, and non-transitory computer-readable medium described herein may further include operations, features, means, or instructions for communicating, with a second base station that may be in wireless communication with the second UE, one or more parameters associated with the first base station, the second base station, UEs communicatively coupled with the first or second base stations, or any combination thereof and determining that the first base station includes a master base station based on the one or more parameters, where receiving the first control signaling, transmitting the second control signaling, or both, may be based on the first base station including the master base station.

In some examples of the method, apparatuses, and non-transitory computer-readable medium described herein, the one or more parameters include one or more UE identifiers associated with one or more UEs in wireless communication with the first or second base stations, one or more quality of service (QoS) requirements associated with the one or more UEs in wireless communication with the first or second base stations, one or more quantities of sidelink connections at the one or more UEs in wireless communication with the first or second base stations, one or more priorities associated with the one or more UEs communicatively coupled with the first or second base stations, one or more traffic loads at the first or second base stations, or any combination thereof.

Some examples of the method, apparatuses, and non-transitory computer-readable medium described herein may further include operations, features, means, or instructions for receiving, from the first UE, an indication that the first base station includes a master base station, where receiving the first control signaling, transmitting the second control signaling, or both, may be based on the first base station including the master base station.

Some examples of the method, apparatuses, and non-transitory computer-readable medium described herein may further include operations, features, means, or instructions for transmitting, via the second control signaling, an indication for the first UE to relay an indication of the downlink DRX configuration for the first UE, the sidelink DRX configuration for the second UE, or both, to the second UE, a second base station in wireless communication with the second UE, or both.

A method for wireless communication at a first UE is described. The method may include receiving, from a first base station, first control signaling including an indication of a downlink DRX configuration for the first UE, a sidelink DRX configuration for a second UE in wireless communication with the first UE, or both, where a first set of active durations associated with the downlink DRX configuration for the first UE at least partially overlap in a time domain with a second set of active durations associated with the sidelink DRX configuration for the second UE, transmitting, to the second UE based on the control signaling, sidelink signaling including an indication of the downlink DRX configuration for the first UE and the sidelink DRX configuration for the second UE, and communicating with the first base station in accordance with the downlink DRX configuration at the first UE.

An apparatus for wireless communication at a first UE is described. The apparatus may include memory, a transceiver, and at least one processor of a first UE, the at least one processor coupled with the memory and the transceiver. The at least one processor may be configured to cause the apparatus to receive, from a first base station, first control signaling including an indication of a downlink DRX configuration for the first UE, a sidelink DRX configuration for a second UE in wireless communication with the first UE, or both, where a first set of active durations associated with the downlink DRX configuration for the first UE at least partially overlap in a time domain with a second set of active durations associated with the sidelink DRX configuration for the second UE, transmit, to the second UE based on the control signaling, sidelink signaling including an indication of the downlink DRX configuration for the first UE and the sidelink DRX configuration for the second UE, and communicate with the first base station in accordance with the downlink DRX configuration at the first UE.

Another apparatus for wireless communication at a first UE is described. The apparatus may include means for receiving, from a first base station, first control signaling including an indication of a downlink DRX configuration for the first UE, a sidelink DRX configuration for a second UE in wireless communication with the first UE, or both, where a first set of active durations associated with the downlink DRX configuration for the first UE at least partially overlap in a time domain with a second set of active durations associated with the sidelink DRX configuration for the second UE, means for transmitting, to the second UE based on the control signaling, sidelink signaling including an indication of the downlink DRX configuration for the first UE and the sidelink DRX configuration for the second UE, and means for communicating with the first base station in accordance with the downlink DRX configuration at the first UE.

A non-transitory computer-readable medium storing code for wireless communication at a first UE is described. The code may include instructions executable by a processor to receive, from a first base station, first control signaling including an indication of a downlink DRX configuration for the first UE, a sidelink DRX configuration for a second UE in wireless communication with the first UE, or both, where a first set of active durations associated with the downlink DRX configuration for the first UE at least partially overlap in a time domain with a second set of active durations associated with the sidelink DRX configuration for the second UE, transmit, to the second UE based on the control signaling, sidelink signaling including an indication of the downlink DRX configuration for the first UE and the sidelink DRX configuration for the second UE, and communicate with the first base station in accordance with the downlink DRX configuration at the first UE.

Some examples of the method, apparatuses, and non-transitory computer-readable medium described herein may further include operations, features, means, or instructions for receiving, from the second UE, second sidelink signaling including an indication of one more DRX configurations for the second UE and transmitting, to the first base station based on the second sidelink signaling, second control signaling including an indication of the one or more DRX configurations for the second UE, an indication of one or more DRX configurations for the first UE, or both, where the first control signaling may be received based on the second control signaling.

Some examples of the method, apparatuses, and non-transitory computer-readable medium described herein may further include operations, features, means, or instructions for receiving, from the second UE and based on the sidelink signaling, second sidelink signaling including an indication of a sidelink DRX configuration for the first UE, where a third set of active durations associated with the sidelink DRX configuration for the first UE at least partially overlap in the time domain with the first and second sets of active durations and communicating with the second UE in accordance with the sidelink DRX configuration for the first UE.

Some examples of the method, apparatuses, and non-transitory computer-readable medium described herein may further include operations, features, means, or instructions for transmitting, to the first base station and based on the second sidelink signaling, second control signaling including an indication of the sidelink DRX configuration for the first UE.

Some examples of the method, apparatuses, and non-transitory computer-readable medium described herein may further include operations, features, means, or instructions for transmitting, via the sidelink signaling, an indication for the second UE to relay the indication of the downlink DRX configuration for the first UE and the sidelink DRX configuration for the second UE to a second base station in wireless communication with the second UE.

Some examples of the method, apparatuses, and non-transitory computer-readable medium described herein may further include operations, features, means, or instructions for communicating, with the second UE, one or more parameters associated with the first UE, the second UE, or both, determining that the first base station includes a master base station based on the one or more parameters, and transmitting, to the first base station, second control signaling including an indication that the first base station includes the master base station, where receiving the first control signaling may be based on the second control signaling.

In some examples of the method, apparatuses, and non-transitory computer-readable medium described herein, the one or more parameters include a UE identifier associated with the first or second UE, a QoS requirement associated with the first or second UE, a priority associated with the first or second UE, or any combination thereof.

A method for wireless communication at a first base station is described. The method may include receiving first control signaling including an indication of a first set of candidate downlink DRX configurations and a first set of candidate sidelink DRX configurations associated with a first UE, receiving, via the first control signaling, second control signaling, or both, an indication of a second set of candidate downlink DRX configurations and a second set of candidate sidelink DRX configurations associated with a second user UE, transmitting third control signaling including an indication of a first downlink DRX configuration and a first sidelink DRX configuration for the first UE, where the first downlink DRX configuration and the first sidelink DRX configuration are selected from the first set of candidate downlink DRX configurations and the first set of candidate sidelink DRX configurations, respectively, based on the second set of candidate downlink DRX configurations and the second set of candidate sidelink DRX configurations, and transmitting, via the third control signaling, fourth control signaling, or both, an indication of a second downlink DRX configuration and a second sidelink DRX configuration for the second UE, where the second downlink DRX configuration and the second sidelink DRX configuration are selected from the second set of candidate downlink DRX configurations and the second set of candidate sidelink DRX configurations, respectively, based on the first set of candidate downlink DRX configurations and the first set of candidate sidelink DRX configurations, and where active durations of the first and second downlink DRX configurations and the first and second sidelink DRX configurations at least partially overlap in a time domain.

An apparatus for wireless communication at a first base station is described. The apparatus may include memory, a transceiver, and at least one processor of a first base station, the at least one processor coupled with the memory and the transceiver. The at least one processor may be configured to cause the apparatus to receive first control signaling including an indication of a first set of candidate downlink DRX configurations and a first set of candidate sidelink DRX configurations associated with a first UE, receive, via the first control signaling, second control signaling, or both, an indication of a second set of candidate downlink DRX configurations and a second set of candidate sidelink DRX configurations associated with a second user UE, transmit third control signaling including an indication of a first downlink DRX configuration and a first sidelink DRX configuration for the first UE, where the first downlink DRX configuration and the first sidelink DRX configuration are selected from the first set of candidate downlink DRX configurations and the first set of candidate sidelink DRX configurations, respectively, based on the second set of candidate downlink DRX configurations and the second set of candidate sidelink DRX configurations, and transmit, via the third control signaling, fourth control signaling, or both, an indication of a second downlink DRX configuration and a second sidelink DRX configuration for the second UE, where the second downlink DRX configuration and the second sidelink DRX configuration are selected from the second set of candidate downlink DRX configurations and the second set of candidate sidelink DRX configurations, respectively, based on the first set of candidate downlink DRX configurations and the first set of candidate sidelink DRX configurations, and where active durations of the first and second downlink DRX configurations and the first and second sidelink DRX configurations at least partially overlap in a time domain.

Another apparatus for wireless communication at a first base station is described. The apparatus may include means for receiving first control signaling including an indication of a first set of candidate downlink DRX configurations and a first set of candidate sidelink DRX configurations associated with a first UE, means for receiving, via the first control signaling, second control signaling, or both, an indication of a second set of candidate downlink DRX configurations and a second set of candidate sidelink DRX configurations associated with a second user UE, means for transmitting third control signaling including an indication of a first downlink DRX configuration and a first sidelink DRX configuration for the first UE, where the first downlink DRX configuration and the first sidelink DRX configuration are selected from the first set of candidate downlink DRX configurations and the first set of candidate sidelink DRX configurations, respectively, based on the second set of candidate downlink DRX configurations and the second set of candidate sidelink DRX configurations, and means for transmitting, via the third control signaling, fourth control signaling, or both, an indication of a second downlink DRX configuration and a second sidelink DRX configuration for the second UE, where the second downlink DRX configuration and the second sidelink DRX configuration are selected from the second set of candidate downlink DRX configurations and the second set of candidate sidelink DRX configurations, respectively, based on the first set of candidate downlink DRX configurations and the first set of candidate sidelink DRX configurations, and where active durations of the first and second downlink DRX configurations and the first and second sidelink DRX configurations at least partially overlap in a time domain.

A non-transitory computer-readable medium storing code for wireless communication at a first base station is described. The code may include instructions executable by a processor to receive first control signaling including an indication of a first set of candidate downlink DRX configurations and a first set of candidate sidelink DRX configurations associated with a first UE, receive, via the first control signaling, second control signaling, or both, an indication of a second set of candidate downlink DRX configurations and a second set of candidate sidelink DRX configurations associated with a second user UE, transmit third control signaling including an indication of a first downlink DRX configuration and a first sidelink DRX configuration for the first UE, where the first downlink DRX configuration and the first sidelink DRX configuration are selected from the first set of candidate downlink DRX configurations and the first set of candidate sidelink DRX configurations, respectively, based on the second set of candidate downlink DRX configurations and the second set of candidate sidelink DRX configurations, and transmit, via the third control signaling, fourth control signaling, or both, an indication of a second downlink DRX configuration and a second sidelink DRX configuration for the second UE, where the second downlink DRX configuration and the second sidelink DRX configuration are selected from the second set of candidate downlink DRX configurations and the second set of candidate sidelink DRX configurations, respectively, based on the first set of candidate downlink DRX configurations and the first set of candidate sidelink DRX configurations, and where active durations of the first and second downlink DRX configurations and the first and second sidelink DRX configurations at least partially overlap in a time domain.

Some examples of the method, apparatuses, and non-transitory computer-readable medium described herein may further include operations, features, means, or instructions for receiving the first control signaling from a second base station in wireless communication with the first UE, receiving the second control signaling from a third base station in wireless communication with the second UE, transmitting the third control signaling to the second base station, where the third control signaling includes an indication for the second base station to relay the indication of the first downlink DRX configuration and the first sidelink DRX configuration to the first UE, and transmitting the fourth control signaling to the third base station, where the fourth control signaling includes an indication for the third base station to relay the indication of the second downlink DRX configuration and the second sidelink DRX configuration to the second UE.

Some examples of the method, apparatuses, and non-transitory computer-readable medium described herein may further include operations, features, means, or instructions for receiving the first control signaling from a second base station in wireless communication with the first UE and transmitting the third control signaling to the second base station, where the third control signaling includes an indication for the second base station to relay the indication of the first downlink DRX configuration and the first sidelink DRX configuration to the first UE, and where the third control signaling further includes an indication for the second base station to relay the indication of the second downlink DRX configuration and the second sidelink DRX configuration to the second UE.

Some examples of the method, apparatuses, and non-transitory computer-readable medium described herein may further include operations, features, means, or instructions for receiving, via the first control signaling, an indication of a first set of parameters associated with existing sidelink connections at the first UE, receiving, via the first control signaling, the second control signaling, or both, an indication of a second set of parameters associated with existing sidelink connections at the second UE, and determining the first sidelink DRX configuration, the second sidelink DRX configuration, the first downlink DRX configuration, the second downlink DRX configuration, or any combination thereof, based on the first set of parameters, the second set of parameters, or both.

In some examples of the method, apparatuses, and non-transitory computer-readable medium described herein, the first set of parameters, the second set of parameters, or both, include one or more UE identities associated with one or more UEs in wireless communication with the first or second UE, one or more pathloss metrics associated with wireless communications with the one or more UEs in wireless communication with the first or second UE, one or more existing sidelink DRX configurations associated with wireless communications with the one or more UEs in wireless communication with the first or second UE, one or more existing sidelink connections at the one or more UEs in wireless communication with the first or second UE, or any combination thereof.

In some examples of the method, apparatuses, and non-transitory computer-readable medium described herein, the first and second sidelink DRX configurations and the first and second downlink DRX configurations include connected mode DRX configurations and the method, apparatuses, and non-transitory computer-readable medium may include further operations, features, means, or instructions for transmitting, via the third control signaling, an indication of a third downlink DRX configuration for the first UE and transmitting, via the third control signaling, the fourth control signaling, or both, an indication of a fourth downlink DRX configuration for the second UE, where the third and fourth downlink DRX configurations include inactive mode DRX configurations.

In some examples of the method, apparatuses, and non-transitory computer-readable medium described herein, the third downlink DRX configuration may be selected from the first set of candidate downlink DRX configurations associated with the first UE and the fourth downlink DRX configuration may be selected from the second set of candidate downlink DRX configurations associated with the second UE.

In some examples of the method, apparatuses, and non-transitory computer-readable medium described herein, where the third downlink DRX configuration may be based on the first downlink DRX configuration, the first sidelink DRX configuration, or both and where the fourth downlink DRX configuration may be based on the second downlink DRX configuration, the second sidelink DRX configuration, or both.

Some examples of the method, apparatuses, and non-transitory computer-readable medium described herein may further include operations, features, means, or instructions for determining that the first base station includes a master base station, where receiving the first control signaling, receiving the second control signaling, transmitting the third control signaling, transmitting the fourth control signaling, or any combination thereof, may be based on the first UE including the master base station.

A method for wireless communication at a first UE is described. The method may include transmitting, to a first base station, first control signaling including an indication of a set of candidate downlink DRX configurations and a set of candidate sidelink DRX configurations associated with the first UE, receiving, based on the first control signaling, second control signaling including an indication of a downlink DRX configuration for the first UE and a sidelink DRX configuration for a second UE in wireless communication with the first UE, where the downlink DRX configuration is included in the set of candidate downlink DRX configurations, and where the downlink DRX configuration and the sidelink DRX configuration are based on the set of candidate downlink DRX configurations, the set of candidate sidelink DRX configurations, one or more candidate DRX configurations at the second UE, or any combination thereof, and communicating with a second base station in accordance with the first downlink DRX configuration, the second base station different from the first base station.

An apparatus for wireless communication at a first UE is described. The apparatus may include memory, a transceiver, and at least one processor of a first UE, the at least one processor coupled with the memory and the transceiver. The at least one processor may be configured to cause the apparatus to transmit, to a first base station, first control signaling including an indication of a set of candidate downlink DRX configurations and a set of candidate sidelink DRX configurations associated with the first UE, receive, based on the first control signaling, second control signaling including an indication of a downlink DRX configuration for the first UE and a sidelink DRX configuration for a second UE in wireless communication with the first UE, where the downlink DRX configuration is included in the set of candidate downlink DRX configurations, and where the downlink DRX configuration and the sidelink DRX configuration are based on the set of candidate downlink DRX configurations, the set of candidate sidelink DRX configurations, one or more candidate DRX configurations at the second UE, or any combination thereof, and communicate with a second base station in accordance with the first downlink DRX configuration, the second base station different from the first base station.

Another apparatus for wireless communication at a first UE is described. The apparatus may include means for transmitting, to a first base station, first control signaling including an indication of a set of candidate downlink DRX configurations and a set of candidate sidelink DRX configurations associated with the first UE, means for receiving, based on the first control signaling, second control signaling including an indication of a downlink DRX configuration for the first UE and a sidelink DRX configuration for a second UE in wireless communication with the first UE, where the downlink DRX configuration is included in the set of candidate downlink DRX configurations, and where the downlink DRX configuration and the sidelink DRX configuration are based on the set of candidate downlink DRX configurations, the set of candidate sidelink DRX configurations, one or more candidate DRX configurations at the second UE, or any combination thereof, and means for communicating with a second base station in accordance with the first downlink DRX configuration, the second base station different from the first base station.

A non-transitory computer-readable medium storing code for wireless communication at a first UE is described. The code may include instructions executable by a processor to transmit, to a first base station, first control signaling including an indication of a set of candidate downlink DRX configurations and a set of candidate sidelink DRX configurations associated with the first UE, receive, based on the first control signaling, second control signaling including an indication of a downlink DRX configuration for the first UE and a sidelink DRX configuration for a second UE in wireless communication with the first UE, where the downlink DRX configuration is included in the set of candidate downlink DRX configurations, and where the downlink DRX configuration and the sidelink DRX configuration are based on the set of candidate downlink DRX configurations, the set of candidate sidelink DRX configurations, one or more candidate DRX configurations at the second UE, or any combination thereof, and communicate with a second base station in accordance with the first downlink DRX configuration, the second base station different from the first base station.

Some examples of the method, apparatuses, and non-transitory computer-readable medium described herein may further include operations, features, means, or instructions for transmitting, to the second UE, sidelink signaling including an indication of the sidelink DRX configuration for the second UE, receiving, from the second UE, second sidelink signaling including an indication of an additional sidelink DRX configuration for the first UE, and communicating with the second UE in accordance with the sidelink DRX configuration for the second UE and in accordance with the additional sidelink DRX configuration for the first UE.

In some examples of the method, apparatuses, and non-transitory computer-readable medium described herein, the additional sidelink DRX configuration for the first UE may be included in the set of candidate sidelink DRX configurations associated with the first UE.

In some examples of the method, apparatuses, and non-transitory computer-readable medium described herein, and the method, apparatuses, and non-transitory computer-readable medium may include further operations, features, means, or instructions for where transmitting the first control signaling includes transmitting the first control signaling via a downlink interface between the first UE and the first base station, transmitting the first control signaling to an additional wireless device for relay to the first base station, or both and where receiving the second control signaling includes receiving the second control signaling via the downlink interface between the first UE and the first base station, receiving the second control signaling via a wireless connection between the first UE and the additional wireless device, or both.

Some examples of the method, apparatuses, and non-transitory computer-readable medium described herein may further include operations, features, means, or instructions for transmitting, via the first control signaling, an indication of a set of parameters associated with existing sidelink connections at the first UE, where the downlink DRX configuration for the first UE, the sidelink DRX configuration for the second UE, or both, may be based on the set of parameters.

In some examples of the method, apparatuses, and non-transitory computer-readable medium described herein, the set of parameters includes one or more UE identities associated with one or more UEs in wireless communication with the first UE, one or more pathloss metrics associated with wireless communications with the one or more UEs in wireless communication with the first UE, one or more existing sidelink DRX configurations associated with wireless communications with the one or more UEs in wireless communication with the first UE, one or more existing sidelink connections at the one or more UEs in wireless communication with the first UE, or any combination thereof.

In some examples of the method, apparatuses, and non-transitory computer-readable medium described herein, the downlink DRX configuration includes a connected mode DRX configuration and the method, apparatuses, and non-transitory computer-readable medium may include further operations, features, means, or instructions for receiving, via the second control signaling, an indication of a second downlink DRX configuration for the first UE, the second downlink DRX configuration including an inactive mode DRX configuration, where the second downlink DRX configuration may be based on the downlink DRX configuration.

A method for wireless communication at a second base station is described. The method may include receiving, from a second UE, first control signaling including an indication of a sidelink DRX configuration for the second UE, a downlink DRX configuration at a first UE in wireless communication with the second UE, or both, transmitting, to the second UE based on the first control signaling, second control signaling including an indication of a sidelink DRX configuration for the first UE, a downlink DRX configuration for the second UE, or both, where respective sets of active durations associated with the sidelink DRX configurations and the downlink DRX configurations for the first and second UEs at least partially overlap in a time domain, and communicating with the second UE in accordance with the downlink DRX configuration for the second UE.

An apparatus for wireless communication at a second base station is described. The apparatus may include memory, a transceiver, and at least one processor of a second base station, the at least one processor coupled with the memory and the transceiver. The at least one processor may be configured to cause the apparatus to receive, from a second UE, first control signaling including an indication of a sidelink DRX configuration for the second UE, a downlink DRX configuration at a first UE in wireless communication with the second UE, or both, transmit, to the second UE based on the first control signaling, second control signaling including an indication of a sidelink DRX configuration for the first UE, a downlink DRX configuration for the second UE, or both, where respective sets of active durations associated with the sidelink DRX configurations and the downlink DRX configurations for the first and second UEs at least partially overlap in a time domain, and communicate with the second UE in accordance with the downlink DRX configuration for the second UE.

Another apparatus for wireless communication at a second base station is described. The apparatus may include means for receiving, from a second UE, first control signaling including an indication of a sidelink DRX configuration for the second UE, a downlink DRX configuration at a first UE in wireless communication with the second UE, or both, means for transmitting, to the second UE based on the first control signaling, second control signaling including an indication of a sidelink DRX configuration for the first UE, a downlink DRX configuration for the second UE, or both, where respective sets of active durations associated with the sidelink DRX configurations and the downlink DRX configurations for the first and second UEs at least partially overlap in a time domain, and means for communicating with the second UE in accordance with the downlink DRX configuration for the second UE.

A non-transitory computer-readable medium storing code for wireless communication at a second base station is described. The code may include instructions executable by a processor to receive, from a second UE, first control signaling including an indication of a sidelink DRX configuration for the second UE, a downlink DRX configuration at a first UE in wireless communication with the second UE, or both, transmit, to the second UE based on the first control signaling, second control signaling including an indication of a sidelink DRX configuration for the first UE, a downlink DRX configuration for the second UE, or both, where respective sets of active durations associated with the sidelink DRX configurations and the downlink DRX configurations for the first and second UEs at least partially overlap in a time domain, and communicate with the second UE in accordance with the downlink DRX configuration for the second UE.

Some examples of the method, apparatuses, and non-transitory computer-readable medium described herein may further include operations, features, means, or instructions for determining the sidelink DRX configuration for the first UE and the downlink DRX configuration for the second UE such that the respective sets of active durations associated with the sidelink DRX configuration for the first UE and the downlink DRX configuration for the second UE at least partially overlap in the time domain with the respective sets of active durations associated with the sidelink DRX configuration for the second UE and the downlink DRX configuration for the first UE.

Some examples of the method, apparatuses, and non-transitory computer-readable medium described herein may further include operations, features, means, or instructions for transmitting, via the second control signaling, an indication for the second UE to relay, to the first UE, the indication of the sidelink DRX configuration for the first UE and the downlink DRX configuration for the second UE.

Some examples of the method, apparatuses, and non-transitory computer-readable medium described herein may further include operations, features, means, or instructions for communicating, with a first base station that may be in wireless communication with the first UE, one or more parameters associated with the first base station, the second base station, UEs communicatively coupled with the first or second base stations, or any combination thereof and determining that the first base station includes a master base station based on the one or more parameters, where receiving the first control signaling, transmitting the second control signaling, or both, may be based on the first base station including the master base station.

In some examples of the method, apparatuses, and non-transitory computer-readable medium described herein, the one or more parameters include one or more UE identifiers associated with one or more UEs in wireless communication with the first or second base stations, one or more QoS requirements associated with the one or more UEs in wireless communication with the first or second base stations, one or more quantities of sidelink connections at the one or more UEs in wireless communication with the first or second base stations, one or more priorities associated with the one or more UEs communicatively coupled with the first or second base stations, one or more traffic loads at the first or second base stations, or any combination thereof.

Some examples of the method, apparatuses, and non-transitory computer-readable medium described herein may further include operations, features, means, or instructions for receiving, from the second UE, an indication that a first base station in wireless communication with the first UE includes a master base station, where receiving the first control signaling, transmitting the second control signaling, or both, may be based on the first base station including the master base station.

Some examples of the method, apparatuses, and non-transitory computer-readable medium described herein may further include operations, features, means, or instructions for identifying an absence of an indication that the second base station includes a master base station and determining, based on the absence of the indication, that a first base station in wireless communication with the first UE includes the master base station, where receiving the first control signaling, transmitting the second control signaling, or both, may be based on the first base station including the master base station.

A method for wireless communication at a second base station is described. The method may include transmitting, to a first base station, first control signaling including an indication of a first set of candidate downlink DRX configurations and a first set of candidate sidelink DRX configurations associated with a first UE in wireless communication with the second base station, receiving, based on the control signaling, second control signaling including an indication of a first downlink DRX configuration and a first sidelink DRX configuration for the first UE, where the first downlink DRX configuration and the first sidelink DRX configuration are included in the first set of candidate downlink DRX configurations and the first set of candidate sidelink DRX configurations, respectively, transmitting, to the first UE based on the second control signaling, third control signaling including an indication of the first downlink DRX configuration and the first sidelink DRX configuration, and communicating with the first UE in accordance with the first downlink DRX configuration for the first UE and based on the third control signaling.

An apparatus for wireless communication at a second base station is described. The apparatus may include memory, a transceiver, and at least one processor of a second base station, the at least one processor coupled with the memory and the transceiver. The at least one processor may be configured to cause the apparatus to transmit, to a first base station, first control signaling including an indication of a first set of candidate downlink DRX configurations and a first set of candidate sidelink DRX configurations associated with a first UE in wireless communication with the second base station, receive, based on the control signaling, second control signaling including an indication of a first downlink DRX configuration and a first sidelink DRX configuration for the first UE, where the first downlink DRX configuration and the first sidelink DRX configuration are included in the first set of candidate downlink DRX configurations and the first set of candidate sidelink DRX configurations, respectively, transmit, to the first UE based on the second control signaling, third control signaling including an indication of the first downlink DRX configuration and the first sidelink DRX configuration, and communicate with the first UE in accordance with the first downlink DRX configuration for the first UE and based on the third control signaling.

Another apparatus for wireless communication at a second base station is described. The apparatus may include means for transmitting, to a first base station, first control signaling including an indication of a first set of candidate downlink DRX configurations and a first set of candidate sidelink DRX configurations associated with a first UE in wireless communication with the second base station, means for receiving, based on the control signaling, second control signaling including an indication of a first downlink DRX configuration and a first sidelink DRX configuration for the first UE, where the first downlink DRX configuration and the first sidelink DRX configuration are included in the first set of candidate downlink DRX configurations and the first set of candidate sidelink DRX configurations, respectively, means for transmitting, to the first UE based on the second control signaling, third control signaling including an indication of the first downlink DRX configuration and the first sidelink DRX configuration, and means for communicating with the first UE in accordance with the first downlink DRX configuration for the first UE and based on the third control signaling.

A non-transitory computer-readable medium storing code for wireless communication at a second base station is described. The code may include instructions executable by a processor to transmit, to a first base station, first control signaling including an indication of a first set of candidate downlink DRX configurations and a first set of candidate sidelink DRX configurations associated with a first UE in wireless communication with the second base station, receive, based on the control signaling, second control signaling including an indication of a first downlink DRX configuration and a first sidelink DRX configuration for the first UE, where the first downlink DRX configuration and the first sidelink DRX configuration are included in the first set of candidate downlink DRX configurations and the first set of candidate sidelink DRX configurations, respectively, transmit, to the first UE based on the second control signaling, third control signaling including an indication of the first downlink DRX configuration and the first sidelink DRX configuration, and communicate with the first UE in accordance with the first downlink DRX configuration for the first UE and based on the third control signaling.

Some examples of the method, apparatuses, and non-transitory computer-readable medium described herein may further include operations, features, means, or instructions for receiving, from the first UE, fourth control signaling including an indication of the first set of candidate downlink DRX configurations and the first set of candidate sidelink DRX configurations associated with the first UE, where transmitting the first control signaling may be based on the fourth control signaling.

Some examples of the method, apparatuses, and non-transitory computer-readable medium described herein may further include operations, features, means, or instructions for receiving, via the fourth control signaling, an indication of a set of parameters associated with existing sidelink connections at the first UE and transmitting, via the first control signaling, an indication of the set of parameters, where the first downlink DRX configuration, the first sidelink DRX configuration, or both, may be based on the set of parameters.

In some examples of the method, apparatuses, and non-transitory computer-readable medium described herein, the set of parameters includes one or more UE identities associated with one or more UEs in wireless communication with the first UE, one or more pathloss metrics associated with wireless communications with the one or more UEs in wireless communication with the first UE, one or more existing sidelink DRX configurations associated with wireless communications with the one or more UEs in wireless communication with the first UE, one or more existing sidelink connections at the one or more UEs in wireless communication with the first UE, or any combination thereof.

DETAILED DESCRIPTION

Figure 1:
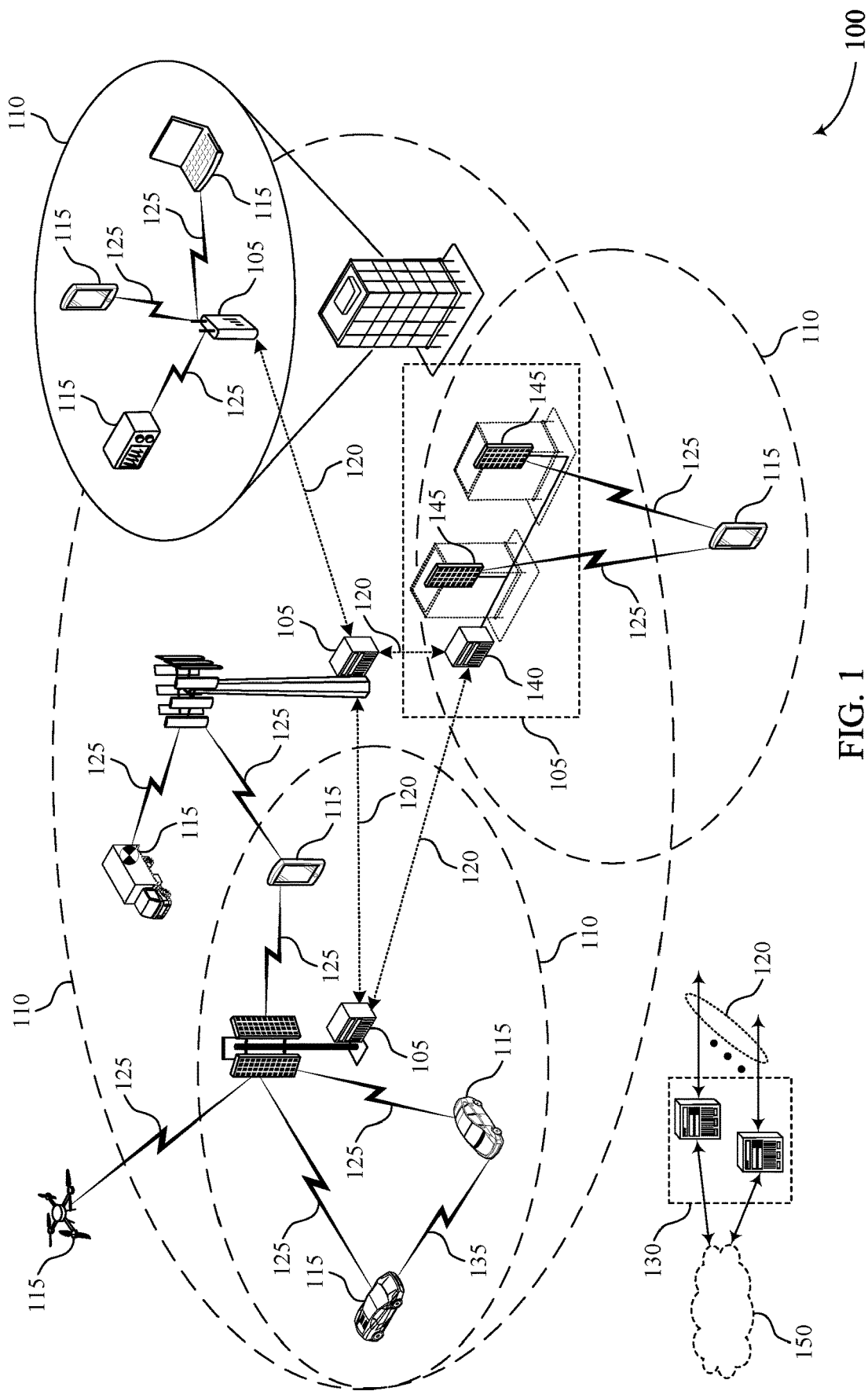
FIG. 1 illustrates an example of a wireless communications system that supports discontinuous reception (DRX) alignment in accordance with aspects of the present disclosure.

Some wireless devices (e.g., user equipments (UEs)) may be configured with discontinuous reception (DRX) configurations including active and inactive durations. DRX configurations may enable UEs to communicate during active durations, and go to "sleep" or otherwise enter low-power states during inactive durations. For example, a UE may cease monitoring for incoming communications on one or more channels during an inactive duration for an interface via which the one or more channels may be received. UEs may be configured with downlink DRX configurations for communications between the UE and a base station, as well as sidelink DRX configurations for communications between the UE and other UEs. As used herein, a downlink DRX configuration may refer to a DRX configuration for any interface that supports downlink signaling, including interfaces that also support uplink signaling or one or more other signaling directions, such as a Uu interface as one example. Some aspects of the present disclosure may be described with reference to Uu DRX configurations, and it is to be understand that such aspects may additionally or alternatively be referred to as downlink DRX configurations and may be applied in the context of any interface that supports downlink signaling.

In order for two or more UEs to communicate with each other, sidelink DRX configurations at the respective UEs should be aligned with each other (Type 1 alignment). As used herein, DRX configurations may be said to be "aligned" if corresponding active durations of the respective DRX configurations at least partially overlap in time. Moreover, in order to maximize power savings, downlink and sidelink DRX configurations at a UE should also be aligned (Type 2 alignment). However, conventional techniques for aligning downlink DRX configurations (e.g., Uu DRX configurations) and sidelink DRX configurations across multiple UEs are inefficient, and do not always ensure alignments of DRX configurations across UEs. Moreover, in cases where there are multiple UEs connected to each other and respective base stations, there are currently no techniques which may be used to ensure DRX alignment across the respective UEs. As such, conventional DRX alignment are deficient.

Accordingly, aspects of the present disclosure are directed to techniques for bi-directional DRX alignment and centralized DRX alignment. In the context of bi-directional DRX alignment, DRX configurations at two respective UEs are first established in a first direction, and then DRX configurations are then established in the reverse direction based on the previously-established DRX configurations. Comparatively, in the context of centralized DRX alignment, a master base station receives "candidate" downlink and sidelink DRX configurations for multiple UEs, and selects downlink and sidelink DRX configurations for each UE from the sets of candidate DRX configurations in order to ensure DRX alignment across the respective UEs.

For example, in the context of bi-directional DRX alignment, a "master" base station receives assistance information from a first and second UE (UE1, UE2), and sets a downlink DRX configuration for UE1 and a sidelink DRX configuration for UE2 based on the received assistance information. The downlink and sidelink DRX configurations at the respective UEs are selected so that the DRX configurations are aligned (e.g., active durations of the respective DRX configurations at least partially overlap). These DRX alignments are then communicated to a second base station (e.g., via UE1 and UE2), where the second base station sets a downlink DRX configuration for UE2 and a sidelink DRX configuration for UE1. The second base station selects the respective DRX configurations such that all downlink and sidelink DRX configurations are aligned. Finally, the downlink DRX configuration for UE2 and the sidelink DRX configuration for UE1 are then passed back to UE2, UE1, and the master base station. In some cases, the master base station may be selected based on negotiation between the base stations, negotiation between the UEs, or both. Using bi-directional DRX alignment techniques described herein, DRX configurations may first be selected in a first direction, and DRX configurations in a second direction may be selected based on the previously-selected DRX configurations in order to ensure DRX alignment at each respective UE, as well as across the UEs.

Comparatively, in the context of centralized DRX alignment, a master base station receives "candidate" downlink and sidelink DRX configurations for multiple UEs, and selects downlink and sidelink DRX configurations for each UE from the sets of candidate DRX configurations in order to ensure DRX alignment across the respective UEs. In this regard, the master base station aggregates assistance information from the respective UEs, and determines downlink and sidelink DRX configurations for each UE such that downlink and sidelink DRX configurations are aligned at each respective UE, as well as aligned across UEs.

Aspects of the disclosure are initially described in the context of wireless communications systems. Additional aspects of the disclosure are described in the context of example process flows. Aspects of the disclosure are further illustrated by and described with reference to apparatus diagrams, system diagrams, and flowcharts that relate to DRX alignment. Though certain examples may be described herein with reference to two UEs, it is to be understood that the teachings herein may be extended any applied in the context of any quantity of UEs (or other wireless devices).

FIG. 1 illustrates an example of a wireless communications system 100 that supports DRX alignment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may be configured to support techniques for ensuring DRX alignment of DRX configurations within UEs 115, as well as across UEs 115. In particular, the wireless devices of the wireless communications system 100 may be configured to support techniques for bi-directional DRX alignment and centralized DRX alignment. Bi-directional and centralized DRX alignment techniques described herein may be used to ensure alignment of downlink and sidelink DRX configurations at a UE 115 (Type 1 alignment), as well as alignment of sidelink DRX configurations across multiple UEs 115 (Type 2 alignment).

In the context of bi-directional DRX alignment, DRX configurations at two respective UEs 115 are first established in a first direction (e.g., from a first base station 105, to a first UE 115, to a second UE 115, to a second base station 105), and then DRX configurations are then established in the reverse direction (e.g., from the second base station 105, to the second UE 115, to the first UE 115, to the first base station 105) based on the previously-established DRX configurations. Comparatively, in the context of centralized DRX alignment, a master base station 105 receives "candidate" Uu and sidelink DRX configurations for multiple UEs 115, and selects Uu and sidelink DRX configurations for each UE 115 from the sets of candidate DRX configurations in order to ensure DRX alignment across the respective UEs 115.

For example, in the context of bi-directional DRX alignment, a "master" base station 105 receives assistance information from a first UE 115 (UE1) and a second UE (UE2), and sets a Uu DRX configuration for UE1 and a sidelink DRX configuration for UE2 based on the received assistance information. The Uu and sidelink DRX configurations at the respective UEs 115 are selected so that the DRX configurations are aligned (e.g., active durations of the respective DRX configurations at least partially overlap). These DRX alignments are then communicated to a second base station 105 (e.g., via UE1 and UE2), where the second base station 105 sets a Uu DRX configuration for UE2 and a sidelink DRX configuration for UE1. The second base station 105 selects the respective DRX configurations such that all Uu and sidelink DRX configurations are aligned. Finally, the Uu DRX configuration for UE2 and the sidelink DRX configuration for UE1 are then passed back to UE2, UE1, and the master base station 105. In some cases, the master base station 105 may be selected based on negotiation between the base stations 105, negotiation between the UEs 115, or both. Using bi-directional DRX alignment techniques described herein, DRX configurations may first be selected in a first direction, and DRX configurations in a second direction may be selected based on the previously-selected DRX configurations in order to ensure DRX alignment at each respective UE 115, as well as across the UEs 115.

Comparatively, in the context of centralized DRX alignment, a master base station 105 receives "candidate" Uu and sidelink DRX configurations for multiple UEs 115, and selects Uu and sidelink DRX configurations for each UE 115 from the sets of candidate DRX configurations in order to ensure DRX alignment across the respective UEs. In this regard, the master base station 105 aggregates assistance information from the respective UEs 115, and determines Uu and sidelink DRX configurations for each UE 115 such that Uu and sidelink DRX configurations are aligned at each respective UE 115, as well as aligned across UEs 115.

Techniques described herein may facilitate alignment of active durations of DRX configurations at UEs 115, as well as alignment of active durations of DRX configurations across multiple UEs 115. In this regard, aspects of the present disclosure may improve Type 1 alignment of Uu and sidelink DRX configurations within UEs 115, which may reduce power consumption at the UEs 115, improve battery life, and improve overall user experience. Moreover, aspects of the present disclosure may improve Type 2 alignment of sidelink DRX configurations across UEs 115, which may facilitate improved communications between UEs 115, reduce latency of sidelink communications, and lead to a more efficient use of resources within the wireless communications system 100.

Figure 2:
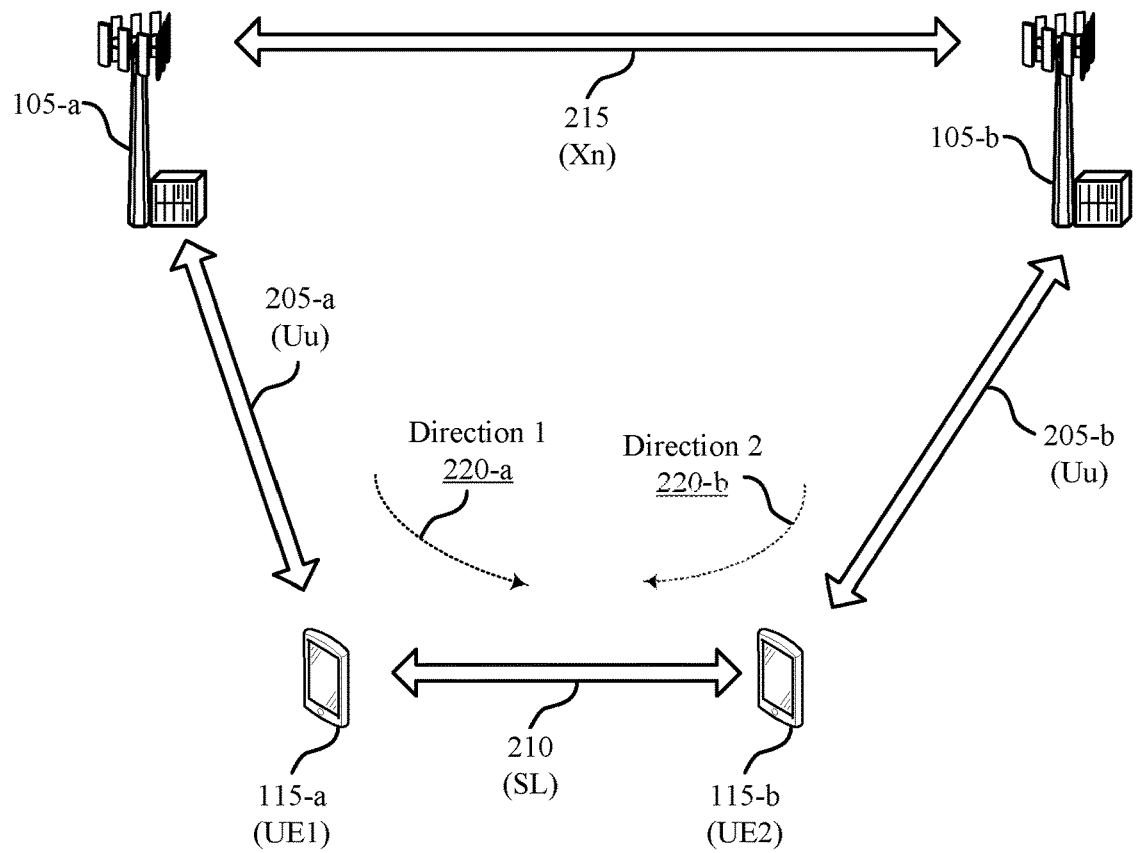
FIG. 2 illustrates an example of a wireless communications system that supports DRX alignment in accordance with aspects of the present disclosure.
Figure 2:
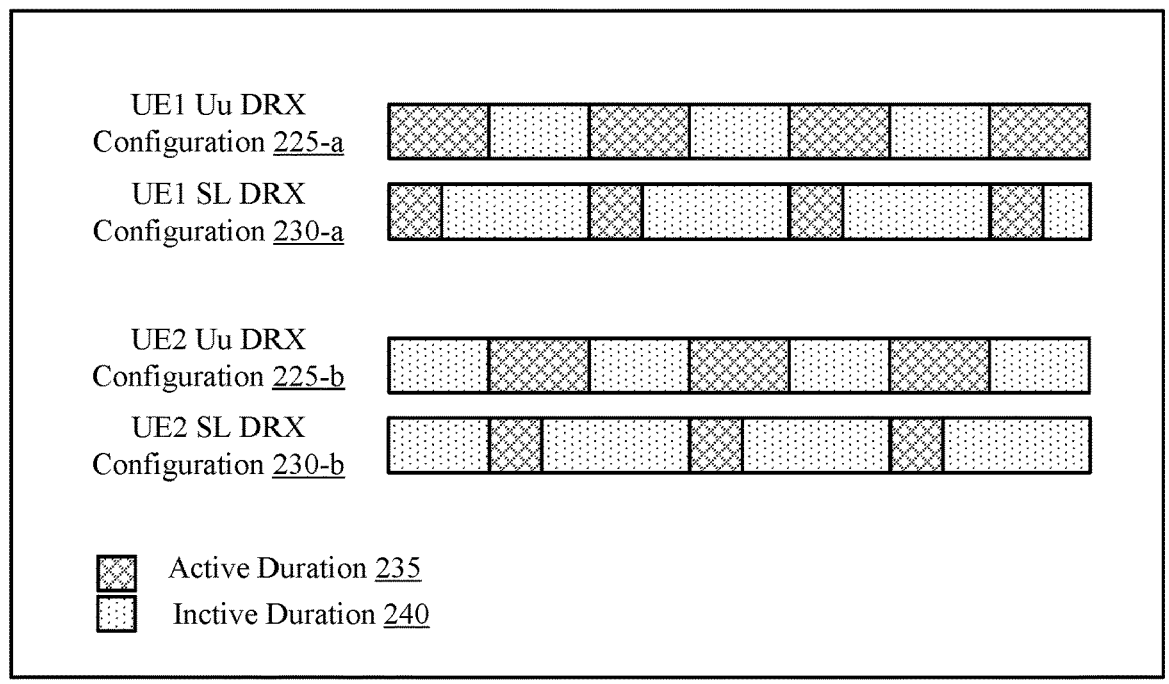

FIG. 2 illustrates an example of a wireless communications system 200 that supports DRX alignment in accordance with aspects of the present disclosure. In some examples, wireless communications system 200 may implement, or be implemented by, aspects of wireless communications system 100. Wireless communications system 200 may support techniques for bi-directional DRX alignment and centralized DRX alignment.

The wireless communications system 200 may include a first base station 105-a, a second base station 105-b, a first UE 115-a, and a second UE 115-b, which may be examples of UEs 115, base stations 105, and other wireless devices as described with reference to FIG. 1. In some aspects, the UEs 115-a, 115-b may communicate with the respective base station 105-a, 105-b using communication links, which may be examples of NR or LTE links between the base stations 105-a, 105-b and the respective UEs 115-a, 115-b. For example, the first UE 115-a may communicate with the first base station 105-a via a communication link 205-a, and the second UE 115-b may communicate with the second base station 105-b via a communication link 205-b. In some aspects, the communication links 205-a, 205-b between the base stations 105-a, 105-b and the respective UEs 115-a, 115-b may include examples of access links (e.g., Uu links) which may include bi-directional links that enable both uplink and downlink communication.

Moreover, in some aspects, the first UE 115-a and the second UE 115-b may communicate with one another using a communication link 210, which may be an example of a sidelink communication link or PC5 link. As such, the first UE 115-a and the second UE 115-b may be wirelessly connected to one another via the communication link 210 when each UE 115 is RRC connected. Further, the first base station 105-a and the second base station 105-b may communicate with one another using a communication link 215, which may be an example of a communication link over an Xn interface (e.g., Xn communication link 215).

In some aspects, the communication link 210 between the respective UEs 115 (e.g., sidelink communication links) may be included within a sidelink network of the wireless communications system 200. The sidelink network (e.g., sidelink network including the communication link 210) may be configured to operate in a "Mode 1" and/or a "Mode 2." While operating in Mode 1, the sidelink network (e.g., communication link 210) may be managed (e.g., coordinated) by the first base station 105-a, the second base station 105-b, or both. In this regard, during Mode 1 operation, a base station 105 may manage resource allocation over the communication link 210, and may allocate sets of resources within the communication link 210 to the respective UEs 115. In some cases, the base stations 105-a, 105-b may allocate sets of sidelink resources to the respective UEs 115 during Mode 1 operation via RRC signaling, downlink control information (DCI) messages (e.g., DCI 3_0), or both. During Mode 1 operation, the base station 105-a, 105-b may allocate sidelink resources via dynamic grants, configured grants (e.g., type 1 configured grants, type 2 configured grants), or both. Within Mode 1 operation, a modulation and coding scheme (MCS) used for communications over the communication link 210 (e.g., sidelink communication link) may be left up to the respective UEs 115, within limits which are pre-configured at the UEs 115 and/or signaled by the base stations 105-a, 105-b.

Comparatively, while operating in Mode 2, the sidelink network (e.g., communication link 210) may not be managed (e.g., may not be coordinated) by a base station 105. Without coordination or management of the resources of the sidelink network during the Mode 2 operation, the UEs 115 may be configured to monitor the sidelink network (e.g., monitor sidelink communication link 210 and/or other sidelink communication links), and determine sets of sidelink resources which are available for transmission of sidelink messages via the sidelink communication link 210. For example, the first UE 115-a may "autonomously" determine sidelink resources which are to be used within the communication link 210 by monitoring the sidelink network including sidelink communication links, and decoding all physical sidelink control channels (PSCCH) and physical sidelink shared channels (PSSCHs) within the communication link 210 and sidelink network to identify sidelink resources which have been reserved by other UEs 115. Subsequently, the first UE 115-a may report available sidelink resources to the upper layer, and may transmit a sidelink control information (e.g., SCI) which reserves a set of sidelink resources for a sidelink communication to be performed (e.g., transmitted, received) at the first UE 115-a. In this regard, Mode 2 operation of the sidelink network including the communication link 210 may follow contention-based access procedures in which the various UEs 115 to "compete" for the use of the sidelink network, including the communication link 210.

Communications between the respective wireless devices of the wireless communications system 200 may be bi-directional, in that each respective wireless device may be configured to both transmit and receive wireless communications. In this regard, the wireless communications system 200 illustrated in FIG. 2 may facilitate wireless communications in a first direction 220-a (Direction 1) and a second direction 220-b (Direction 2).

For example, in the first direction 220-a, the first base station 105-a may transmit a communication to the first UE 115-a, the first UE 115-a may transmit a communication to the second UE 115-b, and the second UE 115-b may transmit a communication to the second base station 105-b. As such, in the context of the first direction 220-b, the first UE 115-a is a transmitter and the second UE 115-b is a receiver. Conversely, in the second direction 220-b, the second base station 105-b may transmit a communication to the second UE 115-b, the second UE 115-b may transmit a communication to the first UE 115-a, and the first UE 115-a may transmit a communication to the first base station 105-a. As such, in the context of the second direction 220-b, the second UE 115-b is a transmitter and the first UE 115-a is a receiver.

Each of the first UE 115-a and the second UE 115-b may be configured with one or more DRX configurations. For example, as shown in FIG. 2, the first UE 115-a may be configured with a downlink DRX configuration (e.g., Uu DRX configuration 225-a) and a sidelink DRX configuration 230-a. Similarly, the second UE 115-a may be configured with a downlink DRX configuration (e.g., Uu DRX configuration 225-b) and a sidelink DRX configuration 230-b.

For the purposes of the present disclosure, the term "downlink DRX configuration" may refer to any DRX configuration which facilitates reception of downlink communications during active periods of the respective DRX configuration. In this regard, the term "downlink DRX configuration" may be understood as including "Uu DRX configurations" which enable downlink and uplink communications between a UE 115 and a base station 105 during active periods of the Uu DRX configuration. Accordingly, for the purposes of the present disclosure, the terms "downlink DRX configuration" and "Uu DRX configuration" may be used synonymously, unless noted otherwise herein.

Each of the DRX configurations 225, 230 may include active durations 235 and inactive durations 240 which enable UEs 115 to communicate during active durations 235, and go to "sleep" or otherwise enter low-power states during inactive durations 240. For example, the Uu DRX configuration 225-a at the first UE 115-a may include active durations 235 and inactive durations 240, where the first UE 115-a is able to communicate with the first base station 105-a during the active durations 235 (e.g., receive downlink communications, transmit uplink communications), and enter a low-power state (e.g., refrain from monitoring for downlink communications) during the inactive durations 240. Similarly, the sidelink DRX configuration 230-a at the first UE 115-a may include active durations 235 and inactive durations 240, where the first UE 115-a is able to communicate with other UEs 115 (e.g., the second UE 115-b) during the active durations 235 (e.g., receive/transmit sidelink communications), and enter a low-power state (e.g., refrain from monitoring for sidelink communications) during the inactive durations 240.

Moreover, for the purposes of the present disclosure, DRX configurations may be said to be "aligned" if active durations of the respective DRX configurations are at least partially overlapping in the time domain. In this regard, a first DRX configuration may be said to be "aligned" with a second DRX configuration if active durations of the first DRX configuration completely or partially overlap in the time domain with active durations of the second DRX configuration. For example, the Uu DRX configuration 225-a and the sidelink DRX configuration 230 at the first UE 115-a may be said to be aligned in that the active durations 235 in the respective DRX configurations are at least partially overlapping in time.

Tx UEs 115 and Rx UEs 115 within the wireless communications system 200 may operate in an RRC connected mode of operation, an RRC inactive mode of operation, and/or an RRC idle mode of operation. For at least sidelink receive UEs 115 in an RRC connected mode of operation, the alignment of Uu DRX configurations 225 and sidelink DRX configurations 230 may be up to the respective base station 105. In other words, the first base station 105-a may be responsible for alignment of the Uu DRX configuration 225-a and the sidelink DRX configuration 230-a at the first UE 115-a, where the second base station 105-b may be responsible for alignment of the Uu DRX configuration 225-b and the sidelink DRX configuration 230-b at the second UE 115-b. Further, in the context of Mode 1 scheduling for the sidelink communication link 210, the alignment of a Uu DRX configuration 225 at a Tx UE 115 and a sidelink DRX configuration 230 of a Rx UE 115 may be considered.

As noted previously herein, there are different types of alignment between DRX configurations at a respective UE 115, and across UEs 115. Type 1 alignment exists when there is alignment between a Uu DRX configuration 225 at a Tx UE 115 and a sidelink DRX configuration 230 at an Rx UE 115. Comparatively, Type 2 alignment exists when there is alignment between a Uu DRX configuration 225 at an Rx UE 115 and a sidelink DRX configuration 230 at a Tx UE 115. Type 1 DRX alignment is required only when a Tx UE 115 is operating in Mode 1, as the Tx UE 115 receives sidelink grant information and data from a respective base station 105 via a Uu communication link 205 during active durations 235 of the Uu DRX configuration 225, and forwards information to an Rx UE 115. in such cases, Type 1 alignment requires the Rx UE 115 to monitor the sidelink channel (e.g., communication link 210) when the Tx UE 115 starts transmitting. Comparatively, if a Tx UE 115 operates in Mode 2, the Tx UE 115 does not receive SL grant information or data from the respective base station 105. As such, there is no need for Type alignment in cases where the communication link 210 is operated in accordance with Mode 2 scheduling.

In order to improve power savings at the UEs 115-a, 115-b and facilitate communications between the respective wireless devices, DRX alignment across the respective DRX configurations 225, 230 may be required in both the first direction 220-a and the second direction 220-b. DRX alignment in the first direction 220-a may exist when there is alignment between the Uu DRX configuration 225-a at the first UE 115-a and the sidelink DRX configuration 230-b at the second UE 115-b, as well as alignment between the Uu DRX configuration 225-b and the sidelink DRX configuration 225-b at the second UE 115-b. Comparatively, DRX alignment in the second direction 220-b may exist when there is alignment between the Uu DRX configuration 225-b at the second UE 115-b and the sidelink DRX configuration 230-a at the first UE 115-a, as well as alignment between the Uu DRX configuration 225-a and the sidelink DRX configuration 225-a at the first UE 115-a.

In other words, Type 1 DRX alignment includes alignment of a Uu DRX configuration 225 and a sidelink DRX configuration 230 for the Rx UE 115 (where the Rx UE 115 is the second UE 115-b in the first direction 220-a, and the first UE 115-a in the second direction 220-b). If the Rx UE 115 is RRC connected mode, the Uu DRX configuration 225 may include a timer-based connected DRX (C-DRX) configuration, and if the Rx UE 115 is in an RRC inactive/idle mode, the Uu DRX configuration 225 may include a paging based inactive DRX (I-DRX) configuration. Comparatively, Type 2 DRX alignment includes alignment of a sidelink DRX configuration 230 at the RX UE 115 and a Uu DRX configuration 225 at the Tx UE 115. In such cases, if the Tx UE 115 is RRC connected mode, the Uu DRX configuration 225 is timer-based C-DRX, and if the Tx UE 115 is RRC inactive/idle mode, there is no need to make Type 2 alignment, as the Tx UE 115 does not receive any sidelink grant information from the base station 105 and operated in Mode 2.

When considering DRX alignment in both directions (e.g., first direction 220-a, second direction 220-b), complete alignment may be achieved if the Uu DRX configurations 225-a, 225-b and the sidelink DRX configurations 230-a, 230-b across both the first and second UEs 115-a, 115-b are all aligned. Once again, active durations 235 within two DRX configurations need not be exactly overlapping in the time domain for the two DRX configurations to be "aligned." In this regard, DRX configurations may not be exactly the same to be aligned, but rather the active durations 235 may be appropriately aligned with appropriate offsets between the active durations 235. As such, the wireless communications system 200 may allow and support full overlapping and partial overlapping between Uu DRX configurations 225 and sidelink DRX configurations 230 in the time domain.

In order to achieve DRX alignment in both directions, some wireless communications systems have attempted to utilize independent DRX alignment techniques. In the context of independent DRX alignment techniques, base stations 105 may set Uu DRX configurations 225 and sidelink DRX configurations 230 for UEs 115 connected to the respective base station 105 based on DRX configurations at other UEs 115. In other words, each base station 105 may act independently when attempting to align DRX configurations of connected UEs 115 to DRX configurations at other UEs 115. However, independent DRX configurations may not always result in aligned DRX configurations.

For example, in the context of independent DRX alignment techniques, the first base station 105-a may set the Uu DRX configuration 225-a and/or the sidelink DRX configuration 230-a at the first UE 115-a based on the Uu DRX configuration 225-b and/or the sidelink DRX configuration 230-b at the second UE 115-b. Similarly, the second base station 105-b may set the Uu DRX configuration 225-b and/or the sidelink DRX configuration 230-b at the second UE 115-a based on the Uu DRX configuration 225-a and/or the sidelink DRX configuration 230-a at the first UE 115-a. The independent actions of the base stations 105-a, 105-b may therefore act as "ships passing in the night," and may fail to properly align the DRX configurations at the respective UEs 115. In particular, such independent DRX alignment techniques may essentially cause the UEs 115-a, 115-b to flip-flop DRX configurations in an attempt to match one another. Multiple attempts at DRX alignment using such techniques may still fail to result in proper DRX alignment (e.g., failure to converge DRX configurations), leading to decreased power savings at the UEs 115, and increased latency of wireless communications.

Accordingly, some aspects of the present disclosure are directed, to techniques for bi-directional DRX alignment. In the context of bi-directional DRX alignment, DRX configurations are aligned in one direction first, and then DRX configurations in the reverse direction are aligned based on the previously-determined DRX configurations. For example, in the context of bi-directional DRX alignment, DRX configurations in the first direction 220-a may be made first (e.g., align Uu DRX configuration 225-a of first UE 115-a and sidelink DRX configuration 230-b of second UE 115-b, align sidelink DRX configuration 230-b and Uu DRX configuration 225-b of second UE 115-b). Subsequently, DRX configurations in the second direction 220-b may be aligned based on the previously-determined DRX configurations (e.g., align Uu DRX configuration 225-b of second UE 115-b and sidelink DRX configuration 230-a of first UE 115-a, align sidelink DRX configuration 230-a and Uu DRX configuration 225-a of first UE 115-a).

In some aspects, for bi-directional DRX alignment, one of the first or second base stations 105-a, 105-b may serve as a "master" base station 105 which aligns the DRX configurations in one direction that will be used for DRX alignment in the reverse direction. In some aspects, the non-master base station 105 may be configured to align DRX configurations in the reverse direction based on DRX configurations determined by the master base station 105 in the original direction. In other words, the non-master base station 105 may be unable to adjust, override, or otherwise alter DRX configurations determined by the master base station 105.

For example, in cases where the first base station 105-a includes a master base station 105-a, the first base station 105-a may establish DRX alignment in the first direction 220-a. In this example, the DRX configurations 225, 230 determined by the first base station 105-a (e.g., master base station 105) in the first direction 220-a may be used by the second base station 105-b (e.g., non-master base station 105) as inputs for performing the DRX alignment in the second direction 220-b. In particular, the DRX configurations 225, 230 made by master base station 105-a for the first direction 220-a may be fixed (e.g., unable to be changed) during the DRX alignment procedure performed by the second base station 105-b in the second direction 220-b. In the end, the bi-directional DRX techniques described herein may result in alignment across the Uu DRX configurations 225-a, 225-b as well as the sidelink DRX configurations 230-a, 230-b. In some aspects, the sequence of DRX alignments may be selected based on quality of service (QoS) requirements at the respective UEs 115-a, 115-b, based on negotiation between the UEs 115 and/or between the base stations 105, or any combination thereof.

Bi-directional DRX alignment techniques described herein may ensure convergence of DRX alignment in both directions 220, as the DRX configurations 225, 230 determined by the master base station 105 for the original direction 220 will not be changed by the non-master base station 105 when setting DRX configurations 225, 230 in the reverse direction 220. As such, bi-directional DRX alignment techniques described herein may guarantee that sequential DRX alignment achieves both types of DRX alignments (e.g., Type 1 alignment, Type 2 alignment) for both UEs 115-a, 115-b at the same time (e.g., ensures UE1 Uu DRX=UE2 SL DRX=UE2 Uu DRX, and UE2 Uu DRX=UE1 SL DRX=UE1 Uu DRX). The sequential configuration steps associated with bi-directional DRX alignment techniques described herein may result in lower signaling overhead as compared to independent DRX alignment techniques, but may result in comparatively higher latency for DRX alignment.

For bi-directional DRX alignment techniques described herein, the determination as to which base station 105 (e.g., first base station 105-a, second base station 105-b) will serve as the master base station 105 may be performed in a number of ways. In some implementations, the master base station 105 may be determined based on competition between the base stations 105-a, 105-b, negotiation between the base stations 105-a, 105-b, negotiation between the UEs 115-a, 115-b (e.g., based on identities of the UEs 115, based on QoS requirements of traffic at the UEs 115), or any combination thereof.

Bi-directional DRX alignment techniques will be described in further detail herein with respect to FIG. 3.

In some cases, DRX alignment techniques may be more efficient with ensuring DRX alignment across UEs 115. For example, in cases in which the wireless communications system 200 includes large quantities of UEs 115, each respective UE 115 may be connected to multiple other UEs 115, and may act as both a Tx UE 115 and an Rx UE 115 depending on the direction 220. Moreover, each UE 115 may be connected to one or more different base stations 105. In such cases, bi-directional DRX alignment procedures may be performed separately (independently) for each respective UE pair. Such independent bi-directional DRX configurations may be time consuming and result in increased signaling overhead. Moreover, in cases with large quantities of UEs 115, DRX configurations determined for some UE pairs may cause the base stations 105 to be unable to reconcile and align DRX configurations at other UE pairs.

Accordingly, some aspects of the present disclosure are directed to centralized DRX alignment techniques. Centralized DRX alignment techniques may be used in some scenarios in which bi-directional DRX alignment may be inefficient, such as in cases with large quantities of UEs 115.

In the context of centralized DRX alignment, a base station 105 may serve as a master base station 105, and may gather assistance information from UEs 115 and other non-master base stations 105 in order to perform global optimization for DRX alignment across each respective UE 115. As compared to bi-directional DRX alignment, the master base station 105 does not set Uu and sidelink DRX configurations for the UEs 115 directly. Rather, the connected base station 105 for each respective UE 115 may prove a set of candidate Uu DRX configurations 225 and candidate sidelink DRX configurations 230 for each respective UE 115 to the master base station 105, where the master base station 105 selects a Uu DRX configuration 225 and a sidelink DRX configuration 230 for each respective UE 115 from the sets of candidate DRX configurations for each respective UE 115. In the context of centralized DRX alignment procedures, the alignment of C-DRX configurations may be prioritized (e.g., performed prior to) over the alignment of I-DRX configurations at each respective UE 115.

Moreover, as compared to the bi-directional DRX alignment process in which the master base station 105 is determined based on competition and/or negotiation between base stations 105 and/or UEs 115, the master base station 105 may be pre-configured for centralized DRX alignment procedures. In some cases, the master base station 105 for centralized DRX alignment may be selected based on pre-configuration provided by network operator. For example, in some cases, base stations 105 may be deployed within the wireless communications system 200 such that each respective geographical coverage area includes a single master base station 105. In some cases, pre-configuration of master base stations 105 may reduce control signaling overhead associated with processes used to determine a master base station 105.

For example, in some cases, a master base station 105 (e.g., a base station 105 other than the first and second base stations 105-a, 105-b) may serve as a master base station 105 for a centralized DRX alignment procedure. In this example, the master base station 105 may aggregate "candidate" Uu and sidelink DRX configurations for the first UE 115-a and the second UE 115-b. The master base station 105 may aggregate candidate DRX configurations for each respective UE 115-a, 115-b through assistance information for each respective UE 115-a, 115-b. Assistance information for each respective UE 115-a, 115-b may be collected from the base stations 105-a, 105-b via an Xn interface between the master base station 105 and the respective base stations 105-a, 105-b in cases where the UEs 115-a, 115-b are communicatively coupled to the base stations 105-a, 105-b. In other cases, assistance information may be collected through relay UEs 115 (e.g., UEs 115-a, 115-b) through a Uu interface between the relay UEs 115 and the master base station (e.g., if a remote UE 115 has no connection with the first or second base stations 105-a, 105-b).

Continuing with the same example, the master base station 105 may select a Uu DRX configuration 225 and a sidelink DRX configuration 230 for each of the first UE 115-a and the second UE 115-b from the sets of candidate DRX configurations for each respective UE 115-a, 115-b. In particular, the master base station 105 may select the DRX configurations for each respective UE 115-a, 115-b in order to ensure DRX alignment across the respective UEs 115-, 115-b (e.g., ensure Type 1 and Type 2 DRX alignment). In this regard, the master base station 105 aggregates assistance information from the respective UEs 115-a, 115-b, and determines Uu and sidelink DRX configurations for each UE 115-a, 115-b such that Uu and sidelink DRX configurations are aligned at each respective UE 115-a, 115-b, as well as aligned across UEs 115-a, 115-b.

In some aspects, when selecting DRX configurations at each of the respective UEs 115-a, 115-b, the master base station 105 may consider information regarding exiting sidelink connections for each of the UEs 115-a, 115-b (e.g., sidelink connections between the first UE 115-a and other UEs 115, sidelink connections between the second UE 115-b and other UEs 115). Information associated with existing sidelink connections may be conveyed to the master base station 105 via assistance information messages (e.g., along with sets of candidate DRX configurations).

For example, information associated with existing sidelink connections for the first UE 115-a may be conveyed to the master base station 105 (e.g., via the first UE 115-a, via the first base station 105-a) as a list or table which lists information associated with each existing sidelink connection at the first UE 115-a. For instance, if the first UE 115-a is connected to three other peer UEs 115 (e.g., UE1, UE2, UE3), assistance information (e.g., Assistance Info 1) transmitted from the first UE 115-a to the first base station 105-a (for relay to the master base station 105) may be illustrated in Table 1 below:

TABLE 1

Assistance Information 1 From UE to gNB; Existing Sidelink Connections

| sl-Connection-List:: = SEQUENCE { | | | | |
|---|---|---|---|---|
| UE1: ue-Identity1 | sl-Pathloss1 | sl-drxConfig1 | drxConfig1 | sl-Connection-List1 |
| UE2: ue-Identity2 | sl-Pathloss2 | sl-drxConfig2 | drxConfig2 | sl-Connection-List2 |
| UE3: ue-Identity3 | sl-Pathloss3 | sl-drxConfig3 | drxConfig3 | sl-Connection-List3 |
| . . . } | | | | | where the parameter "ue-Identity" indicates the identity of the peer UE 115 connected to the first UE 115-a, "sl-Pathloss" indicates sidelink pathloss between the first UE 115-a and the peer UE 115, "sl-drxConfig" indicates the existing sidelink DRX configuration at the first UE 115-a for communications with the respective peer UE 115, "drxConfig" indicates the existing Uu DRX configuration (e.g., I-DRX or C-DRX) of the peer UE 115, and "sl-Connection-List" indicates existing sidelink connections of the respective peer UE 115 (as peer UE 115 may also need to report its existing sidelink connections through a relay UE 115).

Similarly, assistance information transmitted from the respective base stations 105-a, 105-b to the master base station 105 may also be used by the master base station 105 when selecting DRX configurations at each of the respective UEs 115-a, 115-b. For example, if the first base station 105-a is connected to three UEs 115 (e.g., UE1, UE2, UE3), assistance information (e.g., Assistance Info 2) transmitted from the first base station 105-a to the master base station 105 may be illustrated in Table 2 below:

TABLE 2

Assistance Information 2 From gNB to Master gNB; Existing Uu Connections

Uu-Connection-List:: = SEQUENCE {
| | | | | |
|---|---|---|---|---|
| UE1: ue-Identity1 | Pathloss1 | sl-drxConfig1 | drxConfig1 | sl-Connection-List1 |
| UE2: ue-Identity2 | Pathloss2 | sl-drxConfig2 | drxConfig2 | sl-Connection-List2 |
| UE3: ue-Identity3 | Pathloss3 | sl-drxConfig3 | drxConfig3 | sl-Connection-List3 |

. . . } where the parameter "ue-Identity" indicates the identity of the connected UE 115 connected to the first base station 105-a, "sl-Pathloss" indicates Uu pathloss between the first base station 105-a and the connected UE 115, "sl-drxConfig" indicates the existing sidelink DRX configuration at the connected UE 115, "drxConfig" indicates the existing Uu DRX configuration (e.g., I-DRX or C-DRX) of the connected UE 115, and "sl-Connection-List" indicates existing sidelink connections of the respective connected UE 115 (optional, as the connected UE 115 may not have any existing sidelink connections).

The assistance information associated with existing sidelink connections illustrated in Table 1, the assistance information associated with connected UEs 115 illustrated in Table 2, and candidate Uu/sidelink DRX configurations may all be used by the master base station 105 when selecting a Uu DRX configuration 225 and a sidelink DRX configuration 230 at each respective UE 115-a, 115-b.

Centralized DRX alignment techniques will be described in further detail herein with respect to FIG. 4-6.

Techniques described herein may facilitate alignment of active durations of DRX configurations at each respective UE 115-a, 115-b, as well as alignment of active durations of DRX configurations across the respective UEs 115-a, 115-b. In this regard, aspects of the present disclosure may improve Type 1 alignment of Uu DRX configurations 225 and sidelink DRX configurations 230 at the UEs 115-a, 115-b, which may reduce power consumption at the UEs 115-a, 115-b, improve battery life, and improve overall user experience. Moreover, aspects of the present disclosure may improve Type 2 alignment of sidelink DRX configurations across the UEs 115-a, 115-b, which may facilitate improved communications between the UEs 115-a, 115-b, reduce latency of sidelink communications, and lead to a more efficient use of resources within the wireless communications system 200.

Figure 3:
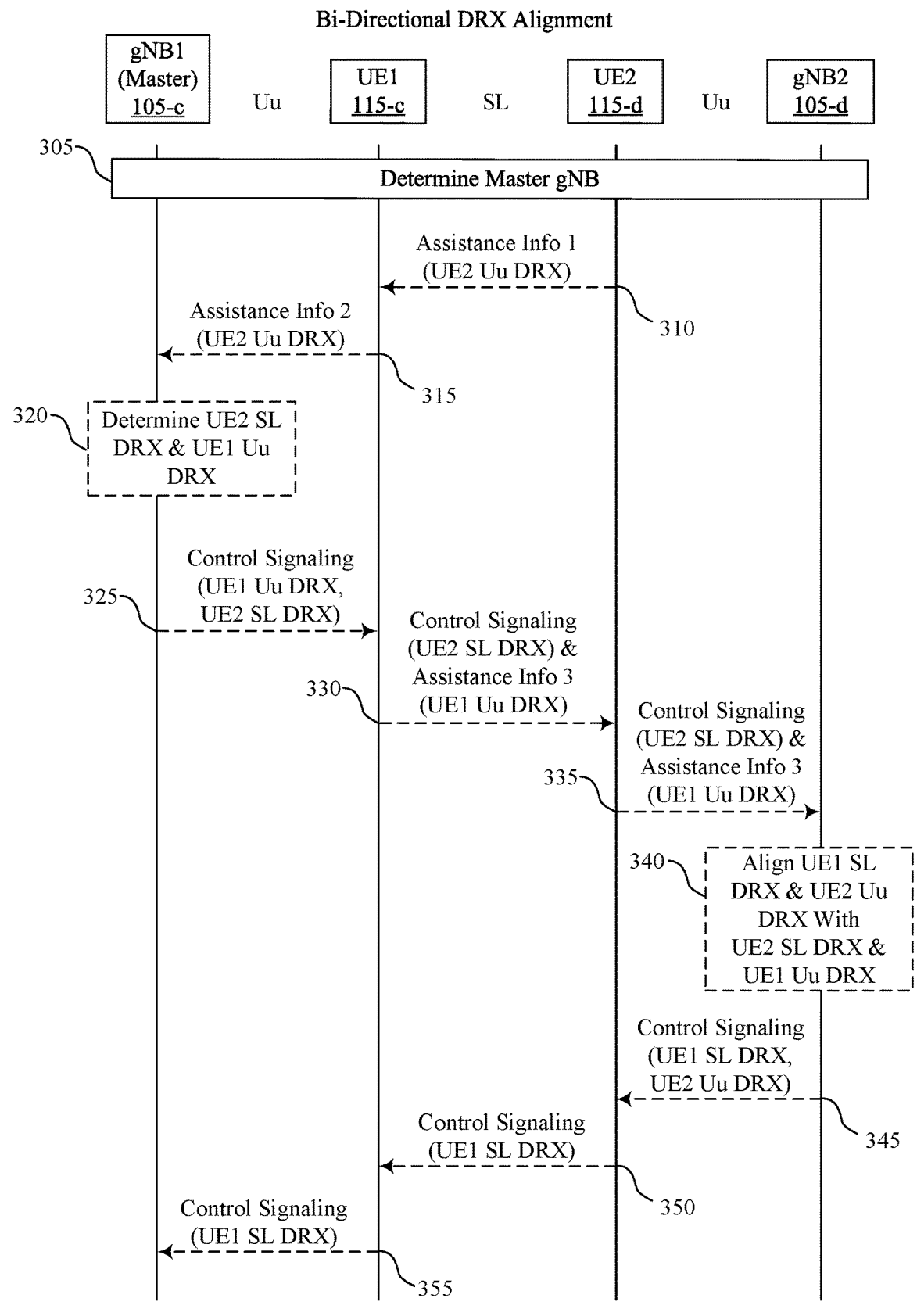
FIG. 3 illustrates an example of a process flow that supports DRX alignment in accordance with aspects of the present disclosure.

FIG. 3 illustrates an example of a process flow 300 that supports DRX alignment in accordance with aspects of the present disclosure. In some examples, process flow 300 may implement, or be implemented by, aspects of wireless communications systems 100, wireless communications systems 200, or both. For example, the process flow 300 may illustrate a bi-directional DRX alignment process, as described with reference to FIGS. 1-2.

In some cases, process flow 300 may include a first UE 115-c, a second UE 115-d, a first base station 105-c (e.g., master base station 105-c), and a second base station 105-d (e.g., non-master base station 105-d), which may be examples of corresponding devices as described herein. For example, the first UE 115-c and the second UE 115-d illustrated in FIG. 3 may include examples of the first UE 115-a and the second UE 115-b, respectively, as illustrated in FIG. 2. Similarly, the first base station 105-c and the second base station 105-d illustrated in FIG. 3 may include examples of the first base station 105-a and the second base station 105-d, respectively, as illustrated in FIG. 2. In this regard, the first base station 105-c may serve as a master base station 105 for the bi-directional DRX alignment procedure illustrated in FIG. 3.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the first base station 105-c, the second base station 105-d, the first UE 115-c, the second UE 115-d, or any combination thereof, may determine which base station 105-c, 105-d, will serve as the master base station 105 for the bi-directional DRX alignment procedure.

As noted previously herein, the determination as to which base station 105 (e.g., first base station 105-c, second base station 105-d) will serve as the master base station 105 may be performed in a number of ways. In some implementations, the master base station 105 may be determined based on competition between the base stations 105-c, 105-d, negotiation between the base stations 105-c, 105-d, negotiation between the UEs 115-c, 115-d (e.g., based on identities of the UEs 115, based on QoS requirements of traffic at the UEs 115), or any combination thereof. In some aspects, the master base station 1-05 may be associated with the pair of UEs 115 (e.g., UE pair). The UE pair (e.g., first UE 115-c, second UE 115-d) may be the subject of the bi-directional DRX alignment procedure. If the master base station 105 is associated with a UE pair, the two base stations 105-c, 105-d may need to decide which base station 105 will serve as the mater base station 105 whenever there is a new UE pair between them. Conversely, if the master base station 105 is not associated with a UE pair, but for all the UE pairs between the base stations 105-c, 105-d, the bi-directional DRX alignment techniques described herein may reduce signaling overhead used for deciding the master base station 105.

For example, in some cases, the master base station 105 may be determined/selected based on competition between the base stations 105-c, 105-d. For instance, in some implementations, the first base station 105 which sends out a base station coordination setup message (e.g., gNB coordination setup message) may become the master base station 105. In such cases, the gNB coordination setup message may be transmitted via an Xn interface between the respective base stations 105-*c*, 105-*d*. In some aspects, the gNB coordination setup message may include identities of UEs 115 which are communicatively coupled to each respective base station 105 (e.g., gNB coordination setup message includes the ue-Identity of the first UE 115-*c* and the second UE 115-*d* to identity the UE pair for the DRX alignment procedure).

In other cases, the master base station 105 may be decided/selected based on negotiation between the base stations 105-*c*, 105-*d*. Negotiation between the base stations 105 may be based on one or more parameters associated with the base stations 105 themselves, UEs 115 connected to the respective base stations 105, or both. Parameters/information exchanged between the base stations 105 for determining the master base station 105 may include, but is not limited to, identities of connected UEs 115 (e.g., ue-Identity of the UEs 115-*c*, 115-*d*), QoS requirements of traffic at the respective UEs 115-*c*, 115-*d*, quantities of sidelink connections at each respective UE 115 (e.g., how many other UEs 115 each of the respective UE 115-*c*, 115-*d* is connected to), priorities associated with the connected UEs 115-*c*, 115-*d*, traffic loads at the respective base stations 105-*d*, and the like.

For example, the base stations 105-*c*, 105-*d* may exchange information associated with the base stations 105 and/or user information of UEs 115 communicatively coupled to the respective base station 105. In some cases, both base stations 105 may exchange information with one another, and may both decide which base station 105 will serve as the master by comparing the exchanged information. In other cases, the first base station 105-*c* may transmit information to the second base station 105-*d*, where the second base station 105-*d* will determine which will serve as the master (or vice versa). For instance, the first base station 105-*c* may transmit user information to the second base station 105-*d*, where the second base station 105-*d* determines the master base station 105 based on the user information of the UEs 115-*c*, 115-*d*, and transmits a message (e.g., gNB coordination setup message) back to the first base station 105-*c* with an indication as to which base station 105-*c*, 105-*d* will serve as the master. In either case, the first base station 105-*c*, the second base station 105-*c*, or both, may determine/select the master base station 105 based on the user information (e.g., parameters associated with the base stations 105 and/or connected UEs 115), and may notify the other base station 105 about the decision (e.g., via the Xn interface).

The determination of the master base station 105 may be made based on one or more of the parameters exchanged between the base stations 105. For instance, the base station 105-*c*, 105-*d* which is selected to be the master base station 105 may be the base station 105 connected to the UE 115-*c*, 115-*d* with the higher priority, the base station 105 with the higher QoS requirements, the base station 105 connected to the UE 115-*c*, 115-*d* with the higher QoS requirements, the base station 105 connected to the UE 115-*c*, 115-*d* with the larger quantity of existing sidelink connections, the base station 105 with the greater traffic load, or any combination thereof. In some cases, if the first UE 115-*c* has more sidelink connections, it is easier for the first base station 105-*c* to perform global DRX optimization and serve as the master. Moreover, if a base station 105 has a heavy traffic load, it may be harder for the respective base station 1-05 to adjust DRX alignment, and may therefore be better for the respective base station 105 to serve as the master and adjust DRX configurations based on its current status.

In additional or alternative implementations, the master base station 105 may be determined based on negotiation between the UEs 115-*c*, 115-*d*. For example, in some cases, the UEs 115-*c*, 115-*d* may exchange user information with one another, such as during a connection establishment procedure for establishing the sidelink connection between the UEs 115-*c*, 115-*d*. The user information exchanged between the UEs 115-*c*, 115-*d* may include identities of the UEs 115 (e.g., ue-Identities), QoS requirements of traffic at the UEs 115, priorities of the UEs, quantities of sidelink connections at each of the respective UEs 115, or any combination thereof. For example, the UEs 115 may select the master base station 105 as the base station 105 which is connected to the UE 115 with the smaller ue-Identity (e.g., smaller Layer 2 identifier), the UE 115 with the higher QoS requirements, or both.

Continuing with the example above, upon exchanging user information, the first UE 115-*c*, the second UE 115-*d*, or both, may determine/select which base station 105 will serve as the master base station 105 based on the exchanged user information. The first UE 115-*c*, the second UE 115-*d*, or both, may then transmit an indication to the master bases station 105 (e.g., first base station 105-*c* or second base station 105-*d*) to indicate that the respective base station 105 has been selected as the master (e.g., via a gNB coordination setup message over the Uu interface). In some cases, the UEs 115 may additionally inform the non-master base station 105 regarding the selected master base station 105. Additionally, or alternatively, the non-master base station 105 may determine that the other base station 105 was selected as the master based on an absence of an indication received from the UEs 115.

As shown in FIG. 3, the first base station 105-*c* may be selected as the master base station 105 at 305. Upon determining/selecting the master base station 105 at 305, the process flow 300 may then proceed to step 310.

At 310, the second UE 115-*d* may transmit assistance information (e.g., Assistance Info 1) to the first UE 115-*c*. The assistance information may include the current Uu DRX configuration at the second UE 115-*d*. Additionally, or alternatively, the assistance information at 310 may include existing sidelink DRX configurations at the second UE 115-*d* which are configured for sidelink communications with other UEs 115, preferred sidelink DRX configurations at the second UE 115-*d*, and the like.

At 315, the first UE 115-*c* may transmit assistance information (e.g., Assistance Info 2) to the master base station 105-*c*. The first UE 115-*c* may transmit the assistance information at 315 based on receiving the assistance information from the second UE 115-*d* at 310. For example, in some cases, the first UE 115-*c* may forward or relay the assistance information received from the second UE 115-*d* to the master base station 105-*c* (e.g., Assistance Info 2=Assistance Info 1). In some aspects, the first UE 115-*c* may append its existing sidelink DRX configurations with other UEs 115 to the assistance information forwarded/relayed to the master base station 105-*c* at 315.

At 320, the master base station 105-*c* may determine a sidelink DRX configuration at the second UE 115-*d* and a downlink DRX configuration (e.g., Uu DRX configuration) at the first UE 115-*c*. The master base station 105-*c* may determine the DRX configurations at 320 based on being selected as the master base station 105 at 305, receiving the assistance information at 315, or both.

For example, in some aspects, the master base station 105-*c* may determine the DRX configurations at 320 based on the Uu DRX configuration at the second UE 115-*d*, which is indicated via the assistance information at 315. In particular, the master base station 105-*c* may select/adjust the DRX configurations at 320 such that the sidelink DRX configuration at the second UE 115-*d* and the Uu DRX configuration at the first UE 115-*c* are aligned with the Uu DRX configuration at the second UE 115-*d* (e.g., such that active durations of each of the respective DRX configurations at least partially overlap in the time domain).

At 325, the master base station 105-*c* may transmit control signaling to the first UE 115-*c*. In some aspects, the control signaling at 325 may include an indication of the Uu DRX configuration at the first UE 115-*c* and the sidelink DRX configuration at the second UE 115-*d*, which were determined at 320. In this regard, the master base station 105-*c* may transmit the control signaling at 325 based on being selected as the master base station 105 at 305, receiving the assistance information at 315, determining the DRX configurations at 320, or any combination thereof. The control signaling may include, but is not limited to, an RRC message, a DCI message, a MAC-CE message, or any combination thereof.

In cases where the Uu DRX configuration is not updated/changed at the first UE 115-*c*, the control signaling may omit an indication of the Uu DRX configuration at the first UE 115-*c*. In some aspects, the control signaling may include an indication for the first UE 115-*c* to relay/forward the information included within the control signaling to the second UE 115-*d*, the second base station 105-*d*, or both.

At 330, the first UE 115-*c* may transmit (e.g., relay, forward) one or more sidelink messages to the second UE 115-*d*. In particular, the first UE 115-*c* may forward control signaling including an indication of the sidelink DRX configuration at the second UE 115-*d*, and assistance information (e.g., Assistance Info 3) including an indication of the Uu DRX configuration at the first UE 115-*c*. In this regard, the first UE 115-*c* may transmit the information to the second UE 115-*d* at 330 based on receiving the control signaling at 325. In some aspects, the one or more sidelink messages at 330 may include an indication for the second UE 115-*d* to relay/forward information included within the one or more sidelink messages (e.g., UE2 sidelink DRX configuration, UE1 Uu DRX configuration) to the second base station 105-*d*.

In some implementations, there may be an offset between the Uu DRX configuration at the first UE 115-*c* and the sidelink DRX configuration at the second UE 115-*d*, even in cases where the respective DRX configurations are aligned (e.g., at least partially overlapping in time). In such cases, the second base station 105-*d* (e.g., non-master base station 105-*d*) may require the Uu DRX configuration at the first UE 115-*c* in order to determine the alignment between the Uu DRX configuration and the sidelink DRX configuration at the first UE 115-*c*. In some cases, the indication of the Uu DRX configuration included within the assistance information (e.g., Assistance Info 3) may not include or indicate the entire Uu DRX configuration, but may rather indicate only parameters related to alignment between the respective DRX configurations, such as a slot offset (e.g., sl-drx-Slot-Offset, sl-drx-Start-Offset), the DRX cycle (e.g., sl-drx-Cycle), and the like.

At 335, the second UE 115-*d* may transmit (e.g., relay, forward) one or more uplink messages to the second base station 105-*d*. In particular, the second UE 115-*d* may forward control signaling including an indication of the sidelink DRX configuration at the second UE 115-*d*, and assistance information (e.g., Assistance Info 3) including an indication of the Uu DRX configuration at the first UE 115-*c*. In this regard, the second UE 115-*d* may transmit the information to the second base station 105-*d* at 335 based on receiving the one or more sidelink messages at 330.

At 340, the second base station 105-*d* (e.g., non-master base station 105-*d*) may determine a sidelink DRX configuration at the first UE 115-*c* and a Uu DRX configuration at the second UE 115-*d*. In particular, the second base station 105-*d* may determine/select the DRX configurations at 340 such that the sidelink DRX configuration at the first UE 115-*c* and the Uu DRX configuration at the second UE 115-*d* are aligned with the sidelink DRX configuration at the second UE 115-*d* and the Uu DRX configuration at the first UE 115-*c*. In this regard, the second base station 105-*d* may determine the DRX configurations at 335 based on receiving the information from the second UE 115-*d* at 335 (e.g., based on the control signaling and Assistance Info 3 at 335).

In cases where all DRX configurations (e.g., sidelink DRX configurations, Uu DRX configurations) at the respective UEs 115-*c*, 115-*d* are exactly aligned at step 340 (e.g., active durations are completely overlapping in the time domain), then the first UE 115-*c* may be configured to derive its sidelink DRX configuration from the control signaling received at 325. In such cases, the steps and signaling illustrated in steps 345-355 may be omitted. Conversely, in cases where all DRX configurations at the respective UEs 115-*c*, 115-*d* are not exactly aligned at step 340 (e.g., only partial overlap of active durations), then the process flow 300 may proceed to step 345.

At 345, the second base station 105-*d* may transmit control signaling to the second UE 115-*d*. In some aspects, the control signaling at 345 may include an indication of the sidelink DRX configuration at the first UE 115-*c* and the Uu DRX configuration at the second UE 115-*d*, which were determined at 340. In this regard, the second base station 105-*d* may transmit the control signaling at 345 based on receiving information from the second UE 115-*d* at 335, determining the DRX configurations at 340, or both. The control signaling may include, but is not limited to, an RRC message, a DCI message, a MAC-CE message, or any combination thereof. In some aspects, the control signaling may include an indication for the second UE 115-*d* to relay/forward the information included within the control signaling to the first UE 115-*c*, the master base station 105-*c*, or both.

At 350, the second UE 115-*d* may transmit (e.g., relay, forward) one or more sidelink messages to the first UE 115-*c*. In particular, the second UE 115-*d* may forward an indication of the sidelink DRX configuration at the first UE 115-*c*. In this regard, the second UE 115-*d* may transmit the information to the first UE 115-*c* at 350 based on receiving the control signaling at 345. In some aspects, the one or more sidelink messages at 350 may include an indication for the first UE 115-*c* to relay/forward information included within the one or more sidelink messages (e.g., UE1 sidelink DRX configuration) to the master base station 105-*c*.

At 355, the first UE 115-*c* may transmit (e.g., relay, forward) one or more uplink messages to the master base station 105-*c*. In particular, the first UE 115-*c* may forward an indication of the sidelink DRX configuration at the first UE 115-*c*. In this regard, the first UE 115-*d* may transmit the information to the master base station 105-*c* at 355 based on receiving the one or more sidelink messages from the second UE 115-*d* at 350.

Upon receiving indications of the respective Uu and sidelink DRX configurations, each of the UEs 115-*c*, 115-*d* may communicate with the respective base stations 105-*c*, 105-*d* and one another using the indicated Uu and sidelink DRX configurations.

Taken together, the bi-directional DRX alignment procedure illustrated in FIG. 3 may be used to align DRX configurations at the respective UEs 115-c, 115-d in a first direction, and subsequently in the reverse direction. Moreover, by first establishing DRX configurations at the UEs 115 in the first direction, and subsequently using previously-determined DRX configurations to align the DRX configurations in the reverse direction, the bi-directional DRX alignment techniques illustrated in FIG. 3 may ensure convergence and alignment of the sidelink DRX configurations and the Uu DRX configurations at the UEs 115-c, 115-d.

Figure 4:
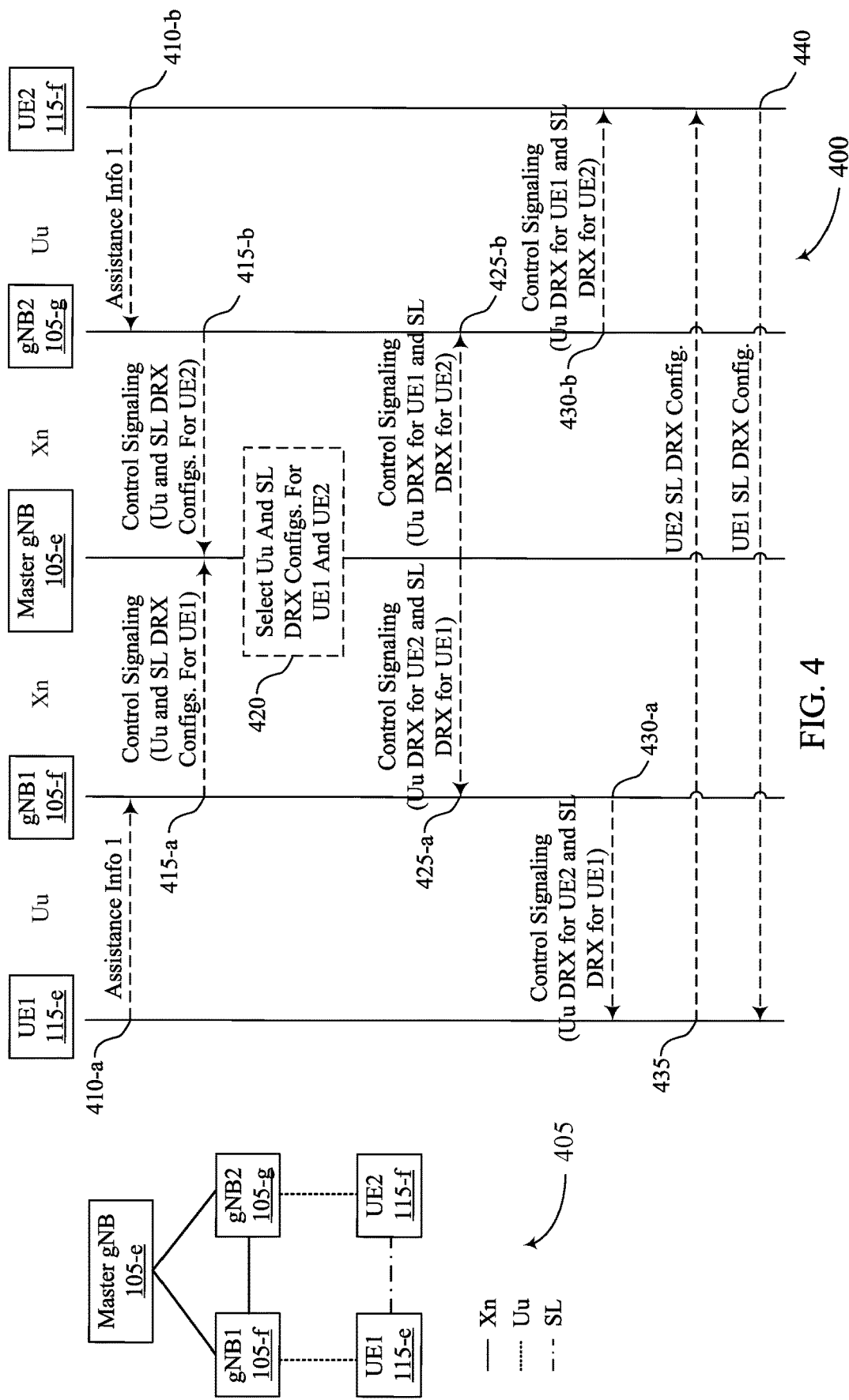
FIG. 4 illustrates an example of a process flow that supports DRX alignment in accordance with aspects of the present disclosure.

FIG. 4 illustrates an example of a process flow 400 that supports DRX alignment in accordance with aspects of the present disclosure. In some examples, process flow 400 may implement, or be implemented by, aspects of wireless communications systems 100, wireless communications systems 200, or both. For example, the process flow 400 may illustrate a centralized DRX alignment process, as described with reference to FIGS. 1-2.

In some cases, process flow 400 may include a first UE 115-e, a second UE 115-f, a master base station 105-e, a first base station 105-f (e.g., first non-master base station 105-f), and a second base station 105-g (e.g., second non-master base station 105-g), which may be examples of corresponding devices as described herein. For example, the first UE 115-e and the second UE 115-f illustrated in FIG. 4 may include examples of the first UE 115-a and the second UE 115-b, respectively, as illustrated in FIG. 2.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

In some implementations, the master base station 105-e may be pre-configured to serve as a master base station 105 within a wireless communications system. In some cases, base stations 105 may be deployed within a wireless communications system such that each respective geographical coverage area includes a single master base station 105-e. In this regard, as opposed to the bi-directional DRX alignment process illustrated in FIG. 3 in which the wireless devices may have to determine which base station 105 will serve as the master base station 105, the master base station 105-e may be pre-configured as the master for the centralized DRX alignment process illustrated in FIG. 4.

The process flow 400 illustrates example signaling for a centralized DRX alignment procedure in the context of the system diagram 405 illustrated in FIG. 4. As shown in the system diagram 405, the first and second UEs 115-e, 115-f may be communicatively coupled to each other via a sidelink connection, and may be communicatively coupled to the first and second base stations 105-f, 105-g, respectively, via Uu interfaces. Moreover, the first and second base stations 105-g, 105-g may be communicatively coupled to one another and the master base station 105-e via Xn interfaces. As such, each of the first and second base stations 105-f, 105-g may be able to directly communicate with the master base station 105-e to facilitate the centralized DRX alignment procedure illustrated in FIG. 4.

At 410-a and 410-b, the first UE 115-e and the second UE 115-f may transmit assistance information (e.g., Assistance Info 1) to the first base station 105-f and the second base station 105-g, respectively. The assistance information transmitted at 410-a and 410-b may include existing sidelink DRX configurations at the respective UEs 115-e, 115-f with other Tx UEs 115. In some aspects, assistance information transmitted at 410-a and 410-b may include indications of candidate Uu DRX configurations and/or candidate sidelink DRX configurations at the respective UEs 115-e, 115-f. Moreover, in some implementations, the assistance information at 410-a and 410-b may include information associated with existing sidelink connections at the respective UEs 115-e, 115-f, as illustrated in Table 1 above.

At 415-a and 415-b, the first base station 105-f and the second base station 105-g may transmit control signaling to the master base station 105-e. The control signaling at 415-a and 415-b may include indications of candidate Uu and sidelink DRX configurations for each of the respective UEs 115-e, 115-f connected to the respective first and second base stations 105-f, 105-g. The assistance information may be conveyed via any type of uplink message, including Uplink Control Information (UCI) messages, MAC-CE messages, RRC messages, and the like.

For example, the first base station 105-f may determine a set of available/candidate Uu DRX configurations and available/candidate sidelink DRX configurations for the first UE 115-e based on the Assistance Info 1 received from the first UE 115-e (e.g., based on existing Uu and sidelink DRX configurations at the first UE 115-e), and may transmit an indication of the available/candidate Uu and sidelink DRX configurations to the master base station as Assistance Info 2. In some implementations, the control information (e.g., assistance information) at 415-a and 415-b may include information associated with connected UEs 115 at the respective base stations 105-f, 105-g, as illustrated in Table 2 above. In some aspects, the assistance information at 410-a and 410-b may include indications for the respective base stations 105-g, 105-g to forward/relay the assistance information to the master base station 105-e.

At 420, the master base station 105-e may select Uu and sidelink DRX configurations for each of the first UE 115-e and the second UE 115-f. In particular, the master base station 105-e may select Uu and sidelink DRX configurations for each of the respective UEs 115-e, 115-f from the set of candidate DRX configurations for each respective UE 115-e, 115-f such that the selected Uu and sidelink DRX configurations at the respective UEs 115-e, 115-f are aligned. Stated differently, the master base station 105-e may be configured to optimize DRX alignment globally across the UEs 115-e, 115-f to ensure Type 1 and Type 2 DRX alignment. In this regard, the master base station 105-e may select the DRX configurations at 420 based on receiving the control signaling (e.g., Assistance Info 2) from the respective base stations 105-f, 105-g at 415-a and 415-b.

In some aspects, the master base station 105-e may select the Uu DRX configurations and the sidelink DRX configurations at the respective UEs 115-e, 115-f based on information associated with existing sidelink connections at the respective UEs 115 (as shown in Table 1 above), based on information associated with connected UEs 115 connected to the respective base stations 105 (as shown in Table 2 above), or both.

At 425-a and 425-b, the master base station 105-e may transmit control signaling to the first base station 105-f, and the second base station 105-g, respectively, where the control signaling includes indications of the Uu and sidelink DRX configurations which were selected at 420. For example, the control signaling at 425-a may include an indication of the Uu DRX configuration for the second UE 115-*f* and the sidelink DRX configuration for the first UE 115-*e* which were selected by the master base station 105-*e* at 420. Conversely, by way of another example, the control signaling at 425-*b* may include an indication of the Uu DRX configuration for the first UE 115-*e* and the sidelink DRX configuration for the second UE 115-*f* which were selected by the master base station 105-*e* at 420. In some aspects, the control signaling at 425-*a* and 425-*b* may include indications for the respective base stations 105-*g*, 105-*g* to forward/relay the indications of the selected DRX configurations to the UEs 115-*e*, 115-*f*.

As shown in FIG. 4, the sidelink DRX configurations for each respective UE 115-*e*, 115-*f* may not be sent to the respective UE 115-*e*, 115-*f* with which they are associated, but rather to the respective peer UE 115. This is because sidelink DRX configurations adopt Tx UE-centric DRX configurations. The sidelink DRX configurations for the respective UEs 115 will be passed back and forth between the respective UEs 115-*e*, 115-*f*, as will be described in further detail with respect to steps 435 and 440.

At 430-*a* and 430-*b*, the first base station 105-*f* and the second base station 105-*g* may transmit control signaling to the first UE 115-*e* and the second UE 115-*f*, respectively, where the control signaling includes indications of the Uu and sidelink DRX configurations which were selected at 420. For example, the control signaling at 430-*a* may include an indication of the Uu DRX configuration for the second UE 115-*f* and the sidelink DRX configuration for the first UE 115-*e* which were selected by the master base station 105-*e* at 420. Conversely, by way of another example, the control signaling at 430-*b* may include an indication of the Uu DRX configuration for the first UE 115-*e* and the sidelink DRX configuration for the second UE 115-*f* which were selected by the master base station 105-*e* at 420.

The base stations 105-*f*, 115-*g* may transmit the control signaling at 430-*a* and 430-*b* based on receiving the control signaling from the master base station 105-*e* at 425-*a* and 435-*b*, respectively. The control signaling at 430-*a* and 430-*b* may be conveyed via any type of downlink message, including DCI messages, MAC-CE messages, RRC messages, and the like.

At 435, the first UE 115-*e* may transmit, to the second UE 115-*f*, an indication of the sidelink DRX configuration at the second UE 115-*f*. Similarly, at 440, the second UE 115-*f* may transmit, to the first UE 115-*e*, an indication of the sidelink DRX configuration at the first UE 115-*e*. The UEs 115-*e*, 115-*f* may transmit the indications of the sidelink DRX configurations based on receiving the control signaling at 430-*a* and 430-*b*.

In some cases, as shown in FIG. 4, the UEs 115-*e*, 115-*f* may transmit indications of sidelink DRX configurations directly to one another via sidelink messages. However, in additional or alternative implementations, indications of sidelink DRX configurations at 435 and 440 may be exchanged using one or more relay wireless devices between the respective UEs 115-*e*, 115-*f* (e.g., relays through the base stations 105-*f*, 105-*g*, other UEs 115).

Upon receiving indications of the respective Uu and sidelink DRX configurations, each of the UEs 115-*e*, 115-*f* may communicate with the respective base stations 105-*f*, 105-*g* and one another using the indicated Uu and sidelink DRX configurations.

As noted previously herein, process flow 400 illustrates example signaling for a centralized DRX alignment procedure in which the base stations 105-*f*, 105-*g* are coupled to the master base station 105-*e* via Xn interfaces as shown in the system diagram 405. However, there may be cases in which the first base station 105-*f* and/or the second base station 105-*g* are missing Xn interface connections with the master base station 105-*e*, and therefore may be unable to directly communicate with the master base station 105-*e*. In such cases, the exchange of information may between the master base station 105-*e* and the respective wireless devices may need to be adjusted. This may be further illustrated in FIGS. 5 and 6.

Figure 5:
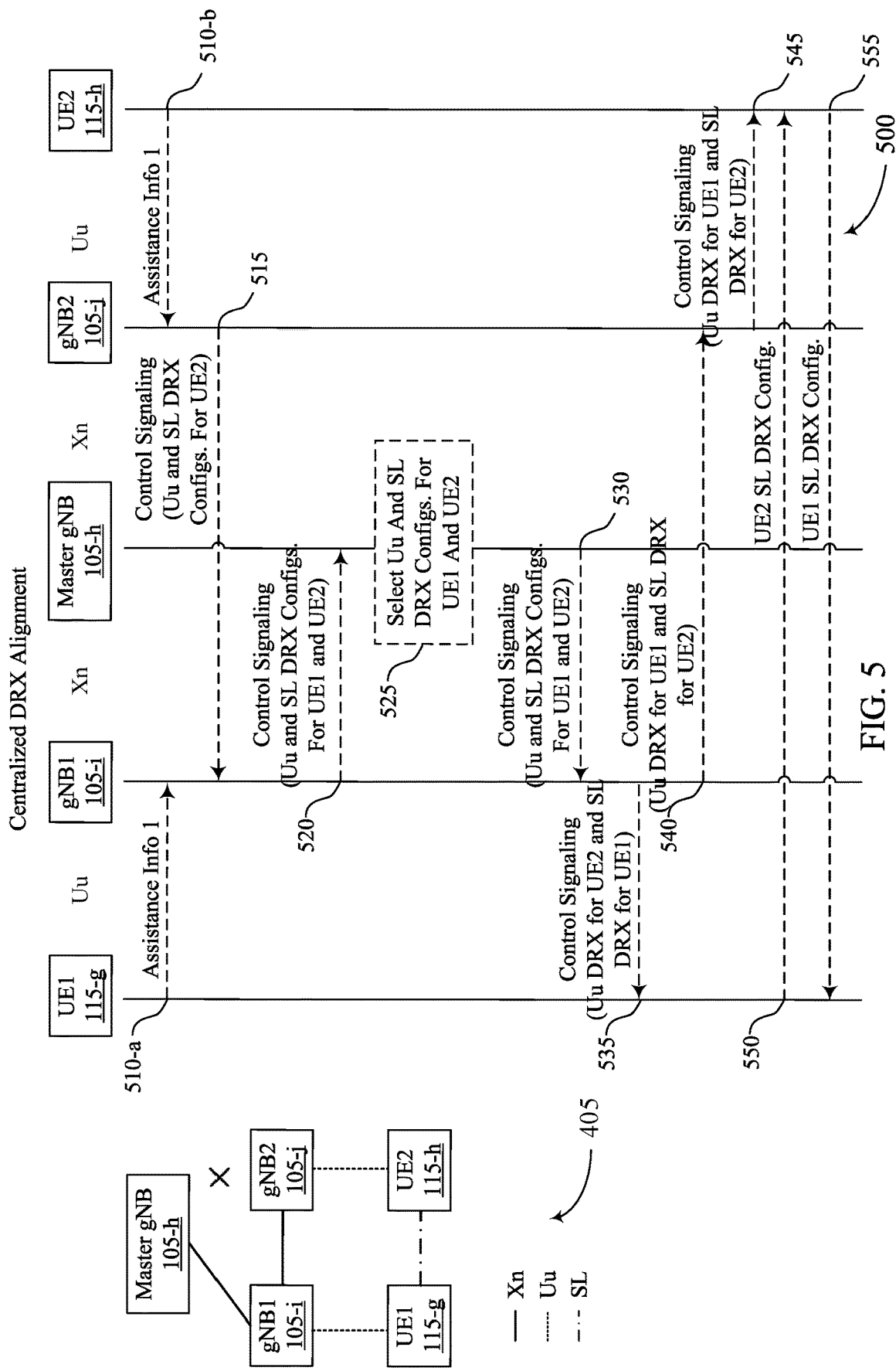
FIG. 5 illustrates an example of a process flow that supports DRX alignment in accordance with aspects of the present disclosure.

FIG. 5 illustrates an example of a process flow 500 that supports DRX alignment in accordance with aspects of the present disclosure. In some examples, process flow 500 may implement, or be implemented by, aspects of wireless communications systems 100, wireless communications systems 200, or both. For example, the process flow 500 may illustrate a centralized DRX alignment process, as described with reference to FIGS. 1-2.

In some cases, process flow 500 may include a first UE 115-*g*, a second UE 115-*h*, a master base station 105-*h*, a first base station 105-*i* (e.g., first non-master base station 105-*i*), and a second base station 105-*j* (e.g., second non-master base station 105-*j*), which may be examples of corresponding devices as described herein. For example, the first UE 115-*g* and the second UE 115-*h* illustrated in FIG. 5 may include examples of the first UE 115-*e* and the second UE 115-*f*, respectively, as illustrated in FIG. 4. Similarly, the master base station 105-*h*, the first base station 105-*i*, and the second base station 105-*j* illustrated in FIG. 5 may include examples of the master base station 105-*e*, the first base station 105-*f*, and the second base station 105-*g*, respectively, as illustrated in FIG. 4. In some implementations, the master base station 105-*h* may be pre-configured to serve as a master base station 105 within a wireless communications system.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

The process flow 500 illustrates example signaling for a centralized DRX alignment procedure in the context of the system diagram 505 illustrated in FIG. 5. As shown in the system diagram 505, the first and second UEs 115-*g*, 115-*h* may be communicatively coupled to each other via a sidelink connection, and may be communicatively coupled to the first and second base stations 105-*i*, 105-*j*, respectively, via Uu interfaces. The first and second base stations 105-*i*, 105-*j* may be communicatively coupled to one another via an Xn interface, and the first base station 105-*i* may be communicatively coupled to the master base station 105-*h* via an Xn interface. However, as shown in the system diagram 505, the second base station 105-*j* may not be coupled to the master base station 105-*h* via an Xn interface. As such, the second base station 105-*j* may be unable to communicate directly with the master base station 105-*h*.

Accordingly, due to the missing Xn connection between the second base station 105-*j* and the master base station 105-*e*, information transmitted by the second base station 105-*j* for facilitating the centralized DRX alignment procedure may be routed through another wireless device, such as the first base station 105-*a*. In other words, the communications at steps 415-*b* and 425-*b* in FIG. 4 may instead be relayed/forwarded between the second base station 105-*j* and the master base station 105-*h* via the first base station 105-*i*.

For example, at 510-*a* and 510-*b*, the first UE 115-*g* and the second UE 115-*h* may transmit assistance information (e.g., Assistance Info 1) to the first base station 105-*i* and the second base station 105-*j*, respectively. The assistance information transmitted at 510-*a* and 510-*b* may include existing sidelink DRX configurations at the respective UEs 115-*g*, 115-*h* with other Tx UEs 115. In some aspects, assistance information transmitted at 510-*a* and 510-*b* may include indications of candidate Uu DRX configurations and/or candidate sidelink DRX configurations at the respective UEs 115-*g*, 115-*h*. Moreover, in some implementations, the assistance information at 510-*a* and 510-*b* may include information associated with existing sidelink connections at the respective UEs 115-*g*, 115-*h*, as illustrated in Table 1 above.

At 515, the second base station 105-*j* may transmit control signaling to the first base station 105-*i*, where the control signaling includes an indication of candidate Uu and sidelink DRX configurations for the second UE 115-*h*. For example, the second base station 105-*j* may determine a set of available/candidate Uu DRX configurations and available/candidate sidelink DRX configurations for the second UE 115-*h* based on the Assistance Info 1 received from the second UE 115-*h* (e.g., based on existing Uu and sidelink DRX configurations at the second UE 115-*h*), and may transmit an indication of the available/candidate Uu and sidelink DRX configurations to the first base station 105-*i*. In some implementations, the control information (e.g., assistance information) at 515 may include information associated with connected UEs 115 at the second base stations 105-*h*, as illustrated in Table 2 above. In some aspects, the control signaling/assistance information at 515 may include an indication for the first base station 105-*i* to forward/relay the assistance information to the master base station 105-*h*.

At 520, the first base station 105-*i* may transmit control signaling to the master base station 105-*h*, where the control signaling includes indications of candidate Uu and sidelink DRX configurations for each of the respective UEs 115-*g*, 115-*h* connected to the respective first and second base stations 105-*i*, 105-*j*. In some cases, the first base station 105-*i* may transmit the control signaling/assistance information at 520 based on receiving the assistance information at 510-*a*, receiving the control signaling/assistance information at 520, or any combination thereof. For example, in some implementations, the first base station 105-*i* may relay/forward the information received at 510-*a* and 515 to the master base station 105-*h*, including indications of candidate Uu and sidelink configurations at the respective UEs 115-*g*, 115-*h*. In some implementations, the control information (e.g., assistance information) at 525 may include information associated with connected UEs 115 at the respective base stations 105-*i*, 105-*j*, as illustrated in Table 2 above.

At 525, the master base station 105-*h* may select Uu and sidelink DRX configurations for each of the first UE 115-*g* and the second UE 115-*h*. In particular, the master base station 105-*h* may select Uu and sidelink DRX configurations for each of the respective UEs 115-*g*, 115-*h* from the set of candidate DRX configurations for each respective UE 115-*g*, 115-*h* such that the selected Uu and sidelink DRX configurations at the respective UEs 115-*g*, 115-*h* are aligned. Stated differently, the master base station 105-*h* may be configured to optimize DRX alignment globally across the UEs 115-*g*, 115-*h* to ensure Type 1 and Type 2 DRX alignment. In this regard, the master base station 105-*h* may select the DRX configurations at 525 based on receiving the control signaling (e.g., Assistance Info 2) from the first base station 105-*i* at 520.

In some aspects, the master base station 105-*h* may select the Uu DRX configurations and the sidelink DRX configurations at the respective UEs 115-*g*, 115-*h* based on information associated with existing sidelink connections at the respective UEs 115 (as shown in Table 1 above), based on information associated with connected UEs 115 connected to the respective base stations 105 (as shown in Table 2 above), or both.

At 530, the master base station 105-*h* may transmit control signaling to the first base station 105-*i*, where the control signaling includes indications of the Uu and sidelink DRX configurations which were selected at 525. In some aspects, the control signaling at 530 may include an indication for the first base station 105-*i* to forward/relay the indications of the selected DRX configurations to the first UE 115-*g* and the second base station 105-*j*.

At 535, the first base station 105-*i* may transmit control signaling to the first UE 115-*g*, where the control signaling includes indications of the Uu and sidelink DRX configurations which were selected at 525. For example, the control signaling at 535 may include an indication of the Uu DRX configuration for the second UE 115-*h* and the sidelink DRX configuration for the first UE 115-*g* which were selected by the master base station 105-*h* at 525. The first base station 105-I may transmit the control signaling at 535 based on receiving the control signaling from the master base station 105-*h* at 530. The control signaling at 535 may be conveyed via any type of downlink message, including DCI messages, MAC-CE messages, RRC messages, and the like.

At 540, the first base station 105-*i* may transmit control signaling to the second base station 105-*j*, where the control signaling includes indications of the Uu and sidelink DRX configurations which were selected at 525. For example, the control signaling at 540 may include an indication of the Uu DRX configuration for the first UE 115-*g* and the sidelink DRX configuration for the second UE 115-*h* which were selected by the master base station 105-*h* at 525. The first base station 105-I may transmit the control signaling at 535 based on receiving the control signaling from the master base station 105-*h* at 530. Conversely, by way of another example, the control signaling at 430-*b* may include an indication of the Uu DRX configuration for the first UE 115-*g* and the sidelink DRX configuration for the second UE 115-*h* which were selected by the master base station 105-*h* at 525.

At 545, the second base station 105-*j* may relay, to the second UE 115-*h*, the indications of the Uu DRX configuration for the first UE 115-*g* and the sidelink DRX configuration for the second UE 115-*h* which were selected by the master base station 105-*h* at 525. The control signaling at 540 may be conveyed via any type of downlink message, including DCI messages, MAC-CE messages, RRC messages, and the like.

At 550, the first UE 115-*g* may transmit, to the second UE 115-*h*, an indication of the sidelink DRX configuration at the second UE 115-*h*. Similarly, at 555, the second UE 115-*h* may transmit, to the first UE 115-*g*, an indication of the sidelink DRX configuration at the first UE 115-*g*. The UEs 115-*g*, 115-*h* may transmit the indications of the sidelink DRX configurations based on receiving the control signaling at 535 and 545. In some cases, as shown in FIG. 5, the UEs 115-*g*, 115-*h* may transmit indications of sidelink DRX configurations directly to one another via sidelink messages.

However, in additional or alternative implementations, indications of sidelink DRX configurations at 550 and 555 may be exchanged using one or more relay wireless devices between the respective UEs 115-g, 115-h (e.g., relays through the base stations 105-i, 105-j, other UEs 115).

Upon receiving indications of the respective Uu and sidelink DRX configurations, each of the UEs 115-g, 115-h may communicate with the respective base stations 105-i, 105-j and one another using the indicated Uu and sidelink DRX configurations.

Figure 6:
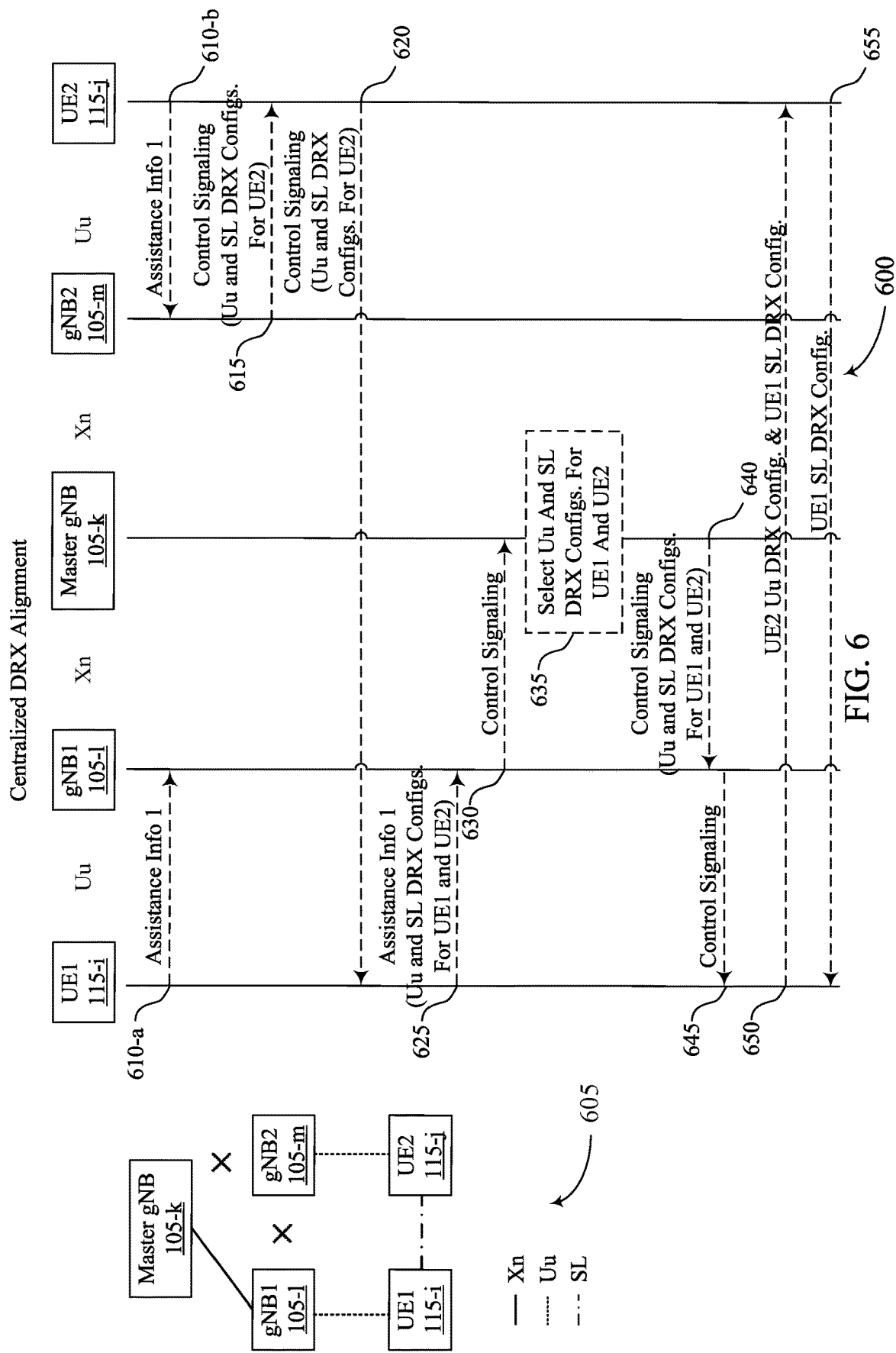
FIG. 6 illustrates an example of a process flow that supports DRX alignment in accordance with aspects of the present disclosure.

FIG. 6 illustrates an example of a process flow 600 that supports DRX alignment in accordance with aspects of the present disclosure. In some examples, process flow 600 may implement, or be implemented by, aspects of wireless communications systems 100, wireless communications systems 200, or both. For example, the process flow 600 may illustrate a centralized DRX alignment process, as described with reference to FIGS. 1-2.

In some cases, process flow 600 may include a first UE 115-i, a second UE 115-j, a master base station 105-k, a first base station 105-1 (e.g., first non-master base station 105-1), and a second base station 105-m (e.g., second non-master base station 105-m), which may be examples of corresponding devices as described herein. For example, the first UE 115-i and the second UE 115-j illustrated in FIG. 6 may include examples of the first UE 115-g and the second UE 115-h, respectively, as illustrated in FIG. 5. Similarly, the master base station 105-k, the first base station 105-1, and the second base station 105-m illustrated in FIG. 6 may include examples of the master base station 105-h, the first base station 105-i, and the second base station 105-j, respectively, as illustrated in FIG. 5. In some implementations, the master base station 105-k may be pre-configured to serve as a master base station 105 within a wireless communications system.

In some examples, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

The process flow 600 illustrates example signaling for a centralized DRX alignment procedure in the context of the system diagram 605 illustrated in FIG. 6. As shown in the system diagram 605, the first and second UEs 115-i, 115-j may be communicatively coupled to each other via a sidelink connection, and may be communicatively coupled to the first and second base stations 105-1, 105-m, respectively, via Uu interfaces. The first and second base stations 105-1, 105-m may be communicatively coupled to one another via an Xn interface, and the first base station 105-1 may be communicatively coupled to the master base station 105-k via an Xn interface. However, as shown in the system diagram 505, the second base station 105-m may not be coupled to the master base station 105-k or the first base station 105-1 via Xn interfaces. As such, the second base station 105-m may be unable to communicate directly with the master base station 105-k.

Accordingly, due to the missing Xn connections between the second base station 105-m, master base station 105-e, and the first base station 105-1, information transmitted by the second base station 105-m for facilitating the centralized DRX alignment procedure may be routed through another wireless device, such as the UEs 115-i, 115-j and the first base station 105-a.

For example, at 610-a and 610-b, the first UE 115-i and the second UE 115-j may transmit assistance information (e.g., Assistance Info 1) to the first base station 105-1 and the second base station 105-m, respectively. The assistance information transmitted at 610-a and 610-b may include existing sidelink DRX configurations at the respective UEs 115-i, 115-j with other Tx UEs 115. In some aspects, assistance information transmitted at 610-a and 610-b may include indications of candidate Uu DRX configurations and/or candidate sidelink DRX configurations at the respective UEs 115-i, 115-j. Moreover, in some implementations, the assistance information at 610-a and 610-b may include information associated with existing sidelink connections at the respective UEs 115-i, 115-j, as illustrated in Table 1 above.

At 615, the second base station 105-m may transmit control signaling to the second UE 115-j, where the control signaling includes an indication of candidate Uu and sidelink DRX configurations for the second UE 115-j. For example, the second base station 105-m may determine a set of available/candidate Uu DRX configurations and available/candidate sidelink DRX configurations for the second UE 115-j based on the Assistance Info 1 received from the second UE 115-j (e.g., based on existing Uu and sidelink DRX configurations at the second UE 115-j), and may transmit an indication of the available/candidate Uu and sidelink DRX configurations to the second UE 115-j. In some implementations, the control information (e.g., assistance information) at 615 may include information associated with connected UEs 115 at the second base stations 105-k, as illustrated in Table 2 above. In some aspects, the control signaling/assistance information at 615 may include an indication for the second UE 115-j to forward/relay the assistance information to the first UE 115-I, the first base station 105-i, and/or the master base station 105-k.

At 620, the second UE 115-j may transmit control signaling to the first base station 115-j, where the control signaling includes indications of candidate Uu and sidelink DRX configurations for the second UE 115-j. In some cases, the second UE 115-j may transmit the control signaling/assistance information at 620 based on transmitting the assistance information at 610-a, receiving the control signaling/assistance information at 615, or any combination thereof. For example, in some implementations, the second UE 115-j may relay/forward the information received at 515 to the first UE 115-i, including indications of candidate Uu and sidelink configurations at the second UE 115-j. In some implementations, the control information (e.g., assistance information) at 525 may include information associated with connected UEs 115 at the second base station 105-m, as illustrated in Table 2 above.

At 625, the first UE 115-i may transmit assistance information (e.g., Assistance Information 1) to the first base station 105-i. In some cases, the first UE 115-i may forward/relay the information received from the second UE 115-j at 620 via the assistance information at 625. In this regard, the assistance information at 625 may include an indication of candidate Uu and sidelink DRX configurations at the second UE 115-i, information associated with connected UEs 115 at the second base station 105-m, or both.

At 630, the first base station 105-1 may transmit control signaling to the master base station 105-k, where the control signaling includes indications of candidate Uu and sidelink DRX configurations for each of the respective UEs 115-i, 115-*j* connected to the respective first and second base stations 105-1, 105-*m*. In some cases, the first base station 105-1 may transmit the control signaling/assistance information at 630 based on receiving the assistance information at 610-*a*, receiving the control signaling/assistance information at 625, or any combination thereof. For example, in some implementations, the first base station 105-1 may relay/forward the information received at 610-*a* and 625 to the master base station 105-*k*, including indications of candidate Uu and sidelink configurations at the respective UEs 115-*i*, 115-*j*. In some implementations, the control information (e.g., assistance information) at 630 may include information associated with connected UEs 115 at the respective base stations 105-1, 105-*m*, as illustrated in Table 2 above.

At 635, the master base station 105-*k* may select Uu and sidelink DRX configurations for each of the first UE 115-*i* and the second UE 115-*j*. In particular, the master base station 105-*k* may select Uu and sidelink DRX configurations for each of the respective UEs 115-*i*, 115-*j* from the set of candidate DRX configurations for each respective UE 115-*i*, 115-*j* such that the selected Uu and sidelink DRX configurations at the respective UEs 115-*i*, 115-*j* are aligned. Stated differently, the master base station 105-*k* may be configured to optimize DRX alignment globally across the UEs 115-*i*, 115-*j* to ensure Type 1 and Type 2 DRX alignment. In this regard, the master base station 105-*k* may select the DRX configurations at 635 based on receiving the control signaling (e.g., Assistance Info 2) from the first base station 105-1 at 630.

In some aspects, the master base station 105-*k* may select the Uu DRX configurations and the sidelink DRX configurations at the respective UEs 115-*i*, 115-*j* based on information associated with existing sidelink connections at the respective UEs 115 (as shown in Table 1 above), based on information associated with connected UEs 115 connected to the respective base stations 105 (as shown in Table 2 above), or both.

At 640, the master base station 105-*k* may transmit control signaling to the first base station 105-1, where the control signaling includes indications of the Uu and sidelink DRX configurations which were selected at 635. In some aspects, the control signaling at 640 may include an indication for the first base station 105-1 to forward/relay the indications of the selected DRX configurations to the first UE 115-*i*, the second UE 115-*j*, the second base station 105-*m*, or any combination thereof.

At 645, the first base station 105-1 may transmit control signaling to the first UE 115-*i*, where the control signaling includes indications of the Uu and sidelink DRX configurations which were selected at 635. For example, the control signaling at 645 may include an indication of the Uu DRX configurations and sidelink DRX configurations for the first and second UEs 115-*i*, 115-*j* which were selected by the master base station 105-*k* at 635. The first base station 105-1 may transmit the control signaling at 645 based on receiving the control signaling from the master base station 105-*k* at 640. The control signaling at 645 may be conveyed via any type of downlink message, including DCI messages, MAC-CE messages, RRC messages, and the like.

At 650, the first UE 115-*i* may transmit, to the second UE 115-*j*, an indication of the Uu DRX configuration at the second UE 115-*j* and the sidelink DRX configuration at the first UE 115-*i*. Similarly, at 655, the second UE 115-*j* may transmit, to the first UE 115-*i*, an indication of the sidelink DRX configuration at the first UE 115-*i*. In some cases, as shown in FIG. 6, the UEs 115-*i*, 115-*j* may transmit indications of sidelink DRX configurations directly to one another via sidelink messages. However, in additional or alternative implementations, indications of sidelink DRX configurations at 650 and 655 may be exchanged using one or more relay wireless devices between the respective UEs 115-*i*, 115-*j* (e.g., relays through the base stations 105-1, 105-*m*, other UEs 115).

Upon receiving indications of the respective Uu and sidelink DRX configurations, each of the UEs 115-*i*, 115-*j* may communicate with the respective base stations 105-1, 105-*m* and one another using the indicated Uu and sidelink DRX configurations.

Figure 7:
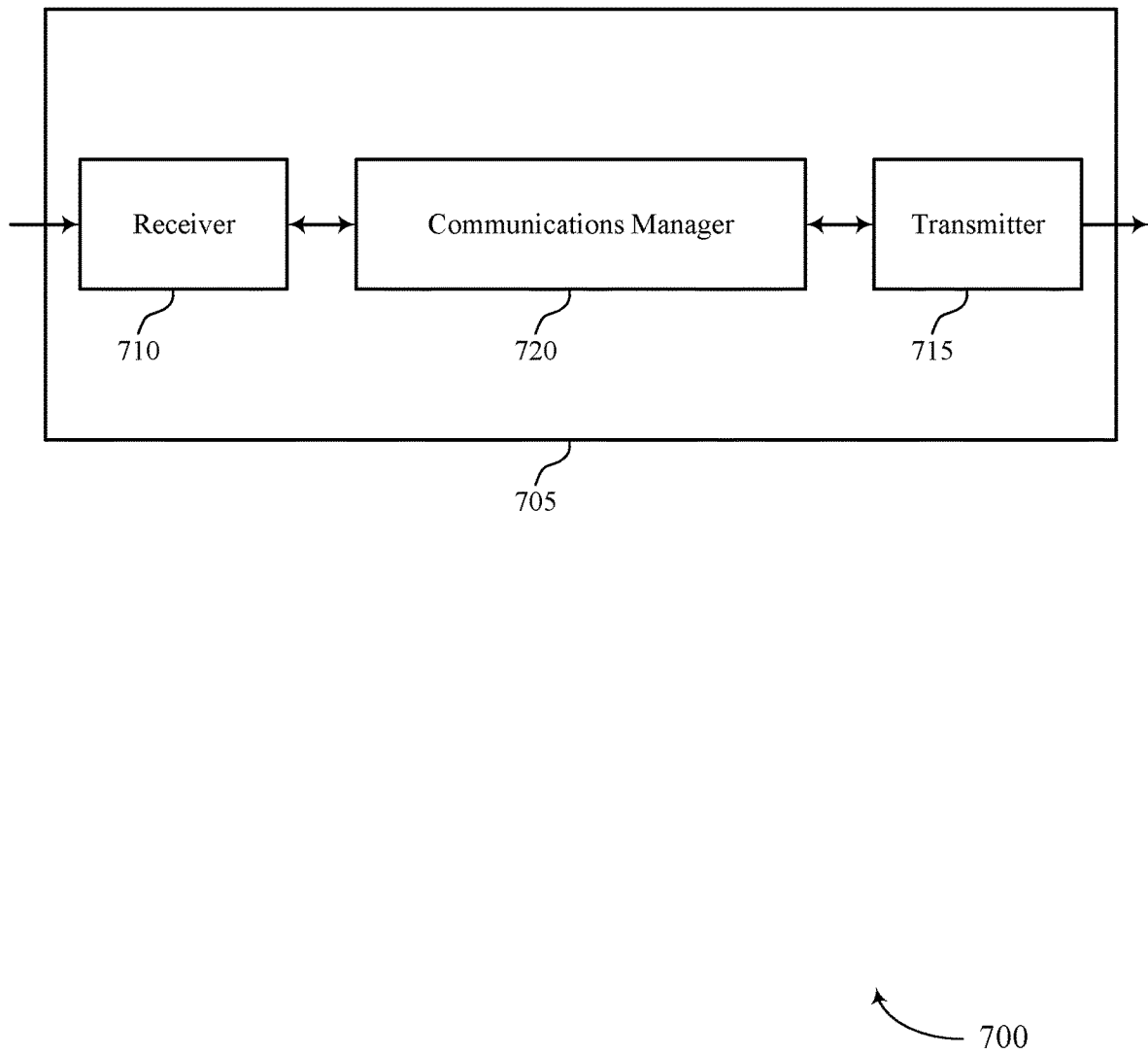
FIGS. 7 and 8 show block diagrams of devices that support DRX alignment in accordance with aspects of the present disclosure.

FIG. 7 shows a block diagram 700 of a device 705 that supports DRX alignment in accordance with aspects of the present disclosure. The device 705 may be an example of aspects of a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to DRX alignment). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to DRX alignment). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of DRX alignment as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first base station (e.g., a base station acting as a master base station) in accordance with examples as disclosed herein. For example, the communications manager 720 may be configured as or otherwise support a means for receiving, from a first UE, first control signaling including an indication of one or more DRX configurations for the first UE, an indication of one or more additional DRX configurations for a second UE in wireless communication with the first UE, or both. The communications manager 720 may be configured as or otherwise support a means for transmitting, to the first UE based on the first control signaling, second control signaling including an indication of a downlink DRX configuration for the first UE, an indication of a sidelink DRX configuration for the second UE, or both, where a first set of active durations associated with the downlink DRX configuration for the first UE at least partially overlap in a time domain with a second set of active durations associated with the sidelink DRX configuration for the second UE based on the first control signaling. The communications manager 720 may be configured as or otherwise support a means for communicating with the first UE in accordance with the downlink DRX configuration at the first UE.

Additionally, or alternatively, the communications manager 720 may support wireless communication at a first base station (e.g., a base station acting as a master base station) in accordance with examples as disclosed herein. For example, the communications manager 720 may be configured as or otherwise support a means for receiving first control signaling including an indication of a first set of candidate downlink DRX configurations and a first set of candidate sidelink DRX configurations associated with a first UE. The communications manager 720 may be configured as or otherwise support a means for receiving, via the first control signaling, second control signaling, or both, an indication of a second set of candidate downlink DRX configurations and a second set of candidate sidelink DRX configurations associated with a second user UE. The communications manager 720 may be configured as or otherwise support a means for transmitting third control signaling including an indication of a first downlink DRX configuration and a first sidelink DRX configuration for the first UE, where the first downlink DRX configuration and the first sidelink DRX configuration are selected from the first set of candidate downlink DRX configurations and the first set of candidate sidelink DRX configurations, respectively, based on the second set of candidate downlink DRX configurations and the second set of candidate sidelink DRX configurations. The communications manager 720 may be configured as or otherwise support a means for transmitting, via the third control signaling, fourth control signaling, or both, an indication of a second downlink DRX configuration and a second sidelink DRX configuration for the second UE, where the second downlink DRX configuration and the second sidelink DRX configuration are selected from the second set of candidate downlink DRX configurations and the second set of candidate sidelink DRX configurations, respectively, based on the first set of candidate downlink DRX configurations and the first set of candidate sidelink DRX configurations, and where active durations of the first and second downlink DRX configurations and the first and second sidelink DRX configurations at least partially overlap in a time domain.

Additionally, or alternatively, the communications manager 720 may support wireless communication at a second base station (e.g., a base station acting as a non-master base station) in accordance with examples as disclosed herein. For example, the communications manager 720 may be configured as or otherwise support a means for receiving, from a second UE, first control signaling including an indication of a sidelink DRX configuration for the second UE, a downlink DRX configuration at a first UE in wireless communication with the second UE, or both. The communications manager 720 may be configured as or otherwise support a means for transmitting, to the second UE based on the first control signaling, second control signaling including an indication of a sidelink DRX configuration for the first UE, a downlink DRX configuration for the second UE, or both, where respective sets of active durations associated with the sidelink DRX configurations and the downlink DRX configurations for the first and second UEs at least partially overlap in a time domain. The communications manager 720 may be configured as or otherwise support a means for communicating with the second UE in accordance with the downlink DRX configuration for the second UE.

Additionally, or alternatively, the communications manager 720 may support wireless communication at a second base station (e.g., a base station acting as a non-master base station) in accordance with examples as disclosed herein. For example, the communications manager 720 may be configured as or otherwise support a means for transmitting, to a first base station, first control signaling including an indication of a first set of candidate downlink DRX configurations and a first set of candidate sidelink DRX configurations associated with a first UE in wireless communication with the second base station. The communications manager 720 may be configured as or otherwise support a means for receiving, based on the control signaling, second control signaling including an indication of a first downlink DRX configuration and a first sidelink DRX configuration for the first UE, where the first downlink DRX configuration and the first sidelink DRX configuration are included in the first set of candidate downlink DRX configurations and the first set of candidate sidelink DRX configurations, respectively. The communications manager 720 may be configured as or otherwise support a means for transmitting, to the first UE based on the second control signaling, third control signaling including an indication of the first downlink DRX configuration and the first sidelink DRX configuration. The communications manager 720 may be configured as or otherwise support a means for communicating with the first UE in accordance with the first downlink DRX configuration for the first UE and based on the third control signaling.

By including or configuring the communications manager 720 in accordance with examples as described herein, the device 705 (e.g., a processor controlling or otherwise coupled to the receiver 710, the transmitter 715, the communications manager 720, or a combination thereof) may support techniques which may facilitate alignment of active durations of DRX configurations at UEs 115, as well as alignment of active durations of DRX configurations across multiple UEs 115. In this regard, aspects of the present disclosure may improve Type 1 alignment of Uu and sidelink DRX configurations within UEs 115, which may reduce power consumption at the UEs 115, improve battery life, and improve overall user experience. Moreover, aspects of the present disclosure may improve Type 2 alignment of sidelink DRX configurations across UEs 115, which may facilitate improved communications between UEs 115, reduce latency of sidelink communications, and lead to a more efficient use of resources within the wireless communications system.

Figure 8:
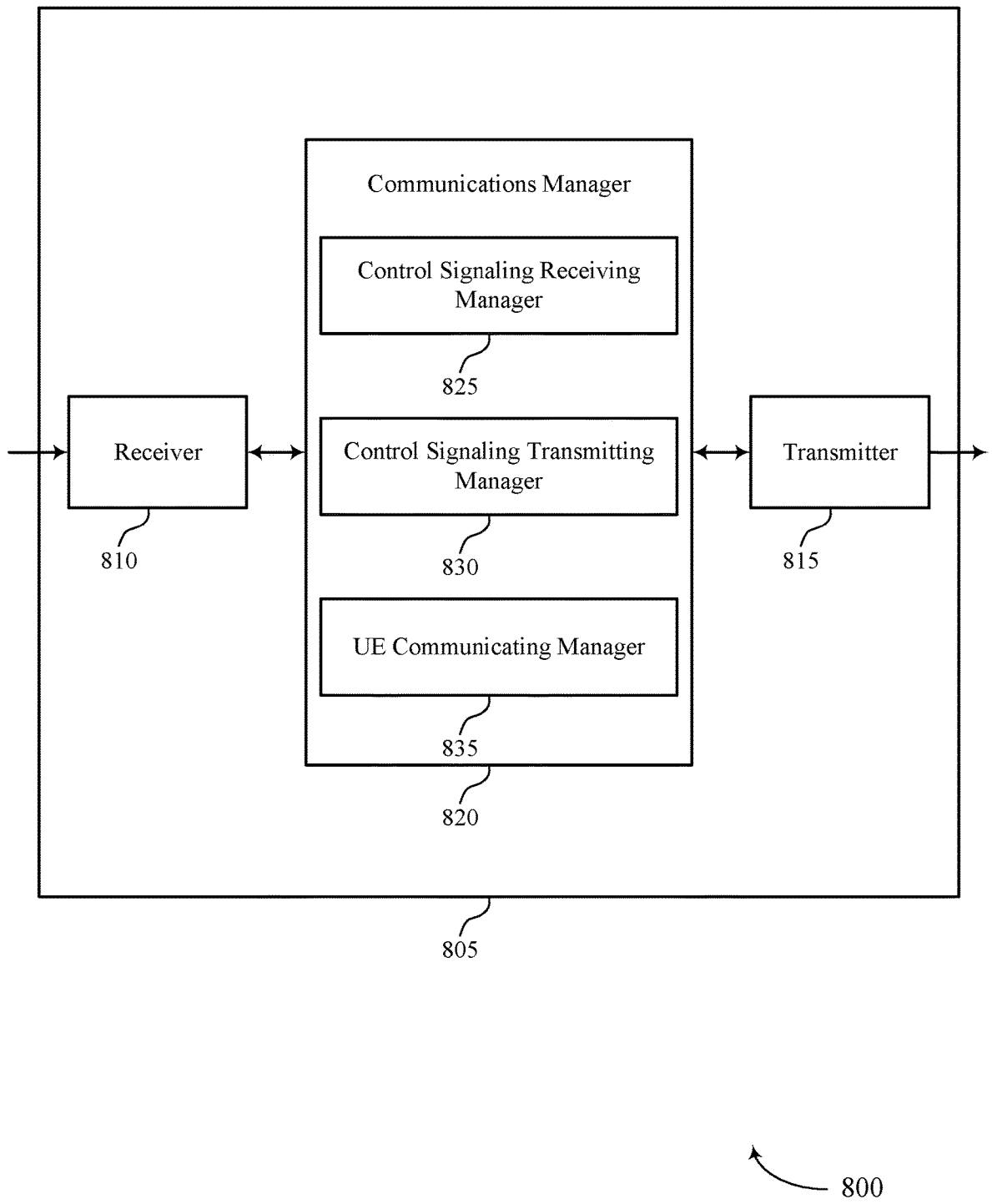

FIG. 8 shows a block diagram 800 of a device 805 that supports DRX alignment in accordance with aspects of the present disclosure. The device 805 may be an example of aspects of a device 705 or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to DRX alignment). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to DRX alignment). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of DRX alignment as described herein. For example, the communications manager 820 may include a control signaling receiving manager 825, a control signaling transmitting manager 830, a UE communicating manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first base station (e.g., a base station acting as a master base station) in accordance with examples as disclosed herein. The control signaling receiving manager 825 may be configured as or otherwise support a means for receiving, from a first UE, first control signaling including an indication of one or more DRX configurations for the first UE, an indication of one or more additional DRX configurations for a second UE in wireless communication with the first UE, or both. The control signaling transmitting manager 830 may be configured as or otherwise support a means for transmitting, to the first UE based on the first control signaling, second control signaling including an indication of a downlink DRX configuration for the first UE, an indication of a sidelink DRX configuration for the second UE, or both, where a first set of active durations associated with the downlink DRX configuration for the first UE at least partially overlap in a time domain with a second set of active durations associated with the sidelink DRX configuration for the second UE based on the first control signaling. The UE communicating manager 835 may be configured as or otherwise support a means for communicating with the first UE in accordance with the downlink DRX configuration at the first UE.

Additionally, or alternatively, the communications manager 820 may support wireless communication at a first base station (e.g., a base station acting as a master base station) in accordance with examples as disclosed herein. The control signaling receiving manager 825 may be configured as or otherwise support a means for receiving first control signaling including an indication of a first set of candidate downlink DRX configurations and a first set of candidate sidelink DRX configurations associated with a first UE. The control signaling receiving manager 825 may be configured as or otherwise support a means for receiving, via the first control signaling, second control signaling, or both, an indication of a second set of candidate downlink DRX configurations and a second set of candidate sidelink DRX configurations associated with a second user UE. The control signaling transmitting manager 830 may be configured as or otherwise support a means for transmitting third control signaling including an indication of a first downlink DRX configuration and a first sidelink DRX configuration for the first UE, where the first downlink DRX configuration and the first sidelink DRX configuration are selected from the first set of candidate downlink DRX configurations and the first set of candidate sidelink DRX configurations, respectively, based on the second set of candidate downlink DRX configurations and the second set of candidate sidelink DRX configurations. The control signaling transmitting manager 830 may be configured as or otherwise support a means for transmitting, via the third control signaling, fourth control signaling, or both, an indication of a second downlink DRX configuration and a second sidelink DRX configuration for the second UE, where the second downlink DRX configuration and the second sidelink DRX configuration are selected from the second set of candidate downlink DRX configurations and the second set of candidate sidelink DRX configurations, respectively, based on the first set of candidate downlink DRX configurations and the first set of candidate sidelink DRX configurations, and where active durations of the first and second downlink DRX configurations and the first and second sidelink DRX configurations at least partially overlap in a time domain.

Additionally, or alternatively, the communications manager 820 may support wireless communication at a second base station (e.g., a base station acting as a non-master base station) in accordance with examples as disclosed herein. The control signaling receiving manager 825 may be configured as or otherwise support a means for receiving, from a second UE, first control signaling including an indication of a sidelink DRX configuration for the second UE, a downlink DRX configuration at a first UE in wireless communication with the second UE, or both. The control signaling transmitting manager 830 may be configured as or otherwise support a means for transmitting, to the second UE based on the first control signaling, second control signaling including an indication of a sidelink DRX configuration for the first UE, a downlink DRX configuration for the second UE, or both, where respective sets of active durations associated with the sidelink DRX configurations and the downlink DRX configurations for the first and second UEs at least partially overlap in a time domain. The UE communicating manager 835 may be configured as or otherwise support a means for communicating with the second UE in accordance with the downlink DRX configuration for the second UE.

Additionally, or alternatively, the communications manager 820 may support wireless communication at a second base station (e.g., a base station acting as a non-master base station) in accordance with examples as disclosed herein. The control signaling transmitting manager 830 may be configured as or otherwise support a means for transmitting, to a first base station, first control signaling including an indication of a first set of candidate downlink DRX configurations and a first set of candidate sidelink DRX configurations associated with a first UE in wireless communication with the second base station. The control signaling receiving manager 825 may be configured as or otherwise support a means for receiving, based on the control signaling, second control signaling including an indication of a first downlink DRX configuration and a first sidelink DRX configuration for the first UE, where the first downlink DRX configuration and the first sidelink DRX configuration are included in the first set of candidate downlink DRX configurations and the first set of candidate sidelink DRX configurations, respectively. The control signaling transmitting manager 830 may be configured as or otherwise support a means for transmitting, to the first UE based on the second control signaling, third control signaling including an indication of the first downlink DRX configuration and the first sidelink DRX configuration. The UE communicating manager 835 may be configured as or otherwise support a means for communicating with the first UE in accordance with the first downlink DRX configuration for the first UE and based on the third control signaling.

Figure 9:
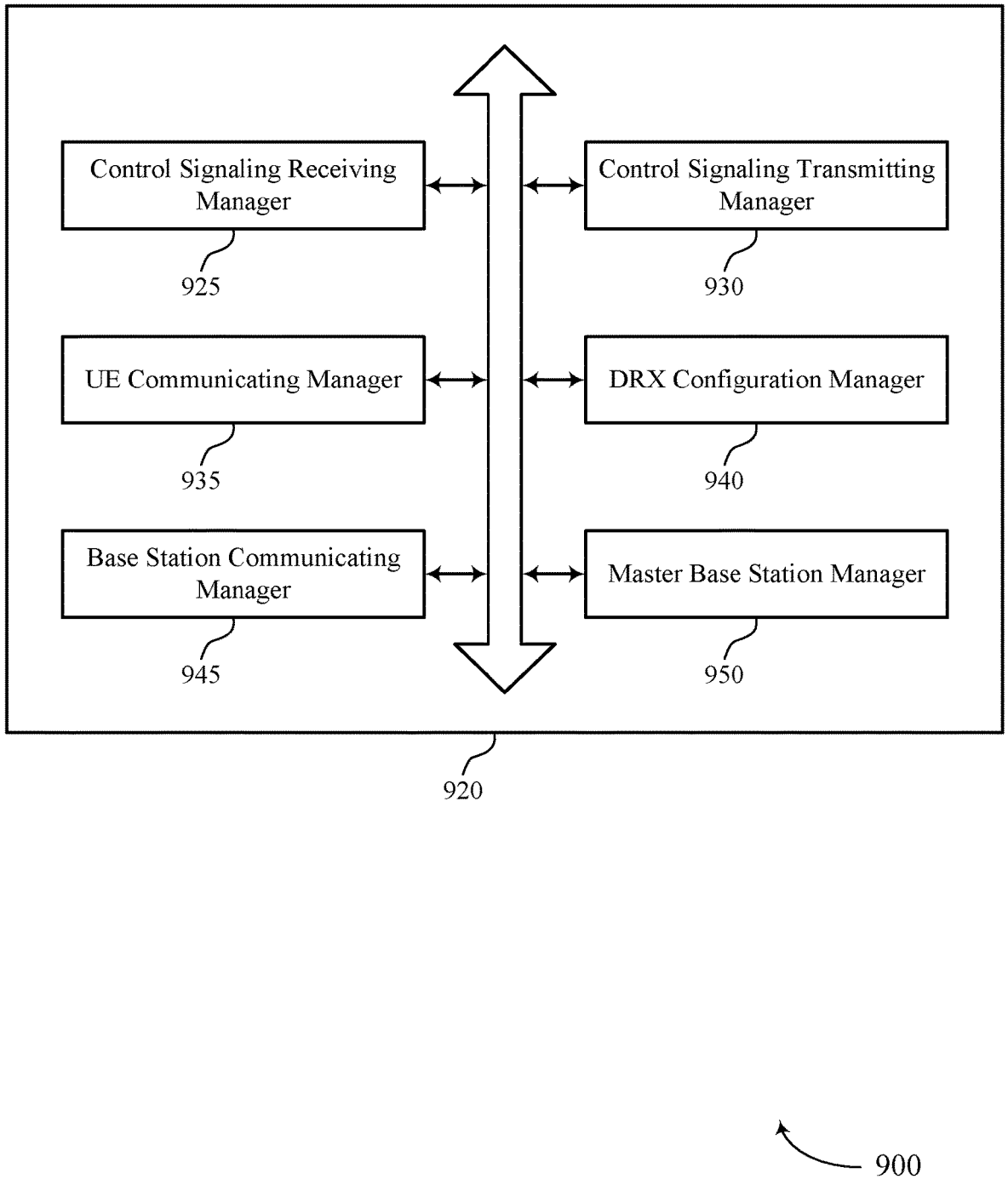
FIG. 9 shows a block diagram of a communications manager that supports DRX alignment in accordance with aspects of the present disclosure.

FIG. 9 shows a block diagram 900 of a communications manager 920 that supports DRX alignment in accordance with aspects of the present disclosure. The communications manager 920 may be an example of aspects of a communications manager 720, a communications manager 820, or both, as described herein. The communications manager 920, or various components thereof, may be an example of means for performing various aspects of DRX alignment as described herein. For example, the communications manager 920 may include a control signaling receiving manager 925, a control signaling transmitting manager 930, a UE communicating manager 935, a DRX configuration manager 940, a base station communicating manager 945, a master base station manager 950, or any combination thereof. Each of these components may communicate, directly or indirectly, with one another (e.g., via one or more buses).

The communications manager 920 may support wireless communication at a first base station (e.g., a base station acting as a master base station) in accordance with examples as disclosed herein. The control signaling receiving manager 925 may be configured as or otherwise support a means for receiving, from a first UE, first control signaling including an indication of one or more DRX configurations for the first UE, an indication of one or more additional DRX configurations for a second UE in wireless communication with the first UE, or both. The control signaling transmitting manager 930 may be configured as or otherwise support a means for transmitting, to the first UE based on the first control signaling, second control signaling including an indication of a downlink DRX configuration for the first UE, an indication of a sidelink DRX configuration for the second UE, or both, where a first set of active durations associated with the downlink DRX configuration for the first UE at least partially overlap in a time domain with a second set of active durations associated with the sidelink DRX configuration for the second UE based on the first control signaling. The UE communicating manager 935 may be configured as or otherwise support a means for communicating with the first UE in accordance with the downlink DRX configuration at the first UE.

In some examples, the control signaling receiving manager 925 may be configured as or otherwise support a means for receiving, from the first UE and based on the second control signaling, third control signaling including an indication of a sidelink DRX configuration for the first UE, where a third set of active durations associated with the sidelink DRX configuration for the first UE at least partially overlap in the time domain with the first and second sets of active durations.

In some examples, the control signaling receiving manager 925 may be configured as or otherwise support a means for receiving, via the first control signaling, an indication of a downlink DRX configuration for the second UE. In some examples, the DRX configuration manager 940 may be configured as or otherwise support a means for determining the downlink DRX configuration for the first UE and the sidelink DRX configuration for the second UE such that the first set of active durations associated with the downlink DRX configuration for the first UE and the second set of active durations associated with the sidelink DRX configuration for the second UE at least partially overlap with the downlink DRX configuration for the second UE.

In some examples, the base station communicating manager 945 may be configured as or otherwise support a means for communicating, with a second base station that is in wireless communication with the second UE, one or more parameters associated with the first base station, the second base station, UEs communicatively coupled with the first or second base stations, or any combination thereof. In some examples, the master base station manager 950 may be configured as or otherwise support a means for determining that the first base station includes a master base station based on the one or more parameters, where receiving the first control signaling, transmitting the second control signaling, or both, are based on the first base station including the master base station.

In some examples, the one or more parameters include one or more UE identifiers associated with one or more UEs in wireless communication with the first or second base stations, one or more QoS requirements associated with the one or more UEs in wireless communication with the first or second base stations, one or more quantities of sidelink connections at the one or more UEs in wireless communication with the first or second base stations, one or more priorities associated with the one or more UEs communicatively coupled with the first or second base stations, one or more traffic loads at the first or second base stations, or any combination thereof.

In some examples, the master base station manager 950 may be configured as or otherwise support a means for receiving, from the first UE, an indication that the first base station includes a master base station, where receiving the first control signaling, transmitting the second control signaling, or both, are based on the first base station including the master base station.

In some examples, the control signaling transmitting manager 930 may be configured as or otherwise support a means for transmitting, via the second control signaling, an indication for the first UE to relay an indication of the downlink DRX configuration for the first UE, the sidelink DRX configuration for the second UE, or both, to the second UE, a second base station in wireless communication with the second UE, or both.

Additionally, or alternatively, the communications manager 920 may support wireless communication at a first base station (e.g., a base station acting as a master base station) in accordance with examples as disclosed herein. In some examples, the control signaling receiving manager 925 may be configured as or otherwise support a means for receiving first control signaling including an indication of a first set of candidate downlink DRX configurations and a first set of candidate sidelink DRX configurations associated with a first UE. In some examples, the control signaling receiving manager 925 may be configured as or otherwise support a means for receiving, via the first control signaling, second control signaling, or both, an indication of a second set of candidate downlink DRX configurations and a second set of candidate sidelink DRX configurations associated with a second user UE. In some examples, the control signaling transmitting manager 930 may be configured as or otherwise support a means for transmitting third control signaling including an indication of a first downlink DRX configuration and a first sidelink DRX configuration for the first UE, where the first downlink DRX configuration and the first sidelink DRX configuration are selected from the first set of candidate downlink DRX configurations and the first set of candidate sidelink DRX configurations, respectively, based on the second set of candidate downlink DRX configurations and the second set of candidate sidelink DRX configurations. In some examples, the control signaling transmitting manager 930 may be configured as or otherwise support a means for transmitting, via the third control signaling, fourth control signaling, or both, an indication of a second downlink DRX configuration and a second sidelink DRX configuration for the second UE, where the second downlink DRX configuration and the second sidelink DRX configuration are selected from the second set of candidate downlink DRX configurations and the second set of candidate sidelink DRX configurations, respectively, based on the first set of candidate downlink DRX configurations and the first set of candidate sidelink DRX configurations, and where active durations of the first and second downlink DRX configurations and the first and second sidelink DRX configurations at least partially overlap in a time domain.

In some examples, the control signaling receiving manager 925 may be configured as or otherwise support a means for receiving the first control signaling from a second base station in wireless communication with the first UE. In some examples, the control signaling receiving manager 925 may be configured as or otherwise support a means for receiving the second control signaling from a third base station in wireless communication with the second UE. In some examples, the control signaling transmitting manager 930 may be configured as or otherwise support a means for transmitting the third control signaling to the second base station, where the third control signaling includes an indication for the second base station to relay the indication of the first downlink DRX configuration and the first sidelink DRX configuration to the first UE. In some examples, the control signaling transmitting manager 930 may be configured as or otherwise support a means for transmitting the fourth control signaling to the third base station, where the fourth control signaling includes an indication for the third base station to relay the indication of the second downlink DRX configuration and the second sidelink DRX configuration to the second UE.

In some examples, the control signaling receiving manager 925 may be configured as or otherwise support a means for receiving the first control signaling from a second base station in wireless communication with the first UE. In some examples, the control signaling transmitting manager 930 may be configured as or otherwise support a means for transmitting the third control signaling to the second base station, where the third control signaling includes an indication for the second base station to relay the indication of the first downlink DRX configuration and the first sidelink DRX configuration to the first UE, and where the third control signaling further includes an indication for the second base station to relay the indication of the second downlink DRX configuration and the second sidelink DRX configuration to the second UE.

In some examples, the control signaling receiving manager 925 may be configured as or otherwise support a means for receiving, via the first control signaling, an indication of a first set of parameters associated with existing sidelink connections at the first UE. In some examples, the control signaling receiving manager 925 may be configured as or otherwise support a means for receiving, via the first control signaling, the second control signaling, or both, an indication of a second set of parameters associated with existing sidelink connections at the second UE. In some examples, the DRX configuration manager 940 may be configured as or otherwise support a means for determining the first sidelink DRX configuration, the second sidelink DRX configuration, the first downlink DRX configuration, the second downlink DRX configuration, or any combination thereof, based on the first set of parameters, the second set of parameters, or both.

In some examples, the first set of parameters, the second set of parameters, or both, include one or more UE identities associated with one or more UEs in wireless communication with the first or second UE, one or more pathloss metrics associated with wireless communications with the one or more UEs in wireless communication with the first or second UE, one or more existing sidelink DRX configurations associated with wireless communications with the one or more UEs in wireless communication with the first or second UE, one or more existing sidelink connections at the one or more UEs in wireless communication with the first or second UE, or any combination thereof.

In some examples, the first and second sidelink DRX configurations and the first and second downlink DRX configurations include connected mode DRX configurations, and the control signaling transmitting manager 930 may be configured as or otherwise support a means for transmitting, via the third control signaling, an indication of a third downlink DRX configuration for the first UE. In some examples, the first and second sidelink DRX configurations and the first and second downlink DRX configurations include connected mode DRX configurations, and the control signaling transmitting manager 930 may be configured as or otherwise support a means for transmitting, via the third control signaling, the fourth control signaling, or both, an indication of a fourth downlink DRX configuration for the second UE, where the third and fourth downlink DRX configurations include inactive mode DRX configurations.

In some examples, the third downlink DRX configuration is selected from the first set of candidate downlink DRX configurations associated with the first UE. In some examples, the fourth downlink DRX configuration is selected from the second set of candidate downlink DRX configurations associated with the second UE.

In some examples, where the third downlink DRX configuration is based on the first downlink DRX configuration, the first sidelink DRX configuration, or both. In some examples, where the fourth downlink DRX configuration is based on the second downlink DRX configuration, the second sidelink DRX configuration, or both.

In some examples, the master base station manager 950 may be configured as or otherwise support a means for determining that the first base station includes a master base station, where receiving the first control signaling, receiving the second control signaling, transmitting the third control signaling, transmitting the fourth control signaling, or any combination thereof, is based on the first UE including the master base station.

Additionally, or alternatively, the communications manager 920 may support wireless communication at a second base station (e.g., a base station acting as a non-master base station) in accordance with examples as disclosed herein. In some examples, the control signaling receiving manager 925 may be configured as or otherwise support a means for receiving, from a second UE, first control signaling including an indication of a sidelink DRX configuration for the second UE, a downlink DRX configuration at a first UE in wireless communication with the second UE, or both. In some examples, the control signaling transmitting manager 930 may be configured as or otherwise support a means for transmitting, to the second UE based on the first control signaling, second control signaling including an indication of a sidelink DRX configuration for the first UE, a downlink DRX configuration for the second UE, or both, where respective sets of active durations associated with the sidelink DRX configurations and the downlink DRX configurations for the first and second UEs at least partially overlap in a time domain. In some examples, the UE communicating manager 935 may be configured as or otherwise support a means for communicating with the second UE in accordance with the downlink DRX configuration for the second UE.

In some examples, the DRX configuration manager 940 may be configured as or otherwise support a means for determining the sidelink DRX configuration for the first UE and the downlink DRX configuration for the second UE such that the respective sets of active durations associated with the sidelink DRX configuration for the first UE and the downlink DRX configuration for the second UE at least partially overlap in the time domain with the respective sets of active durations associated with the sidelink DRX configuration for the second UE and the downlink DRX configuration for the first UE.

In some examples, the control signaling transmitting manager 930 may be configured as or otherwise support a means for transmitting, via the second control signaling, an indication for the second UE to relay, to the first UE, the indication of the sidelink DRX configuration for the first UE and the downlink DRX configuration for the second UE.

In some examples, the base station communicating manager 945 may be configured as or otherwise support a means for communicating, with a first base station that is in wireless communication with the first UE, one or more parameters associated with the first base station, the second base station, UEs communicatively coupled with the first or second base stations, or any combination thereof. In some examples, the master base station manager 950 may be configured as or otherwise support a means for determining that the first base station includes a master base station based on the one or more parameters, where receiving the first control signaling, transmitting the second control signaling, or both, are based on the first base station including the master base station.

In some examples, the one or more parameters include one or more UE identifiers associated with one or more UEs in wireless communication with the first or second base stations, one or more QoS requirements associated with the one or more UEs in wireless communication with the first or second base stations, one or more quantities of sidelink connections at the one or more UEs in wireless communication with the first or second base stations, one or more priorities associated with the one or more UEs communicatively coupled with the first or second base stations, one or more traffic loads at the first or second base stations, or any combination thereof.

In some examples, the master base station manager 950 may be configured as or otherwise support a means for receiving, from the second UE, an indication that a first base station in wireless communication with the first UE includes a master base station, where receiving the first control signaling, transmitting the second control signaling, or both, are based on the first base station including the master base station.

In some examples, the master base station manager 950 may be configured as or otherwise support a means for identifying an absence of an indication that the second base station includes a master base station. In some examples, the master base station manager 950 may be configured as or otherwise support a means for determining, based on the absence of the indication, that a first base station in wireless communication with the first UE includes the master base station, where receiving the first control signaling, transmitting the second control signaling, or both, are based on the first base station including the master base station.

Additionally, or alternatively, the communications manager 920 may support wireless communication at a second base station (e.g., a base station acting as a non-master base station) in accordance with examples as disclosed herein. In some examples, the control signaling transmitting manager 930 may be configured as or otherwise support a means for transmitting, to a first base station, first control signaling including an indication of a first set of candidate downlink DRX configurations and a first set of candidate sidelink DRX configurations associated with a first UE in wireless communication with the second base station. In some examples, the control signaling receiving manager 925 may be configured as or otherwise support a means for receiving, based on the control signaling, second control signaling including an indication of a first downlink DRX configuration and a first sidelink DRX configuration for the first UE, where the first downlink DRX configuration and the first sidelink DRX configuration are included in the first set of candidate downlink DRX configurations and the first set of candidate sidelink DRX configurations, respectively. In some examples, the control signaling transmitting manager 930 may be configured as or otherwise support a means for transmitting, to the first UE based on the second control signaling, third control signaling including an indication of the first downlink DRX configuration and the first sidelink DRX configuration. In some examples, the UE communicating manager 935 may be configured as or otherwise support a means for communicating with the first UE in accordance with the first downlink DRX configuration for the first UE and based on the third control signaling.

In some examples, the control signaling receiving manager 925 may be configured as or otherwise support a means for receiving, from the first UE, fourth control signaling including an indication of the first set of candidate downlink DRX configurations and the first set of candidate sidelink DRX configurations associated with the first UE, where transmitting the first control signaling is based on the fourth control signaling.

In some examples, the control signaling receiving manager 925 may be configured as or otherwise support a means for receiving, via the fourth control signaling, an indication of a set of parameters associated with existing sidelink connections at the first UE. In some examples, the control signaling transmitting manager 930 may be configured as or otherwise support a means for transmitting, via the first control signaling, an indication of the set of parameters, where the first downlink DRX configuration, the first sidelink DRX configuration, or both, are based on the set of parameters.

In some examples, the set of parameters includes one or more UE identities associated with one or more UEs in wireless communication with the first UE, one or more pathloss metrics associated with wireless communications with the one or more UEs in wireless communication with the first UE, one or more existing sidelink DRX configurations associated with wireless communications with the one or more UEs in wireless communication with the first UE, one or more existing sidelink connections at the one or more UEs in wireless communication with the first UE, or any combination thereof.

Figure 10:
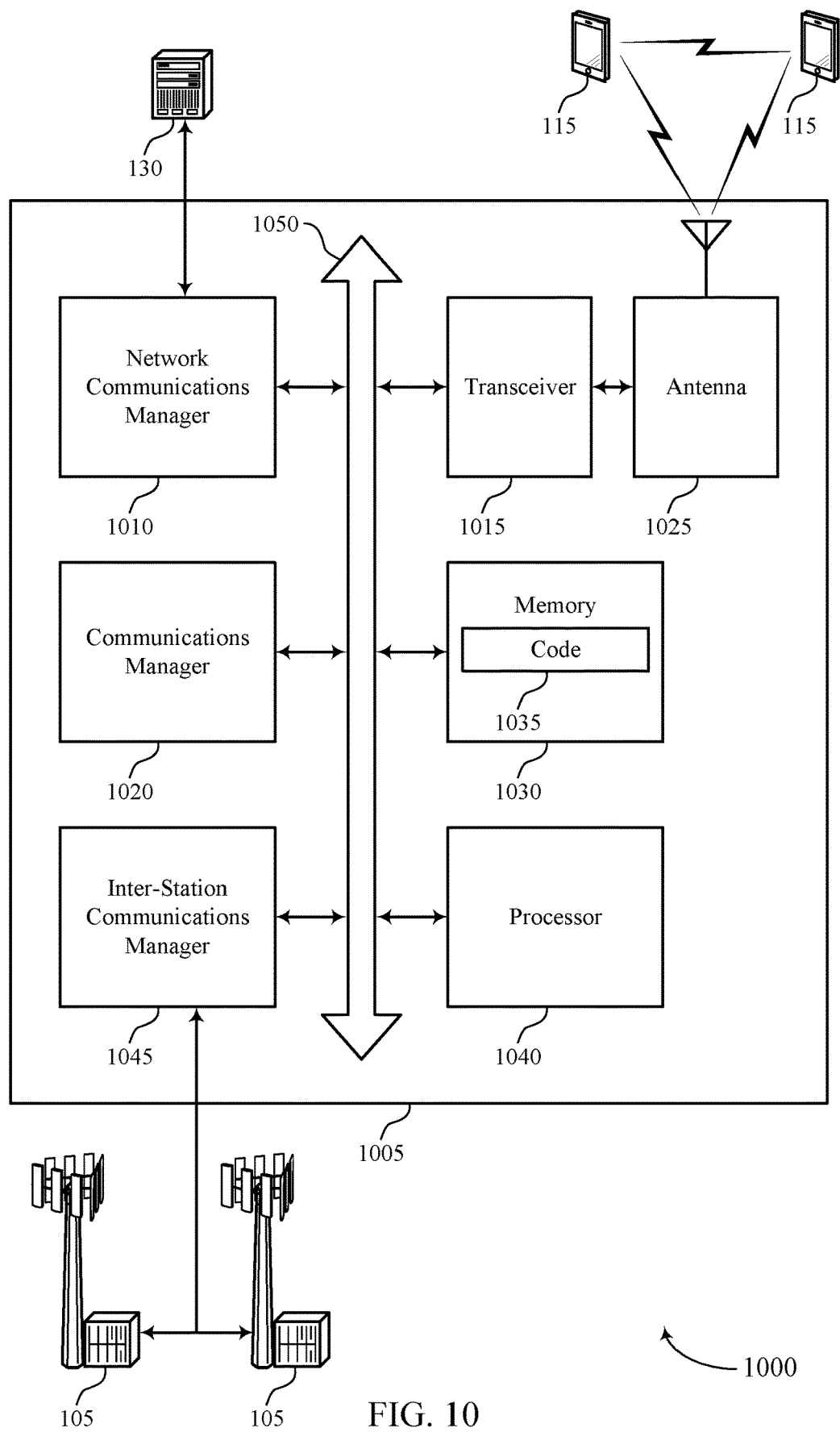
FIG. 10 shows a diagram of a system including a device that supports DRX alignment in accordance with aspects of the present disclosure.

FIG. 10 shows a diagram of a system 1000 including a device 1005 that supports DRX alignment in accordance with aspects of the present disclosure. The device 1005 may be an example of or include the components of a device 705, a device 805, or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting DRX alignment). For example, the device 1005 or a component of the device 1005 may include a processor 1040 and memory 1030 coupled to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communication at a first base station (e.g., a base station acting as a master base station) in accordance with examples as disclosed herein. For example, the communications manager 1020 may be configured as or otherwise support a means for receiving, from a first UE, first control signaling including an indication of one or more DRX configurations for the first UE, an indication of one or more additional DRX configurations for a second UE in wireless communication with the first UE, or both. The communications manager 1020 may be configured as or otherwise support a means for transmitting, to the first UE based on the first control signaling, second control signaling including an indication of a downlink DRX configuration for the first UE, an indication of a sidelink DRX configuration for the second UE, or both, where a first set of active durations associated with the downlink DRX configuration for the first UE at least partially overlap in a time domain with a second set of active durations associated with the sidelink DRX configuration for the second UE based on the first control signaling. The communications manager 1020 may be configured as or otherwise support a means for communicating with the first UE in accordance with the downlink DRX configuration at the first UE.

Additionally, or alternatively, the communications manager 1020 may support wireless communication at a first base station (e.g., a base station acting as a master base station) in accordance with examples as disclosed herein. For example, the communications manager 1020 may be configured as or otherwise support a means for receiving first control signaling including an indication of a first set of candidate downlink DRX configurations and a first set of candidate sidelink DRX configurations associated with a first UE. The communications manager 1020 may be configured as or otherwise support a means for receiving, via the first control signaling, second control signaling, or both, an indication of a second set of candidate downlink DRX configurations and a second set of candidate sidelink DRX configurations associated with a second user UE. The communications manager 1020 may be configured as or otherwise support a means for transmitting third control signaling including an indication of a first downlink DRX configuration and a first sidelink DRX configuration for the first UE, where the first downlink DRX configuration and the first sidelink DRX configuration are selected from the first set of candidate downlink DRX configurations and the first set of candidate sidelink DRX configurations, respectively, based on the second set of candidate downlink DRX configurations and the second set of candidate sidelink DRX configurations. The communications manager 1020 may be configured as or otherwise support a means for transmitting, via the third control signaling, fourth control signaling, or both, an indication of a second downlink DRX configuration and a second sidelink DRX configuration for the second UE, where the second downlink DRX configuration and the second sidelink DRX configuration are selected from the second set of candidate downlink DRX configurations and the second set of candidate sidelink DRX configurations, respectively, based on the first set of candidate downlink DRX configurations and the first set of candidate sidelink DRX configurations, and where active durations of the first and second downlink DRX configurations and the first and second sidelink DRX configurations at least partially overlap in a time domain.

Additionally, or alternatively, the communications manager 1020 may support wireless communication at a second base station (e.g., a base station acting as a non-master base station) in accordance with examples as disclosed herein. For example, the communications manager 1020 may be configured as or otherwise support a means for receiving, from a second UE, first control signaling including an indication of a sidelink DRX configuration for the second UE, a downlink DRX configuration at a first UE in wireless communication with the second UE, or both. The communications manager 1020 may be configured as or otherwise support a means for transmitting, to the second UE based on the first control signaling, second control signaling including an indication of a sidelink DRX configuration for the first UE, a downlink DRX configuration for the second UE, or both, where respective sets of active durations associated with the sidelink DRX configurations and the downlink DRX configurations for the first and second UEs at least partially overlap in a time domain. The communications manager 1020 may be configured as or otherwise support a means for communicating with the second UE in accordance with the downlink DRX configuration for the second UE.

Additionally, or alternatively, the communications manager 1020 may support wireless communication at a second base station (e.g., a base station acting as a non-master base station) in accordance with examples as disclosed herein. For example, the communications manager 1020 may be configured as or otherwise support a means for transmitting, to a first base station, first control signaling including an indication of a first set of candidate downlink DRX configurations and a first set of candidate sidelink DRX configurations associated with a first UE in wireless communication with the second base station. The communications manager 1020 may be configured as or otherwise support a means for receiving, based on the control signaling, second control signaling including an indication of a first downlink DRX configuration and a first sidelink DRX configuration for the first UE, where the first downlink DRX configuration and the first sidelink DRX configuration are included in the first set of candidate downlink DRX configurations and the first set of candidate sidelink DRX configurations, respectively. The communications manager 1020 may be configured as or otherwise support a means for transmitting, to the first UE based on the second control signaling, third control signaling including an indication of the first downlink DRX configuration and the first sidelink DRX configuration. The communications manager 1020 may be configured as or otherwise support a means for communicating with the first UE in accordance with the first downlink DRX configuration for the first UE and based on the third control signaling.

By including or configuring the communications manager 1020 in accordance with examples as described herein, the device 1005 may support techniques which may facilitate alignment of active durations of DRX configurations at UEs 115, as well as alignment of active durations of DRX configurations across multiple UEs 115. In this regard, aspects of the present disclosure may improve Type 1 alignment of Uu and sidelink DRX configurations within UEs 115, which may reduce power consumption at the UEs 115, improve battery life, and improve overall user experience. Moreover, aspects of the present disclosure may improve Type 2 alignment of sidelink DRX configurations across UEs 115, which may facilitate improved communications between UEs 115, reduce latency of sidelink communications, and lead to a more efficient use of resources within the wireless communications system.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of DRX alignment as described herein, or the processor 1040 and the memory 1030 may be otherwise configured to perform or support such operations.

Figure 11:
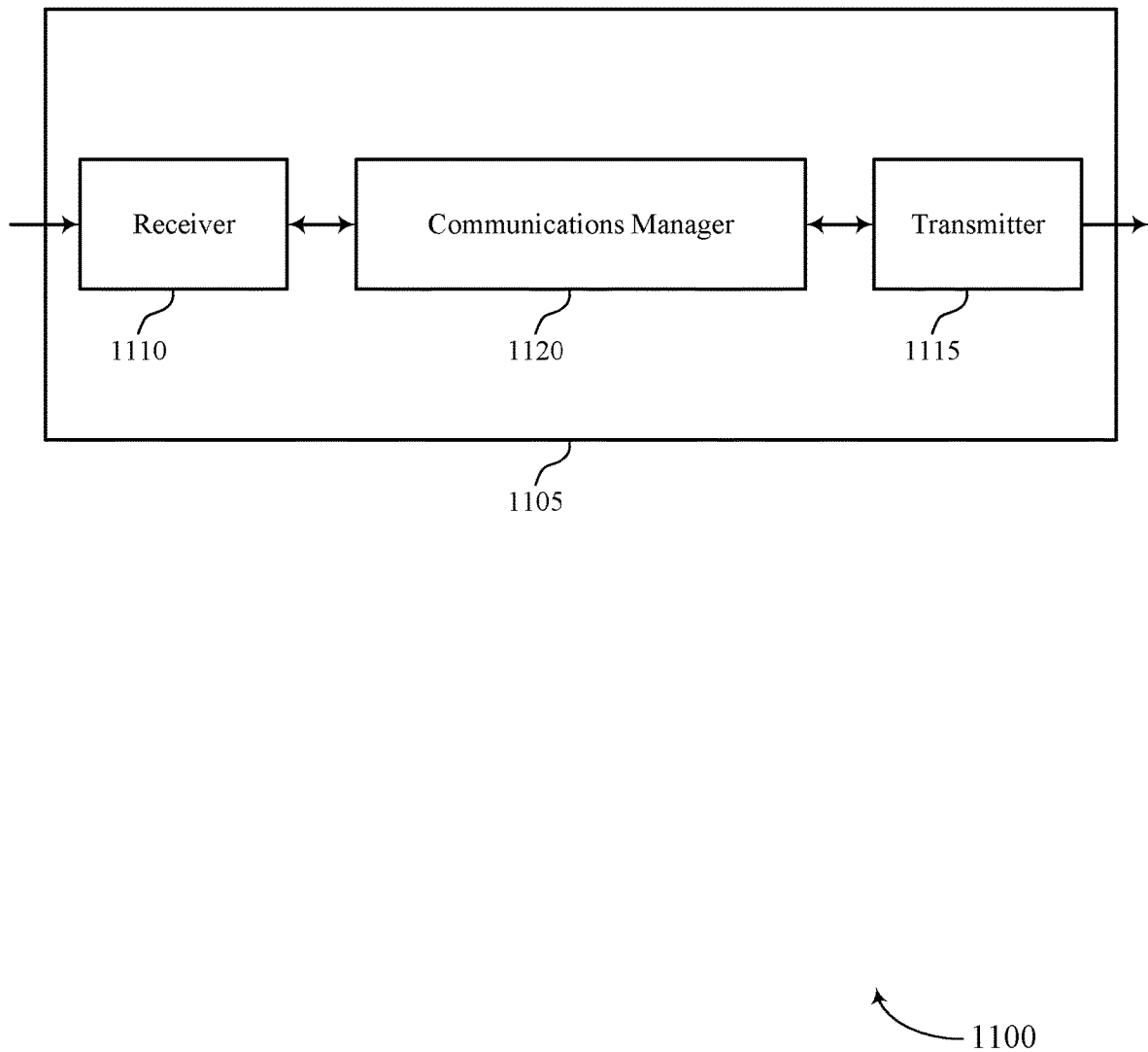
FIGS. 11 and 12 show block diagrams of devices that support DRX alignment in accordance with aspects of the present disclosure.

FIG. 11 shows a block diagram 1100 of a device 1105 that supports DRX alignment in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to DRX alignment). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to DRX alignment). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of DRX alignment as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first UE in accordance with examples as disclosed herein. For example, the communications manager 1120 may be configured as or otherwise support a means for receiving, from a first base station, first control signaling including an indication of a downlink DRX configuration for the first UE, a sidelink DRX configuration for a second UE in wireless communication with the first UE, or both, where a first set of active durations associated with the downlink DRX configuration for the first UE at least partially overlap in a time domain with a second set of active durations associated with the sidelink DRX configuration for the second UE. The communications manager 1120 may be configured as or otherwise support a means for transmitting, to the second UE based on the control signaling, sidelink signaling including an indication of the downlink DRX configuration for the first UE and the sidelink DRX configuration for the second UE. The communications manager 1120 may be configured as or otherwise support a means for communicating with the first base station in accordance with the downlink DRX configuration at the first UE.

Additionally, or alternatively, the communications manager 1120 may support wireless communication at a first UE in accordance with examples as disclosed herein. For example, the communications manager 1120 may be configured as or otherwise support a means for transmitting, to a first base station, first control signaling including an indication of a set of candidate downlink DRX configurations and a set of candidate sidelink DRX configurations associated with the first UE. The communications manager 1120 may be configured as or otherwise support a means for receiving, based on the first control signaling, second control signaling including an indication of a downlink DRX configuration for the first UE and a sidelink DRX configuration for a second UE in wireless communication with the first UE, where the downlink DRX configuration is included in the set of candidate downlink DRX configurations, and where the downlink DRX configuration and the sidelink DRX configuration are based on the set of candidate downlink DRX configurations, the set of candidate sidelink DRX configurations, one or more candidate DRX configurations at the second UE, or any combination thereof. The communications manager 1120 may be configured as or otherwise support a means for communicating with a second base station in accordance with the first downlink DRX configuration, the second base station different from the first base station.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques which may facilitate alignment of active durations of DRX configurations at UEs 115, as well as alignment of active durations of DRX configurations across multiple UEs 115. In this regard, aspects of the present disclosure may improve Type 1 alignment of Uu and sidelink DRX configurations within UEs 115, which may reduce power consumption at the UEs 115, improve battery life, and improve overall user experience. Moreover, aspects of the present disclosure may improve Type 2 alignment of sidelink DRX configurations across UEs 115, which may facilitate improved communications between UEs 115, reduce latency of sidelink communications, and lead to a more efficient use of resources within the wireless communications system.

Figure 12:
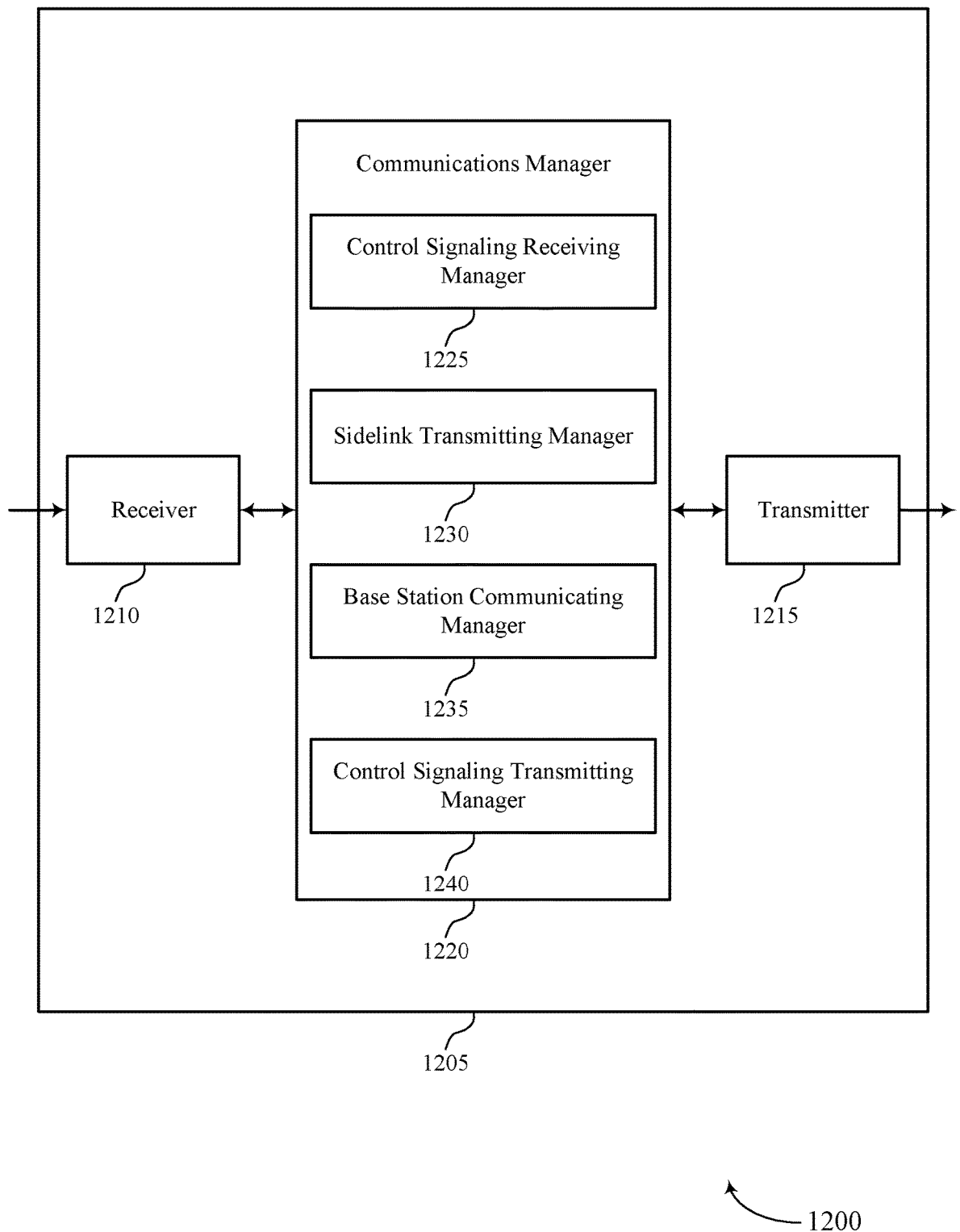

FIG. 12 shows a block diagram 1200 of a device 1205 that supports DRX alignment in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to DRX alignment). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to DRX alignment). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of DRX alignment as described herein. For example, the communications manager 1220 may include a control signaling receiving manager 1225, a sidelink transmitting manager 1230, a base station communicating manager 1235, a control signaling transmitting manager 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first UE in accordance with examples as disclosed herein. The control signaling receiving manager 1225 may be configured as or otherwise support a means for receiving, from a first base station, first control signaling including an indication of a downlink DRX configuration for the first UE, a sidelink DRX configuration for a second UE in wireless communication with the first UE, or both, where a first set of active durations associated with the downlink DRX configuration for the first UE at least partially overlap in a time domain with a second set of active durations associated with the sidelink DRX configuration for the second UE. The sidelink transmitting manager 1230 may be configured as or otherwise support a means for transmitting, to the second UE based on the control signaling, sidelink signaling including an indication of the downlink DRX configuration for the first UE and the sidelink DRX configuration for the second UE. The base station communicating manager 1235 may be configured as or otherwise support a means for communicating with the first base station in accordance with the downlink DRX configuration at the first UE.

Additionally, or alternatively, the communications manager 1220 may support wireless communication at a first UE in accordance with examples as disclosed herein. The control signaling transmitting manager 1240 may be configured as or otherwise support a means for transmitting, to a first base station, first control signaling including an indication of a set of candidate downlink DRX configurations and a set of candidate sidelink DRX configurations associated with the first UE. The control signaling receiving manager 1225 may be configured as or otherwise support a means for receiving, based on the first control signaling, second control signaling including an indication of a downlink DRX configuration for the first UE and a sidelink DRX configuration for a second UE in wireless communication with the first UE, where the downlink DRX configuration is included in the set of candidate downlink DRX configurations, and where the downlink DRX configuration and the sidelink DRX configuration are based on the set of candidate downlink DRX configurations, the set of candidate sidelink DRX configurations, one or more candidate DRX configurations at the second UE, or any combination thereof. The base station communicating manager 1235 may be configured as or otherwise support a means for communicating with a second base station in accordance with the first downlink DRX configuration, the second base station different from the first base station.

Figure 13:
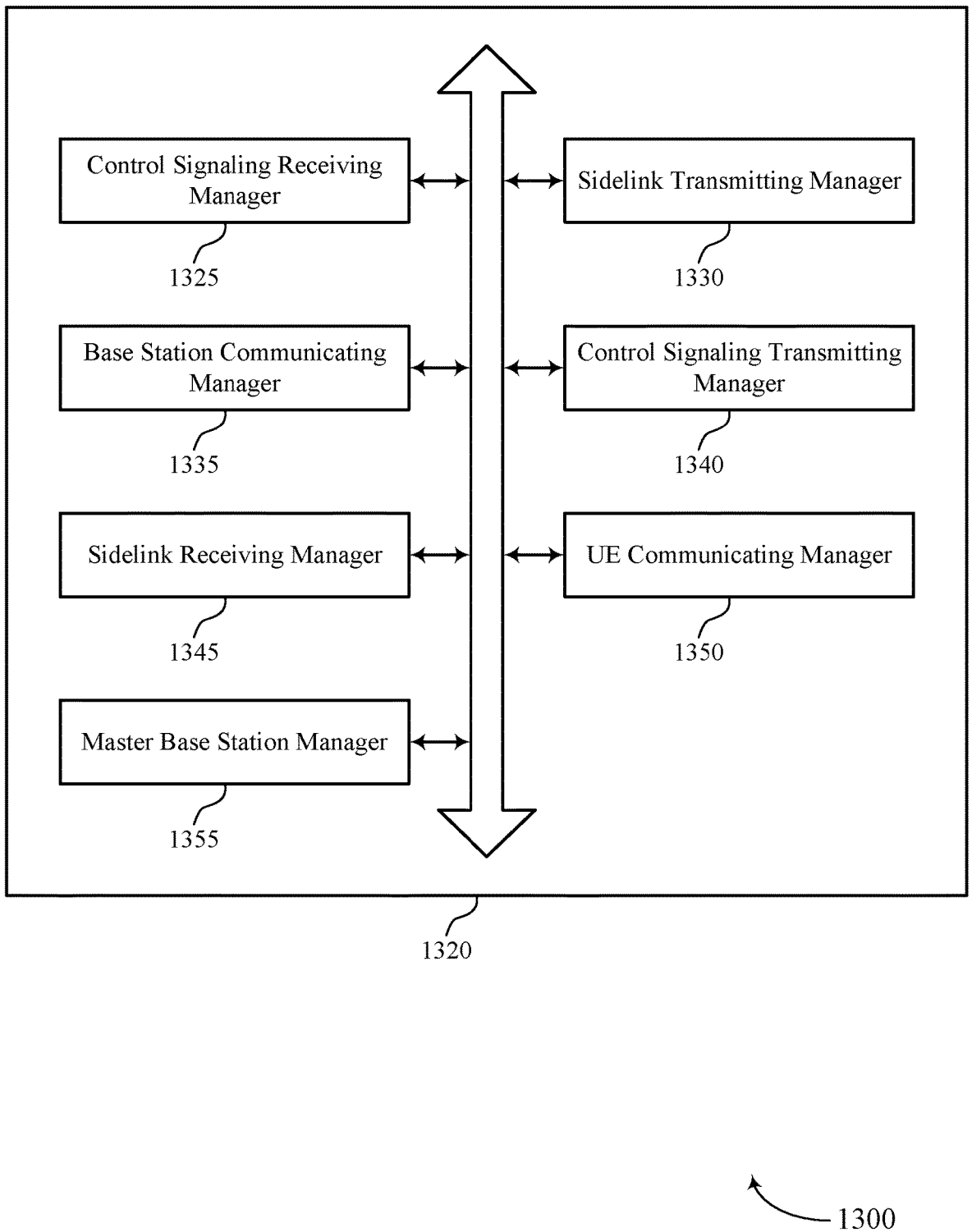
FIG. 13 shows a block diagram of a communications manager that supports DRX alignment in accordance with aspects of the present disclosure.

FIG. 13 shows a block diagram 1300 of a communications manager 1320 that supports DRX alignment in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of DRX alignment as described herein. For example, the communications manager 1320 may include a control signaling receiving manager 1325, a sidelink transmitting manager 1330, a base station communicating manager 1335, a control signaling transmitting manager 1340, a sidelink receiving manager 1345, a UE communicating manager 1350, a master base station manager 1355, or any combination thereof. Each of these components may communicate, directly or indirectly, with one another (e.g., via one or more buses).

The communications manager 1320 may support wireless communication at a first UE in accordance with examples as disclosed herein. The control signaling receiving manager 1325 may be configured as or otherwise support a means for receiving, from a first base station, first control signaling including an indication of a downlink DRX configuration for the first UE, a sidelink DRX configuration for a second UE in wireless communication with the first UE, or both, where a first set of active durations associated with the downlink DRX configuration for the first UE at least partially overlap in a time domain with a second set of active durations associated with the sidelink DRX configuration for the second UE. The sidelink transmitting manager 1330 may be configured as or otherwise support a means for transmitting, to the second UE based on the control signaling, sidelink signaling including an indication of the downlink DRX configuration for the first UE and the sidelink DRX configuration for the second UE. The base station communicating manager 1335 may be configured as or otherwise support a means for communicating with the first base station in accordance with the downlink DRX configuration at the first UE.

In some examples, the sidelink receiving manager 1345 may be configured as or otherwise support a means for receiving, from the second UE, second sidelink signaling including an indication of one more DRX configurations for the second UE. In some examples, the control signaling transmitting manager 1340 may be configured as or otherwise support a means for transmitting, to the first base station based on the second sidelink signaling, second control signaling including an indication of the one or more DRX configurations for the second UE, an indication of one or more DRX configurations for the first UE, or both, where the first control signaling is received based on the second control signaling.

In some examples, the sidelink receiving manager 1345 may be configured as or otherwise support a means for receiving, from the second UE and based on the sidelink signaling, second sidelink signaling including an indication of a sidelink DRX configuration for the first UE, where a third set of active durations associated with the sidelink DRX configuration for the first UE at least partially overlap in the time domain with the first and second sets of active durations. In some examples, the UE communicating manager 1350 may be configured as or otherwise support a means for communicating with the second UE in accordance with the sidelink DRX configuration for the first UE.

In some examples, the control signaling transmitting manager 1340 may be configured as or otherwise support a means for transmitting, to the first base station and based on the second sidelink signaling, second control signaling including an indication of the sidelink DRX configuration for the first UE.

In some examples, the sidelink transmitting manager 1330 may be configured as or otherwise support a means for transmitting, via the sidelink signaling, an indication for the second UE to relay the indication of the downlink DRX configuration for the first UE and the sidelink DRX configuration for the second UE to a second base station in wireless communication with the second UE.

In some examples, the UE communicating manager 1350 may be configured as or otherwise support a means for communicating, with the second UE, one or more parameters associated with the first UE, the second UE, or both. In some examples, the master base station manager 1355 may be configured as or otherwise support a means for determining that the first base station includes a master base station based on the one or more parameters. In some examples, the control signaling transmitting manager 1340 may be configured as or otherwise support a means for transmitting, to the first base station, second control signaling including an indication that the first base station includes the master base station, where receiving the first control signaling is based on the second control signaling.

In some examples, the one or more parameters include a UE identifier associated with the first or second UE, a QoS requirement associated with the first or second UE, a priority associated with the first or second UE, or any combination thereof.

Additionally, or alternatively, the communications manager 1320 may support wireless communication at a first UE in accordance with examples as disclosed herein. The control signaling transmitting manager 1340 may be configured as or otherwise support a means for transmitting, to a first base station, first control signaling including an indication of a set of candidate downlink DRX configurations and a set of candidate sidelink DRX configurations associated with the first UE. In some examples, the control signaling receiving manager 1325 may be configured as or otherwise support a means for receiving, based on the first control signaling, second control signaling including an indication of a downlink DRX configuration for the first UE and a sidelink DRX configuration for a second UE in wireless communication with the first UE, where the downlink DRX configuration is included in the set of candidate downlink DRX configurations, and where the downlink DRX configuration and the sidelink DRX configuration are based on the set of candidate downlink DRX configurations, the set of candidate sidelink DRX configurations, one or more candidate DRX configurations at the second UE, or any combination thereof. In some examples, the base station communicating manager 1335 may be configured as or otherwise support a means for communicating with a second base station in accordance with the first downlink DRX configuration, the second base station different from the first base station.

In some examples, the sidelink transmitting manager 1330 may be configured as or otherwise support a means for transmitting, to the second UE, sidelink signaling including an indication of the sidelink DRX configuration for the second UE. In some examples, the sidelink receiving manager 1345 may be configured as or otherwise support a means for receiving, from the second UE, second sidelink signaling including an indication of an additional sidelink DRX configuration for the first UE. In some examples, the UE communicating manager 1350 may be configured as or otherwise support a means for communicating with the second UE in accordance with the sidelink DRX configuration for the second UE and in accordance with the additional sidelink DRX configuration for the first UE.

In some examples, the additional sidelink DRX configuration for the first UE is included in the set of candidate sidelink DRX configurations associated with the first UE.

In some examples, the control signaling transmitting manager 1340 may be configured as or otherwise support a means for where transmitting the first control signaling includes transmitting the first control signaling via a downlink interface between the first UE and the first base station, transmitting the first control signaling to an additional wireless device for relay to the first base station, or both. In some examples, the control signaling receiving manager 1325 may be configured as or otherwise support a means for where receiving the second control signaling includes receiving the second control signaling via the downlink interface between the first UE and the first base station, receiving the second control signaling via a wireless connection between the first UE and the additional wireless device, or both.

In some examples, the control signaling transmitting manager 1340 may be configured as or otherwise support a means for transmitting, via the first control signaling, an indication of a set of parameters associated with existing sidelink connections at the first UE, where the downlink DRX configuration for the first UE, the sidelink DRX configuration for the second UE, or both, are based on the set of parameters.

In some examples, the set of parameters includes one or more UE identities associated with one or more UEs in wireless communication with the first UE, one or more pathloss metrics associated with wireless communications with the one or more UEs in wireless communication with the first UE, one or more existing sidelink DRX configurations associated with wireless communications with the one or more UEs in wireless communication with the first UE, one or more existing sidelink connections at the one or more UEs in wireless communication with the first UE, or any combination thereof.

In some examples, the downlink DRX configuration includes a connected mode DRX configuration, and the control signaling receiving manager 1325 may be configured as or otherwise support a means for receiving, via the second control signaling, an indication of a second downlink DRX configuration for the first UE, the second downlink DRX configuration including an inactive mode DRX configuration, where the second downlink DRX configuration is based on the downlink DRX configuration.

Figure 14:
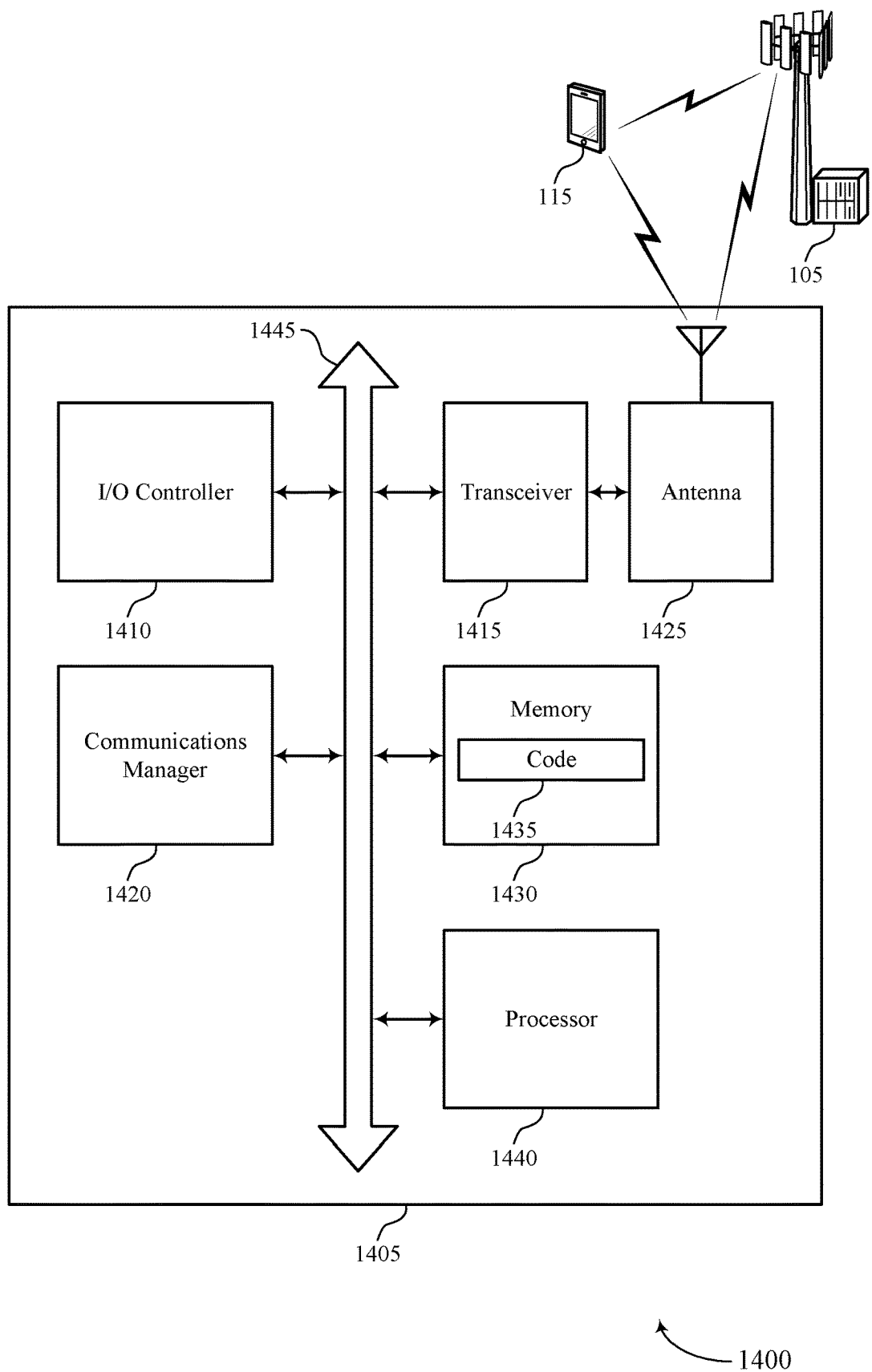
FIG. 14 shows a diagram of a system including a device that supports DRX alignment in accordance with aspects of the present disclosure.

FIG. 14 shows a diagram of a system 1400 including a device 1405 that supports DRX alignment in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting DRX alignment). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a first UE in accordance with examples as disclosed herein. For example, the communications manager 1420 may be configured as or otherwise support a means for receiving, from a first base station, first control signaling including an indication of a downlink DRX configuration for the first UE, a sidelink DRX configuration for a second UE in wireless communication with the first UE, or both, where a first set of active durations associated with the downlink DRX configuration for the first UE at least partially overlap in a time domain with a second set of active durations associated with the sidelink DRX configuration for the second UE. The communications manager 1420 may be configured as or otherwise support a means for transmitting, to the second UE based on the control signaling, sidelink signaling including an indication of the downlink DRX configuration for the first UE and the sidelink DRX configuration for the second UE. The communications manager 1420 may be configured as or otherwise support a means for communicating with the first base station in accordance with the downlink DRX configuration at the first UE.

Additionally, or alternatively, the communications manager 1420 may support wireless communication at a first UE in accordance with examples as disclosed herein. For example, the communications manager 1420 may be configured as or otherwise support a means for transmitting, to a first base station, first control signaling including an indication of a set of candidate downlink DRX configurations and a set of candidate sidelink DRX configurations associated with the first UE. The communications manager 1420 may be configured as or otherwise support a means for receiving, based on the first control signaling, second control signaling including an indication of a downlink DRX configuration for the first UE and a sidelink DRX configuration for a second UE in wireless communication with the first UE, where the downlink DRX configuration is included in the set of candidate downlink DRX configurations, and where the downlink DRX configuration and the sidelink DRX configuration are based on the set of candidate downlink DRX configurations, the set of candidate sidelink DRX configurations, one or more candidate DRX configurations at the second UE, or any combination thereof. The communications manager 1420 may be configured as or otherwise support a means for communicating with a second base station in accordance with the first downlink DRX configuration, the second base station different from the first base station.

By including or configuring the communications manager 1420 in accordance with examples as described herein, the device 1405 may support techniques which may facilitate alignment of active durations of DRX configurations at UEs 115, as well as alignment of active durations of DRX configurations across multiple UEs 115. In this regard, aspects of the present disclosure may improve Type 1 alignment of Uu and sidelink DRX configurations within UEs 115, which may reduce power consumption at the UEs 115, improve battery life, and improve overall user experience. Moreover, aspects of the present disclosure may improve Type 2 alignment of sidelink DRX configurations across UEs 115, which may facilitate improved communications between UEs 115, reduce latency of sidelink communications, and lead to a more efficient use of resources within the wireless communications system.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of DRX alignment as described herein, or the processor 1440 and the memory 1430 may be otherwise configured to perform or support such operations.

Figure 15:
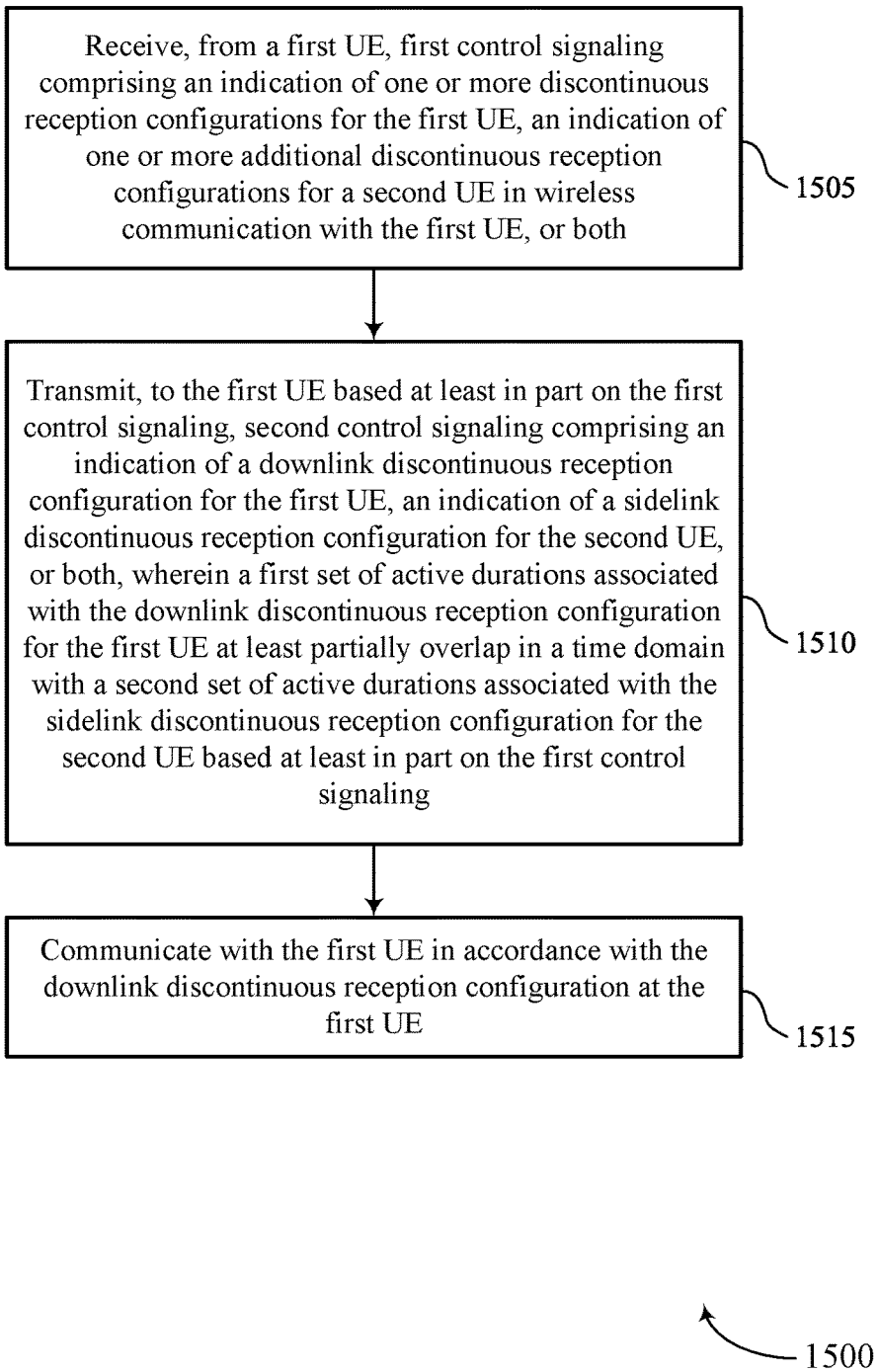
FIGS. 15 through 20 show flowcharts illustrating methods that support DRX alignment in accordance with aspects of the present disclosure.

FIG. 15 shows a flowchart illustrating a method 1500 that supports DRX alignment in accordance with aspects of the present disclosure. The operations of the method 1500 may be implemented by a base station or its components as described herein. For example, the operations of the method 1500 may be performed by a base station 105 (e.g., a master base station 105) as described with reference to FIGS. 1 through 10. In some examples, a base station may execute a set of instructions to control the functional elements of the base station to perform the described functions. Additionally, or alternatively, the base station may perform aspects of the described functions using special-purpose hardware.

At 1505, the method may include receiving, from a first UE, first control signaling including an indication of one or more DRX configurations for the first UE, an indication of one or more additional DRX configurations for a second UE in wireless communication with the first UE, or both. The operations of 1505 may be performed in accordance with examples as disclosed herein. In some examples, aspects of the operations of 1505 may be performed by a control signaling receiving manager 925 as described with reference to FIG. 9.

At 1510, the method may include transmitting, to the first UE based on the first control signaling, second control signaling including an indication of a downlink DRX configuration for the first UE, an indication of a sidelink DRX configuration for the second UE, or both, where a first set of active durations associated with the downlink DRX configuration for the first UE at least partially overlap in a time domain with a second set of active durations associated with the sidelink DRX configuration for the second UE based on the first control signaling. The operations of 1510 may be performed in accordance with examples as disclosed herein. In some examples, aspects of the operations of 1510 may be performed by a control signaling transmitting manager 930 as described with reference to FIG. 9.

At 1515, the method may include communicating with the first UE in accordance with the downlink DRX configuration at the first UE. The operations of 1515 may be performed in accordance with examples as disclosed herein. In some examples, aspects of the operations of 1515 may be performed by a UE communicating manager 935 as described with reference to FIG. 9.

Figure 16:
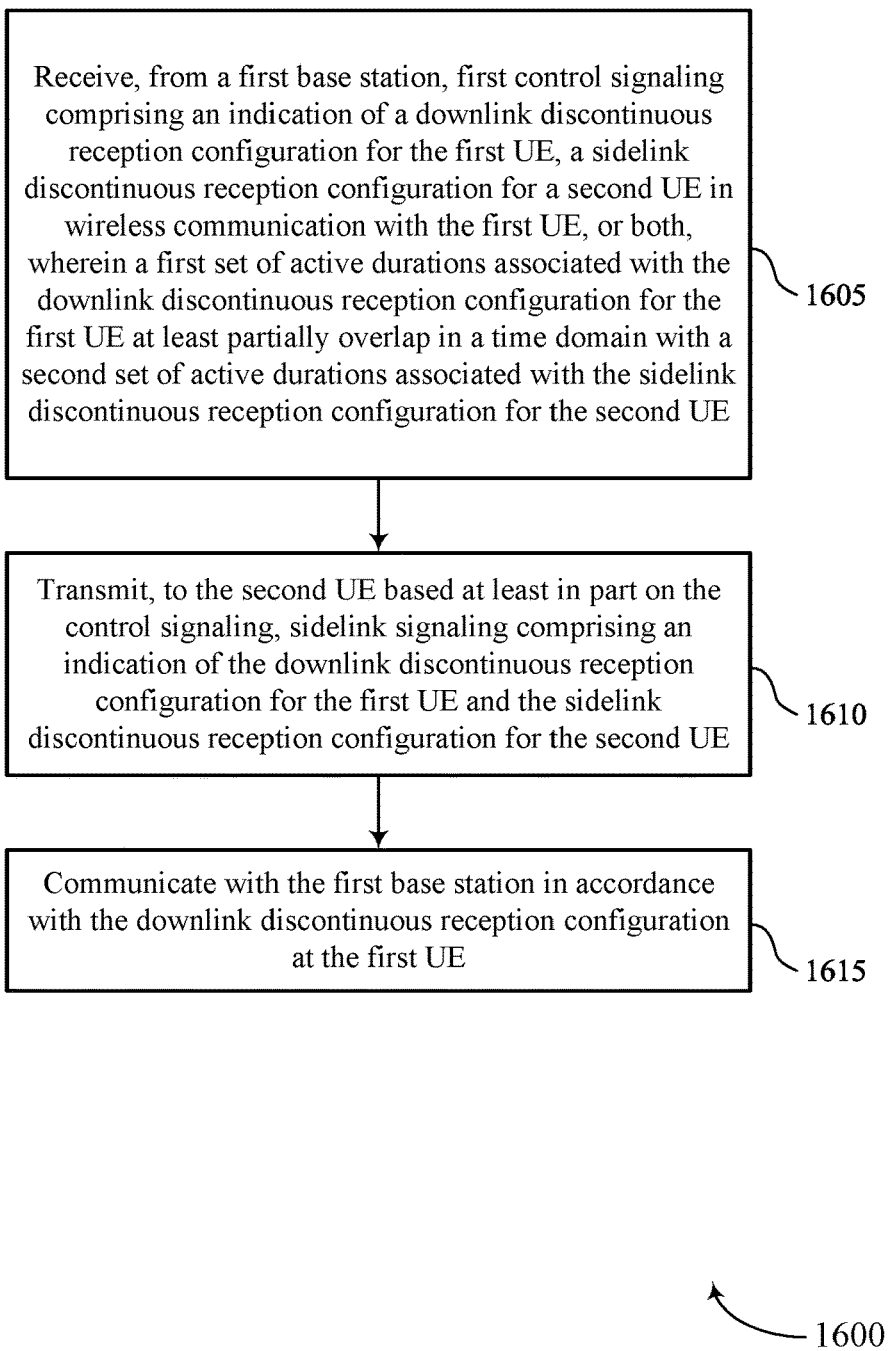

FIG. 16 shows a flowchart illustrating a method 1600 that supports DRX alignment in accordance with aspects of the present disclosure. The operations of the method 1600 may be implemented by a UE or its components as described herein. For example, the operations of the method 1600 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1605, the method may include receiving, from a first base station, first control signaling including an indication of a downlink DRX configuration for the first UE, a sidelink DRX configuration for a second UE in wireless communication with the first UE, or both, where a first set of active durations associated with the downlink DRX configuration for the first UE at least partially overlap in a time domain with a second set of active durations associated with the sidelink DRX configuration for the second UE. The operations of 1605 may be performed in accordance with examples as disclosed herein. In some examples, aspects of the operations of 1605 may be performed by a control signaling receiving manager 1325 as described with reference to FIG. 13.

At 1610, the method may include transmitting, to the second UE based on the control signaling, sidelink signaling including an indication of the downlink DRX configuration for the first UE and the sidelink DRX configuration for the second UE. The operations of 1610 may be performed in accordance with examples as disclosed herein. In some examples, aspects of the operations of 1610 may be performed by a sidelink transmitting manager 1330 as described with reference to FIG. 13.

At 1615, the method may include communicating with the first base station in accordance with the downlink DRX configuration at the first UE. The operations of 1615 may be performed in accordance with examples as disclosed herein. In some examples, aspects of the operations of 1615 may be performed by a base station communicating manager 1335 as described with reference to FIG. 13.

Figure 17:
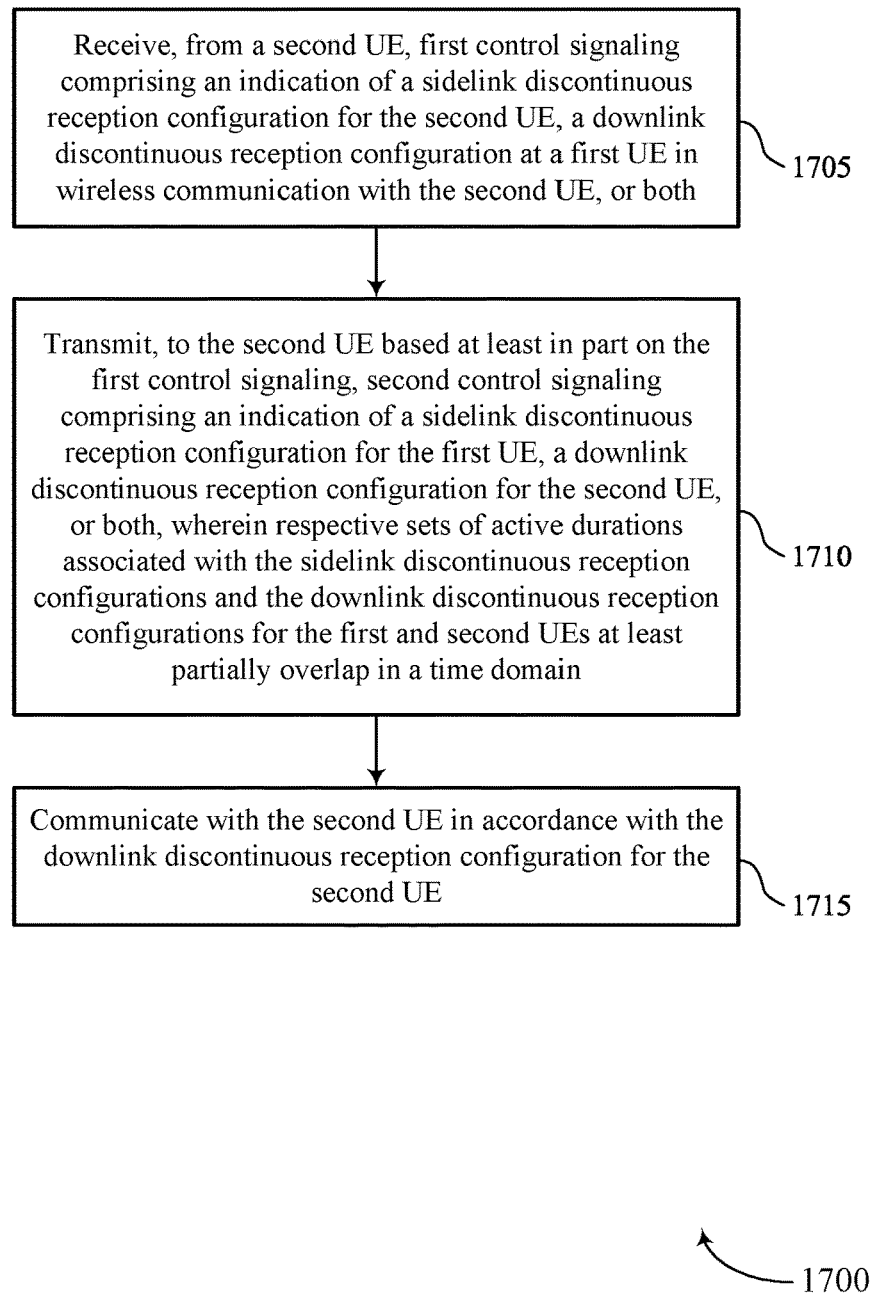

FIG. 17 shows a flowchart illustrating a method 1700 that supports DRX alignment in accordance with aspects of the present disclosure. The operations of the method 1700 may be implemented by a base station or its components as described herein. For example, the operations of the method 1700 may be performed by a base station 105 (e.g., a non-master base station 105) as described with reference to FIGS. 1 through 10. In some examples, a base station may execute a set of instructions to control the functional elements of the base station to perform the described functions.

Additionally, or alternatively, the base station may perform aspects of the described functions using special-purpose hardware.

At 1705, the method may include receiving, from a second UE, first control signaling including an indication of a sidelink DRX configuration for the second UE, a downlink DRX configuration at a first UE in wireless communication with the second UE, or both. The operations of 1705 may be performed in accordance with examples as disclosed herein. In some examples, aspects of the operations of 1705 may be performed by a control signaling receiving manager 925 as described with reference to FIG. 9.

At 1710, the method may include transmitting, to the second UE based on the first control signaling, second control signaling including an indication of a sidelink DRX configuration for the first UE, a downlink DRX configuration for the second UE, or both, where respective sets of active durations associated with the sidelink DRX configurations and the downlink DRX configurations for the first and second UEs at least partially overlap in a time domain. The operations of 1710 may be performed in accordance with examples as disclosed herein. In some examples, aspects of the operations of 1710 may be performed by a control signaling transmitting manager 930 as described with reference to FIG. 9.

At 1715, the method may include communicating with the second UE in accordance with the downlink DRX configuration for the second UE. The operations of 1715 may be performed in accordance with examples as disclosed herein. In some examples, aspects of the operations of 1715 may be performed by a UE communicating manager 935 as described with reference to FIG. 9.

Figure 18:
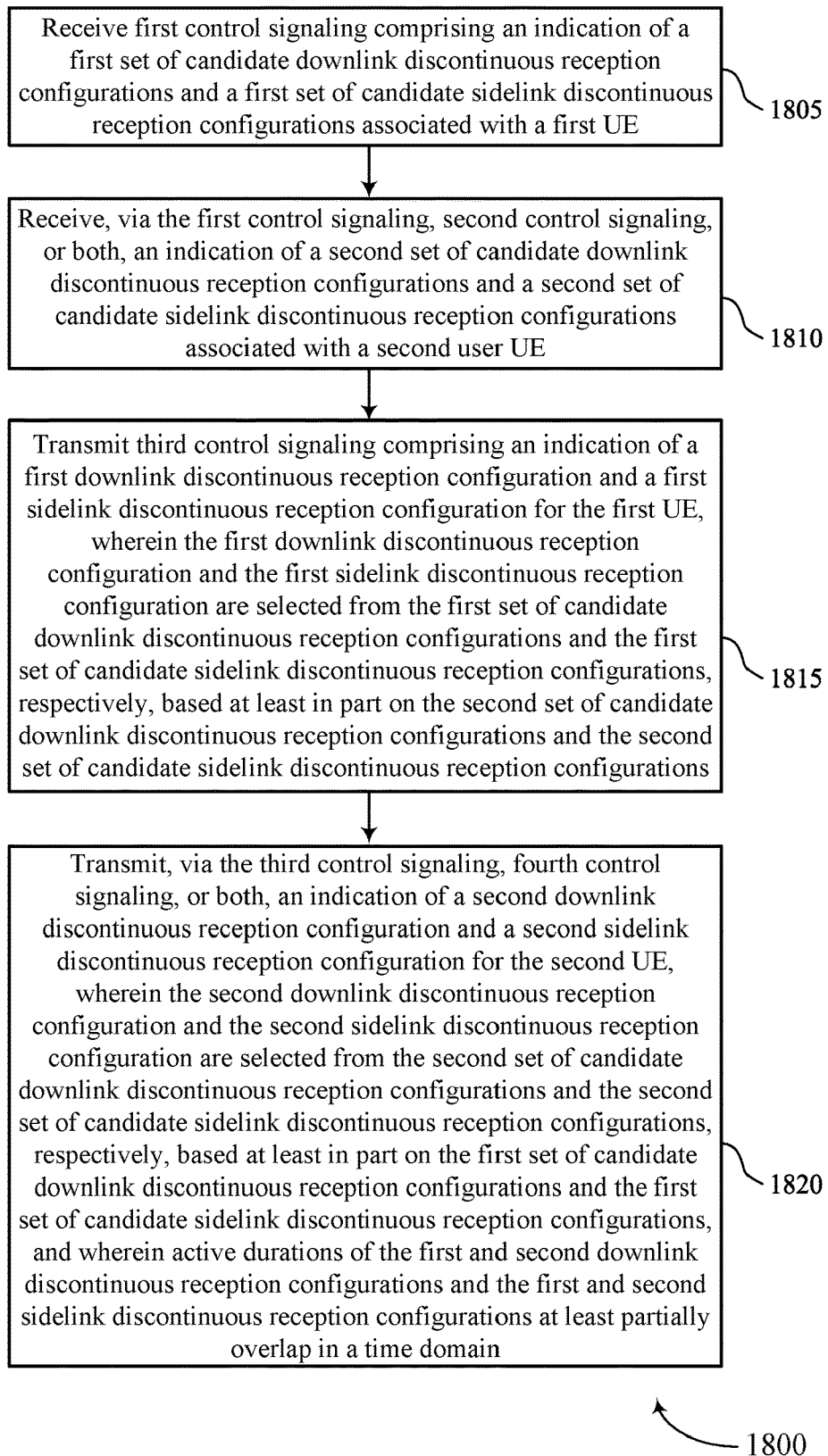

FIG. 18 shows a flowchart illustrating a method 1800 that supports DRX alignment in accordance with aspects of the present disclosure. The operations of the method 1800 may be implemented by a base station or its components as described herein. For example, the operations of the method 1800 may be performed by a base station 105 (e.g., a master base station 105) as described with reference to FIGS. 1 through 10. In some examples, a base station may execute a set of instructions to control the functional elements of the base station to perform the described functions. Additionally, or alternatively, the base station may perform aspects of the described functions using special-purpose hardware.

At 1805, the method may include receiving first control signaling including an indication of a first set of candidate downlink DRX configurations and a first set of candidate sidelink DRX configurations associated with a first UE. The operations of 1805 may be performed in accordance with examples as disclosed herein. In some examples, aspects of the operations of 1805 may be performed by a control signaling receiving manager 925 as described with reference to FIG. 9.

At 1810, the method may include receiving, via the first control signaling, second control signaling, or both, an indication of a second set of candidate downlink DRX configurations and a second set of candidate sidelink DRX configurations associated with a second user UE. The operations of 1810 may be performed in accordance with examples as disclosed herein. In some examples, aspects of the operations of 1810 may be performed by a control signaling receiving manager 925 as described with reference to FIG. 9.

At 1815, the method may include transmitting third control signaling including an indication of a first downlink DRX configuration and a first sidelink DRX configuration for the first UE, where the first downlink DRX configuration and the first sidelink DRX configuration are selected from the first set of candidate downlink DRX configurations and the first set of candidate sidelink DRX configurations, respectively, based on the second set of candidate downlink DRX configurations and the second set of candidate sidelink DRX configurations. The operations of 1815 may be performed in accordance with examples as disclosed herein. In some examples, aspects of the operations of 1815 may be performed by a control signaling transmitting manager 930 as described with reference to FIG. 9.

At 1820, the method may include transmitting, via the third control signaling, fourth control signaling, or both, an indication of a second downlink DRX configuration and a second sidelink DRX configuration for the second UE, where the second downlink DRX configuration and the second sidelink DRX configuration are selected from the second set of candidate downlink DRX configurations and the second set of candidate sidelink DRX configurations, respectively, based on the first set of candidate downlink DRX configurations and the first set of candidate sidelink DRX configurations, and where active durations of the first and second downlink DRX configurations and the first and second sidelink DRX configurations at least partially overlap in a time domain. The operations of 1820 may be performed in accordance with examples as disclosed herein. In some examples, aspects of the operations of 1820 may be performed by a control signaling transmitting manager 930 as described with reference to FIG. 9.

Figure 19:
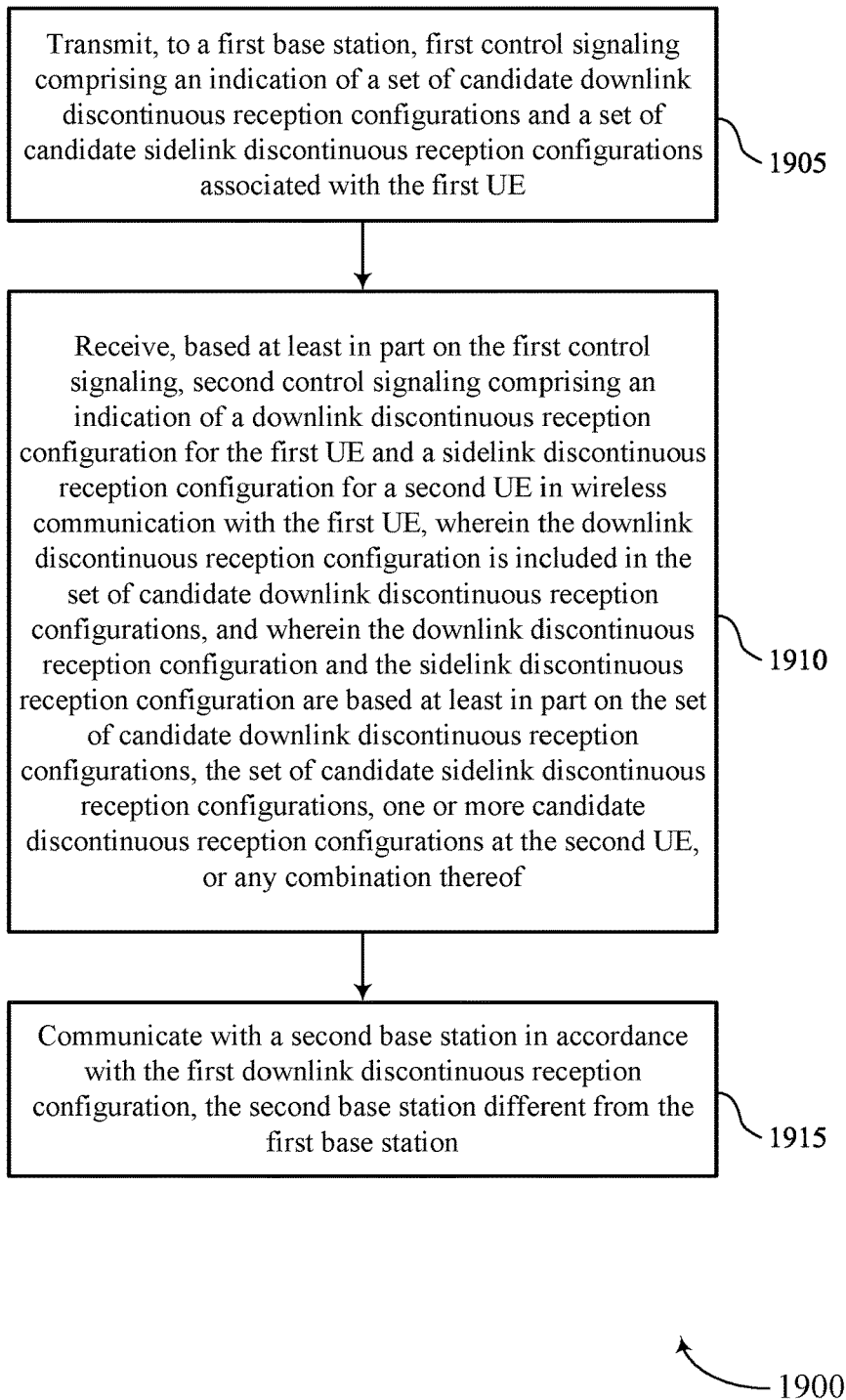

FIG. 19 shows a flowchart illustrating a method 1900 that supports DRX alignment in accordance with aspects of the present disclosure. The operations of the method 1900 may be implemented by a UE or its components as described herein. For example, the operations of the method 1900 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1905, the method may include transmitting, to a first base station, first control signaling including an indication of a set of candidate downlink DRX configurations and a set of candidate sidelink DRX configurations associated with the first UE. The operations of 1905 may be performed in accordance with examples as disclosed herein. In some examples, aspects of the operations of 1905 may be performed by a control signaling transmitting manager 1340 as described with reference to FIG. 13.

At 1910, the method may include receiving, based on the first control signaling, second control signaling including an indication of a downlink DRX configuration for the first UE and a sidelink DRX configuration for a second UE in wireless communication with the first UE, where the downlink DRX configuration is included in the set of candidate downlink DRX configurations, and where the downlink DRX configuration and the sidelink DRX configuration are based on the set of candidate downlink DRX configurations, the set of candidate sidelink DRX configurations, one or more candidate DRX configurations at the second UE, or any combination thereof. The operations of 1910 may be performed in accordance with examples as disclosed herein. In some examples, aspects of the operations of 1910 may be performed by a control signaling receiving manager 1325 as described with reference to FIG. 13.

At 1915, the method may include communicating with a second base station in accordance with the first downlink DRX configuration, the second base station different from the first base station. The operations of 1915 may be performed in accordance with examples as disclosed herein. In some examples, aspects of the operations of 1915 may be performed by a base station communicating manager 1335 as described with reference to FIG. 13.

Figure 20:
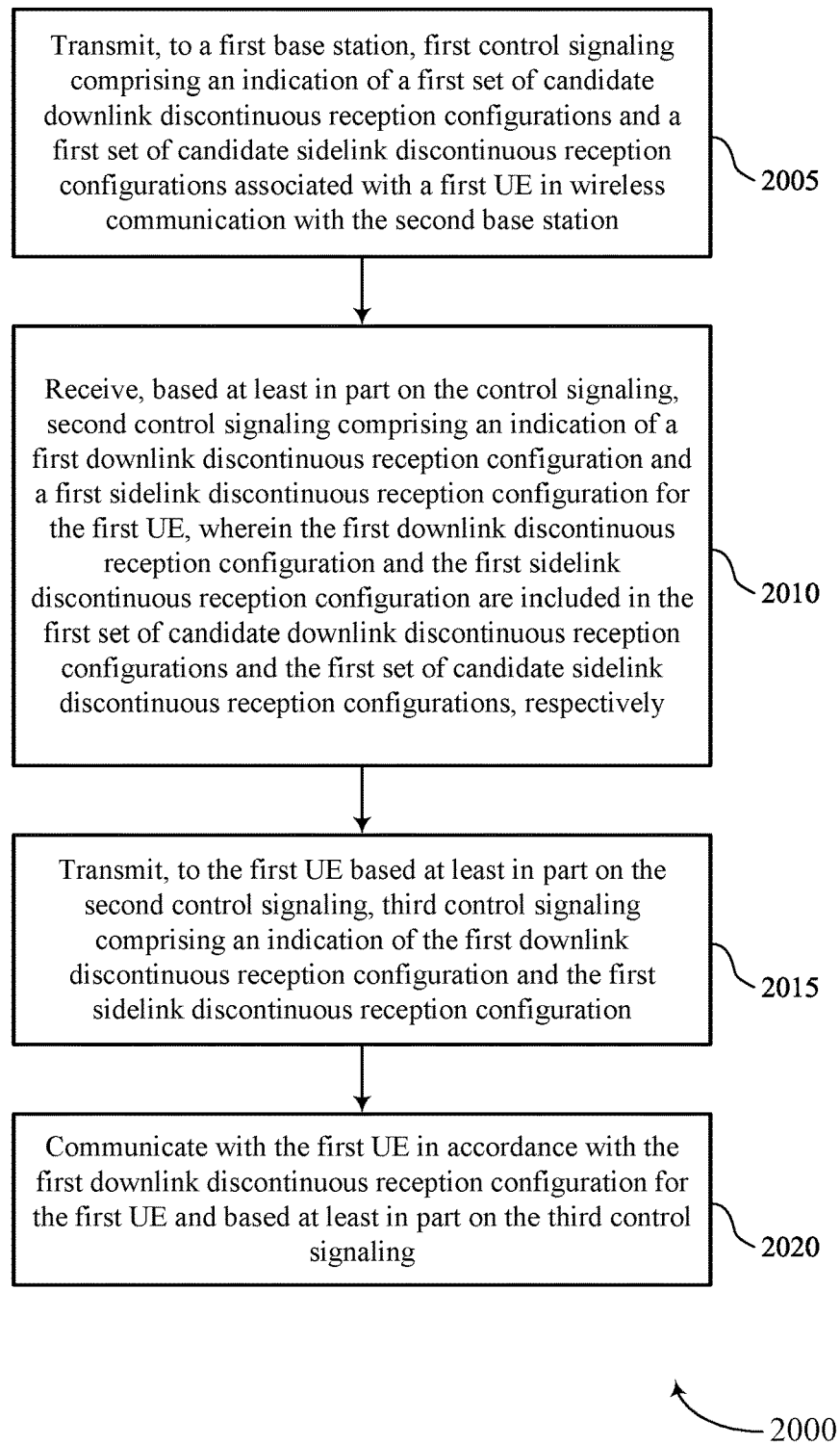

FIG. 20 shows a flowchart illustrating a method 2000 that supports DRX alignment in accordance with aspects of the present disclosure. The operations of the method 2000 may be implemented by a base station or its components as described herein. For example, the operations of the method 2000 may be performed by a base station 105 (e.g., a non-master base station 105) as described with reference to FIGS. 1 through 10. In some examples, a base station may execute a set of instructions to control the functional elements of the base station to perform the described functions. Additionally, or alternatively, the base station may perform aspects of the described functions using special-purpose hardware.

At 2005, the method may include transmitting, to a first base station, first control signaling including an indication of a first set of candidate downlink DRX configurations and a first set of candidate sidelink DRX configurations associated with a first UE in wireless communication with the second base station. The operations of 2005 may be performed in accordance with examples as disclosed herein. In some examples, aspects of the operations of 2005 may be performed by a control signaling transmitting manager 930 as described with reference to FIG. 9.

At 2010, the method may include receiving, based on the control signaling, second control signaling including an indication of a first downlink DRX configuration and a first sidelink DRX configuration for the first UE, where the first downlink DRX configuration and the first sidelink DRX configuration are included in the first set of candidate downlink DRX configurations and the first set of candidate sidelink DRX configurations, respectively. The operations of 2010 may be performed in accordance with examples as disclosed herein. In some examples, aspects of the operations of 2010 may be performed by a control signaling receiving manager 925 as described with reference to FIG. 9.

At 2015, the method may include transmitting, to the first UE based on the second control signaling, third control signaling including an indication of the first downlink DRX configuration and the first sidelink DRX configuration. The operations of 2015 may be performed in accordance with examples as disclosed herein. In some examples, aspects of the operations of 2015 may be performed by a control signaling transmitting manager 930 as described with reference to FIG. 9.

At 2020, the method may include communicating with the first UE in accordance with the first downlink DRX configuration for the first UE and based on the third control signaling. The operations of 2020 may be performed in accordance with examples as disclosed herein. In some examples, aspects of the operations of 2020 may be performed by a UE communicating manager 935 as described with reference to FIG. 9.

The following provides an overview of aspects of the present disclosure:

Aspect 1: A method for wireless communication at a first base station, comprising: receiving, from a first UE, first control signaling comprising an indication of one or more DRX configurations for the first UE, an indication of one or more additional DRX configurations for a second UE in wireless communication with the first UE, or both; transmitting, to the first UE based at least in part on the first control signaling, second control signaling comprising an indication of a downlink DRX configuration for the first UE, an indication of a sidelink DRX configuration for the second UE, or both, wherein a first set of active durations associated with the downlink DRX configuration for the first UE at least partially overlap in a time domain with a second set of active durations associated with the sidelink DRX configuration for the second UE based at least in part on the first control signaling; and communicating with the first UE in accordance with the downlink DRX configuration at the first UE.

Aspect 2: The method of aspect 1, further comprising: receiving, from the first UE and based at least in part on the second control signaling, third control signaling comprising an indication of a sidelink DRX configuration for the first UE, wherein a third set of active durations associated with the sidelink DRX configuration for the first UE at least partially overlap in the time domain with the first and second sets of active durations.

Aspect 3: The method of any of aspects 1 through 2, further comprising: receiving, via the first control signaling, an indication of a downlink DRX configuration for the second UE; and determining the downlink DRX configuration for the first UE and the sidelink DRX configuration for the second UE such that the first set of active durations associated with the downlink DRX configuration for the first UE and the second set of active durations associated with the sidelink DRX configuration for the second UE at least partially overlap with the downlink DRX configuration for the second UE.

Aspect 4: The method of any of aspects 1 through 3, further comprising: communicating, with a second base station that is in wireless communication with the second UE, one or more parameters associated with the first base station, the second base station, UEs communicatively coupled with the first or second base stations, or any combination thereof; and determining that the first base station comprises a master base station based at least in part on the one or more parameters, wherein receiving the first control signaling, transmitting the second control signaling, or both, are based at least in part on the first base station comprising the master base station.

Aspect 5: The method of aspect 4, wherein the one or more parameters comprise one or more UE identifiers associated with one or more UEs in wireless communication with the first or second base stations, one or more QoS requirements associated with the one or more UEs in wireless communication with the first or second base stations, one or more quantities of sidelink connections at the one or more UEs in wireless communication with the first or second base stations, one or more priorities associated with the one or more UEs communicatively coupled with the first or second base stations, one or more traffic loads at the first or second base stations, or any combination thereof.

Aspect 6: The method of any of aspects 1 through 5, further comprising: receiving, from the first UE, an indication that the first base station comprises a master base station, wherein receiving the first control signaling, transmitting the second control signaling, or both, are based at least in part on the first base station comprising the master base station.

Aspect 7: The method of any of aspects 1 through 6, further comprising: transmitting, via the second control signaling, an indication for the first UE to relay an indication of the downlink DRX configuration for the first UE, the sidelink DRX configuration for the second UE, or both, to the second UE, a second base station in wireless communication with the second UE, or both.

Aspect 8: A method for wireless communication at a first UE, comprising: receiving, from a first base station, first control signaling comprising an indication of a downlink DRX configuration for the first UE, a sidelink DRX configuration for a second UE in wireless communication with the first UE, or both, wherein a first set of active durations associated with the downlink DRX configuration for the first UE at least partially overlap in a time domain with a second set of active durations associated with the sidelink DRX configuration for the second UE; transmitting, to the second UE based at least in part on the control signaling, sidelink signaling comprising an indication of the downlink DRX configuration for the first UE and the sidelink DRX configuration for the second UE; and communicating with the first base station in accordance with the downlink DRX configuration at the first UE.

Aspect 9: The method of aspect 8, further comprising: receiving, from the second UE, second sidelink signaling comprising an indication of one more DRX configurations for the second UE; and transmitting, to the first base station based at least in part on the second sidelink signaling, second control signaling comprising an indication of the one or more DRX configurations for the second UE, an indication of one or more DRX configurations for the first UE, or both, wherein the first control signaling is received based at least in part on the second control signaling.

Aspect 10: The method of any of aspects 8 through 9, further comprising: receiving, from the second UE and based at least in part on the sidelink signaling, second sidelink signaling comprising an indication of a sidelink DRX configuration for the first UE, wherein a third set of active durations associated with the sidelink DRX configuration for the first UE at least partially overlap in the time domain with the first and second sets of active durations; and communicating with the second UE in accordance with the sidelink DRX configuration for the first UE.

Aspect 11: The method of aspect 10, further comprising: transmitting, to the first base station and based at least in part on the second sidelink signaling, second control signaling comprising an indication of the sidelink DRX configuration for the first UE.

Aspect 12: The method of any of aspects 8 through 11, further comprising: transmitting, via the sidelink signaling, an indication for the second UE to relay the indication of the downlink DRX configuration for the first UE and the sidelink DRX configuration for the second UE to a second base station in wireless communication with the second UE.

Aspect 13: The method of any of aspects 8 through 12, further comprising: communicating, with the second UE, one or more parameters associated with the first UE, the second UE, or both; determining that the first base station comprises a master base station based at least in part on the one or more parameters; and transmitting, to the first base station, second control signaling comprising an indication that the first base station comprises the master base station, wherein receiving the first control signaling is based at least in part on the second control signaling.

Aspect 14: The method of aspect 13, wherein the one or more parameters comprise a UE identifier associated with the first or second UE, a QoS requirement associated with the first or second UE, a priority associated with the first or second UE, or any combination thereof.

Aspect 15: A method for wireless communication at a first base station, comprising: receiving first control signaling comprising an indication of a first set of candidate downlink DRX configurations and a first set of candidate sidelink DRX configurations associated with a first UE; receiving, via the first control signaling, second control signaling, or both, an indication of a second set of candidate downlink DRX configurations and a second set of candidate sidelink DRX configurations associated with a second user UE; transmitting third control signaling comprising an indication of a first downlink DRX configuration and a first sidelink DRX configuration for the first UE, wherein the first downlink DRX configuration and the first sidelink DRX configuration are selected from the first set of candidate downlink DRX configurations and the first set of candidate sidelink DRX configurations, respectively, based at least in part on the second set of candidate downlink DRX configurations and the second set of candidate sidelink DRX configurations; and transmitting, via the third control signaling, fourth control signaling, or both, an indication of a second downlink DRX configuration and a second sidelink DRX configuration for the second UE, wherein the second downlink DRX configuration and the second sidelink DRX configuration are selected from the second set of candidate downlink DRX configurations and the second set of candidate sidelink DRX configurations, respectively, based at least in part on the first set of candidate downlink DRX configurations and the first set of candidate sidelink DRX configurations, and wherein active durations of the first and second downlink DRX configurations and the first and second sidelink DRX configurations at least partially overlap in a time domain.

Aspect 16: The method of aspect 15, further comprising: receiving the first control signaling from a second base station in wireless communication with the first UE; receiving the second control signaling from a third base station in wireless communication with the second UE; transmitting the third control signaling to the second base station, wherein the third control signaling comprises an indication for the second base station to relay the indication of the first downlink DRX configuration and the first sidelink DRX configuration to the first UE; and transmitting the fourth control signaling to the third base station, wherein the fourth control signaling comprises an indication for the third base station to relay the indication of the second downlink DRX configuration and the second sidelink DRX configuration to the second UE.

Aspect 17: The method of any of aspects 15 through 16, further comprising: receiving the first control signaling from a second base station in wireless communication with the first UE; and transmitting the third control signaling to the second base station, wherein the third control signaling comprises an indication for the second base station to relay the indication of the first downlink DRX configuration and the first sidelink DRX configuration to the first UE, and wherein the third control signaling further comprises an indication for the second base station to relay the indication of the second downlink DRX configuration and the second sidelink DRX configuration to the second UE.

Aspect 18: The method of any of aspects 15 through 17, further comprising: receiving, via the first control signaling, an indication of a first set of parameters associated with existing sidelink connections at the first UE; receiving, via the first control signaling, the second control signaling, or both, an indication of a second set of parameters associated with existing sidelink connections at the second UE; and determining the first sidelink DRX configuration, the second sidelink DRX configuration, the first downlink DRX configuration, the second downlink DRX configuration, or any combination thereof, based at least in part on the first set of parameters, the second set of parameters, or both.

Aspect 19: The method of aspect 18, wherein the first set of parameters, the second set of parameters, or both, comprise one or more UE identities associated with one or more UEs in wireless communication with the first or second UE, one or more pathloss metrics associated with wireless communications with the one or more UEs in wireless communication with the first or second UE, one or more existing sidelink DRX configurations associated with wireless communications with the one or more UEs in wireless communication with the first or second UE, one or more existing sidelink connections at the one or more UEs in wireless communication with the first or second UE, or any combination thereof.

Aspect 20: The method of any of aspects 15 through 19, wherein the first and second sidelink DRX configurations and the first and second downlink DRX configurations comprise connected mode DRX configurations, the method further comprising: transmitting, via the third control signaling, an indication of a third downlink DRX configuration for the first UE; and transmitting, via the third control signaling, the fourth control signaling, or both, an indication of a fourth downlink DRX configuration for the second UE, wherein the third and fourth downlink DRX configurations comprise inactive mode DRX configurations.

Aspect 21: The method of any of aspects 15 through 20, wherein the third downlink DRX configuration is selected from the first set of candidate downlink DRX configurations associated with the first UE, and the fourth downlink DRX configuration is selected from the second set of candidate downlink DRX configurations associated with the second UE.

Aspect 22: The method of any of aspects 15 through 21, wherein the third downlink DRX configuration is based at least in part on the first downlink DRX configuration, the first sidelink DRX configuration, or both, and wherein the fourth downlink DRX configuration is based at least in part on the second downlink DRX configuration, the second sidelink DRX configuration, or both Aspect 23: The method of any of aspects 15 through 22, further comprising: determining that the first base station comprises a master base station, wherein receiving the first control signaling, receiving the second control signaling, transmitting the third control signaling, transmitting the fourth control signaling, or any combination thereof, is based at least in part on the first UE comprising the master base station.

Aspect 24: A method for wireless communication at a first UE, comprising: transmitting, to a first base station, first control signaling comprising an indication of a set of candidate downlink DRX configurations and a set of candidate sidelink DRX configurations associated with the first UE; receiving, based at least in part on the first control signaling, second control signaling comprising an indication of a downlink DRX configuration for the first UE and a sidelink DRX configuration for a second UE in wireless communication with the first UE, wherein the downlink DRX configuration is included in the set of candidate downlink DRX configurations, and wherein the downlink DRX configuration and the sidelink DRX configuration are based at least in part on the set of candidate downlink DRX configurations, the set of candidate sidelink DRX configurations, one or more candidate DRX configurations at the second UE, or any combination thereof; and communicating with a second base station in accordance with the first downlink DRX configuration, the second base station different from the first base station.

Aspect 25: The method of aspect 24, further comprising: transmitting, to the second UE, sidelink signaling comprising an indication of the sidelink DRX configuration for the second UE; receiving, from the second UE, second sidelink signaling comprising an indication of an additional sidelink DRX configuration for the first UE; and communicating with the second UE in accordance with the sidelink DRX configuration for the second UE and in accordance with the additional sidelink DRX configuration for the first UE.

Aspect 26: The method of aspect 25, wherein the additional sidelink DRX configuration for the first UE is included in the set of candidate sidelink DRX configurations associated with the first UE.

Aspect 27: The method of any of aspects 24 through 26, wherein transmitting the first control signaling comprises transmitting the first control signaling via a downlink interface between the first UE and the first base station, transmitting the first control signaling to an additional wireless device for relay to the first base station, or both, and wherein receiving the second control signaling comprises receiving the second control signaling via the downlink interface between the first UE and the first base station, receiving the second control signaling via a wireless connection between the first UE and the additional wireless device, or both Aspect 28: The method of any of aspects 24 through 27, further comprising: transmitting, via the first control signaling, an indication of a set of parameters associated with existing sidelink connections at the first UE, wherein the downlink DRX configuration for the first UE, the sidelink DRX configuration for the second UE, or both, are based at least in part on the set of parameters.

Aspect 29: The method of aspect 28, wherein the set of parameters comprises one or more UE identities associated with one or more UEs in wireless communication with the first UE, one or more pathloss metrics associated with wireless communications with the one or more UEs in wireless communication with the first UE, one or more existing sidelink DRX configurations associated with wireless communications with the one or more UEs in wireless communication with the first UE, one or more existing sidelink connections at the one or more UEs in wireless communication with the first UE, or any combination thereof.

Aspect 30: The method of any of aspects 24 through 29, wherein the downlink DRX configuration comprises a connected mode DRX configuration, the method further comprising: receiving, via the second control signaling, an indication of a second downlink DRX configuration for the first UE, the second downlink DRX configuration comprising an inactive mode DRX configuration, wherein the second downlink DRX configuration is based at least in part on the downlink DRX configuration.

Aspect 31: A method for wireless communication at a second base station, comprising: receiving, from a second UE, first control signaling comprising an indication of a sidelink DRX configuration for the second UE, a downlink DRX configuration at a first UE in wireless communication with the second UE, or both; transmitting, to the second UE based at least in part on the first control signaling, second control signaling comprising an indication of a sidelink DRX configuration for the first UE, a downlink DRX configuration for the second UE, or both, wherein respective sets of active durations associated with the sidelink DRX configurations and the downlink DRX configurations for the first and second UEs at least partially overlap in a time domain; and communicating with the second UE in accordance with the downlink DRX configuration for the second UE.

Aspect 32: The method of aspect 31, further comprising: determining the sidelink DRX configuration for the first UE and the downlink DRX configuration for the second UE such that the respective sets of active durations associated with the sidelink DRX configuration for the first UE and the downlink DRX configuration for the second UE at least partially overlap in the time domain with the respective sets of active durations associated with the sidelink DRX configuration for the second UE and the downlink DRX configuration for the first UE.

Aspect 33: The method of any of aspects 31 through 32, further comprising: transmitting, via the second control signaling, an indication for the second UE to relay, to the first UE, the indication of the sidelink DRX configuration for the first UE and the downlink DRX configuration for the second UE.

Aspect 34: The method of any of aspects 31 through 33, further comprising: communicating, with a first base station that is in wireless communication with the first UE, one or more parameters associated with the first base station, the second base station, UEs communicatively coupled with the first or second base stations, or any combination thereof; and determining that the first base station comprises a master base station based at least in part on the one or more parameters, wherein receiving the first control signaling, transmitting the second control signaling, or both, are based at least in part on the first base station comprising the master base station.

Aspect 35: The method of aspect 34, wherein the one or more parameters comprise one or more UE identifiers associated with one or more UEs in wireless communication with the first or second base stations, one or more QoS requirements associated with the one or more UEs in wireless communication with the first or second base stations, one or more quantities of sidelink connections at the one or more UEs in wireless communication with the first or second base stations, one or more priorities associated with the one or more UEs communicatively coupled with the first or second base stations, one or more traffic loads at the first or second base stations, or any combination thereof.

Aspect 36: The method of any of aspects 31 through 35, further comprising: receiving, from the second UE, an indication that a first base station in wireless communication with the first UE comprises a master base station, wherein receiving the first control signaling, transmitting the second control signaling, or both, are based at least in part on the first base station comprising the master base station.

Aspect 37: The method of any of aspects 31 through 36, further comprising: identifying an absence of an indication that the second base station comprises a master base station; and determining, based at least in part on the absence of the indication, that a first base station in wireless communication with the first UE comprises the master base station, wherein receiving the first control signaling, transmitting the second control signaling, or both, are based at least in part on the first base station comprising the master base station.

Aspect 38: A method for wireless communication at a second base station, comprising: transmitting, to a first base station, first control signaling comprising an indication of a first set of candidate downlink DRX configurations and a first set of candidate sidelink DRX configurations associated with a first UE in wireless communication with the second base station; receiving, based at least in part on the control signaling, second control signaling comprising an indication of a first downlink DRX configuration and a first sidelink DRX configuration for the first UE, wherein the first downlink DRX configuration and the first sidelink DRX configuration are included in the first set of candidate downlink DRX configurations and the first set of candidate sidelink DRX configurations, respectively; transmitting, to the first UE based at least in part on the second control signaling, third control signaling comprising an indication of the first downlink DRX configuration and the first sidelink DRX configuration; and communicating with the first UE in accordance with the first downlink DRX configuration for the first UE and based at least in part on the third control signaling.

Aspect 39: The method of aspect 38, further comprising: receiving, from the first UE, fourth control signaling comprising an indication of the first set of candidate downlink DRX configurations and the first set of candidate sidelink DRX configurations associated with the first UE, wherein transmitting the first control signaling is based at least in part on the fourth control signaling.

Aspect 40: The method of aspect 39, further comprising: receiving, via the fourth control signaling, an indication of a set of parameters associated with existing sidelink connections at the first UE; and transmitting, via the first control signaling, an indication of the set of parameters, wherein the first downlink DRX configuration, the first sidelink DRX configuration, or both, are based at least in part on the set of parameters.

Aspect 41: The method of aspect 40, wherein the set of parameters comprises one or more UE identities associated with one or more UEs in wireless communication with the first UE, one or more pathloss metrics associated with wireless communications with the one or more UEs in wireless communication with the first UE, one or more existing sidelink DRX configurations associated with wireless communications with the one or more UEs in wireless communication with the first UE, one or more existing sidelink connections at the one or more UEs in wireless communication with the first UE, or any combination thereof.

Aspect 42: An apparatus for wireless communication at a first base station, the apparatus comprising memory, a transceiver, and at least one processor coupled with the memory and the transceiver, the at least one processor configured to cause the apparatus to perform a method of any of aspects 1 through 7.

Aspect 43: An apparatus for wireless communication at a first base station, comprising at least one means for performing a method of any of aspects 1 through 7.

Aspect 44: A non-transitory computer-readable medium storing code for wireless communication at a first base station, the code comprising instructions executable by a processor to perform a method of any of aspects 1 through 7.

Aspect 45: An apparatus for wireless communication at a first UE, the apparatus comprising memory, a transceiver, and at least one processor coupled with the memory and the transceiver, the at least one processor configured to cause the apparatus to perform a method of any of aspects 8 through 14.

Aspect 46: An apparatus for wireless communication at a first UE, comprising at least one means for performing a method of any of aspects 8 through 14.

Aspect 47: A non-transitory computer-readable medium storing code for wireless communication at a first UE, the code comprising instructions executable by a processor to perform a method of any of aspects 8 through 14.

Aspect 48: An apparatus for wireless communication at a first base station, the apparatus comprising memory, a transceiver, and at least one processor coupled with the memory and the transceiver, the at least one processor configured to cause the apparatus to perform a method of any of aspects 15 through 23.

Aspect 49: An apparatus for wireless communication at a first base station, comprising at least one means for performing a method of any of aspects 15 through 23.

Aspect 50: A non-transitory computer-readable medium storing code for wireless communication at a first base station, the code comprising instructions executable by a processor to perform a method of any of aspects 15 through 23.

Aspect 51: An apparatus for wireless communication at a first UE, the apparatus comprising memory, a transceiver, and at least one processor coupled with the memory and the transceiver, the at least one processor configured to cause the apparatus to perform a method of any of aspects 24 through 30.

Aspect 52: An apparatus for wireless communication at a first UE, comprising at least one means for performing a method of any of aspects 24 through 30.

Aspect 53: A non-transitory computer-readable medium storing code for wireless communication at a first UE, the code comprising instructions executable by a processor to perform a method of any of aspects 24 through 30.

Aspect 54: An apparatus for wireless communication at a second base station, the apparatus comprising memory, a transceiver, and at least one processor coupled with the memory and the transceiver, the at least one processor configured to cause the apparatus to perform a method of any of aspects 31 through 37.

Aspect 55: An apparatus for wireless communication at a second base station, comprising at least one means for performing a method of any of aspects 31 through 37.

Aspect 56: A non-transitory computer-readable medium storing code for wireless communication at a second base station, the code comprising instructions executable by a processor to perform a method of any of aspects 31 through 37.

Aspect 57: An apparatus for wireless communication at a second base station, the apparatus comprising memory, a transceiver, and at least one processor coupled with the memory and the transceiver, the at least one processor configured to cause the apparatus to perform a method of any of aspects 38 through 41.

Aspect 58: An apparatus for wireless communication at a second base station, comprising at least one means for performing a method of any of aspects 38 through 41.

Aspect 59: A non-transitory computer-readable medium storing code for wireless communication at a second base station, the code comprising instructions executable by a processor to perform a method of any of aspects 38 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first base station, comprising:
   receiving, from a first user equipment (UE), first control signaling comprising one or more discontinuous reception configurations for the first UE, one or more additional discontinuous reception configurations for a second UE in wireless communication with the first UE, or both;
   transmitting, to the first UE based at least in part on the first control signaling, second control signaling comprising a downlink discontinuous reception configuration for the first UE, a sidelink discontinuous reception configuration for the second UE, or both, the second control signaling further comprising instructions for the first UE to forward the sidelink discontinuous reception configuration for the second UE to the second UE, wherein a first set of active durations associated with the downlink discontinuous reception configuration for the first UE at least partially overlap in a time domain with a second set of active durations associated with the sidelink discontinuous reception configuration for the second UE; and
   communicating with the first UE in accordance with the downlink discontinuous reception configuration at the first UE.

2. The method of claim 1, further comprising:
   receiving, from the first UE and based at least in part on the second control signaling, third control signaling comprising a sidelink discontinuous reception configuration for the first UE, wherein a third set of active durations associated with the sidelink discontinuous reception configuration for the first UE at least partially overlap in the time domain with the first and second sets of active durations.

3. The method of claim 1, further comprising:
   receiving, via the first control signaling, a downlink discontinuous reception configuration for the second UE; and
   determining the downlink discontinuous reception configuration for the first UE and the sidelink discontinuous reception configuration for the second UE such that the first set of active durations associated with the downlink discontinuous reception configuration for the first UE and the second set of active durations associated with the sidelink discontinuous reception configuration for the second UE at least partially overlap with the downlink discontinuous reception configuration for the second UE.

4. The method of claim 1, further comprising:
   communicating, with a second base station that is in wireless communication with the second UE, one or more parameters associated with the first base station, the second base station, UEs communicatively coupled with the first or second base stations, or any combination thereof; and
   determining that the first base station comprises a master base station based at least in part on the one or more parameters, wherein receiving the first control signaling, transmitting the second control signaling, or both, are based at least in part on the first base station comprising the master base station.

5. The method of claim 4, wherein the one or more parameters comprise one or more UE identifiers associated with one or more UEs in wireless communication with the first or second base stations, one or more quality of service requirements associated with the one or more UEs in wireless communication with the first or second base stations, one or more quantities of sidelink connections at the one or more UEs in wireless communication with the first or second base stations, one or more priorities associated with the one or more UEs communicatively coupled with the first or second base stations, one or more traffic loads at the first or second base stations, or any combination thereof.

6. The method of claim 1, further comprising:
receiving, from the first UE, an indication that the first base station comprises a master base station, wherein receiving the first control signaling, transmitting the second control signaling, or both, are based at least in part on the first base station comprising the master base station.

7. The method of claim 1, wherein the second control signaling further comprises:
instructions for the first UE to forward the downlink discontinuous reception configuration for the first UE to the second UE, a second base station in wireless communication with the second UE, or both.

8. A method for wireless communication at a first user equipment (UE), comprising:
receiving, from a first base station, first control signaling comprising a downlink discontinuous reception configuration for the first UE, a sidelink discontinuous reception configuration for a second UE in wireless communication with the first UE, or both, the first control signaling further comprising instructions for the first UE to forward the sidelink discontinuous reception configuration for the second UE to the second UE, wherein a first set of active durations associated with the downlink discontinuous reception configuration for the first UE at least partially overlap in a time domain with a second set of active durations associated with the sidelink discontinuous reception configuration for the second UE;
transmitting, to the second UE based at least in part on the first control signaling, sidelink signaling comprising the downlink discontinuous reception configuration for the first UE and the sidelink discontinuous reception configuration for the second UE; and
communicating with the first base station in accordance with the downlink discontinuous reception configuration at the first UE.

9. The method of claim 8, further comprising:
receiving, from the second UE, second sidelink signaling comprising one more discontinuous reception configurations for the second UE; and
transmitting, to the first base station based at least in part on the second sidelink signaling, second control signaling comprising the one or more discontinuous reception configurations for the second UE, one or more discontinuous reception configurations for the first UE, or both, wherein the first control signaling is received based at least in part on the second control signaling.

10. The method of claim 8, further comprising:
receiving, from the second UE and based at least in part on the sidelink signaling, second sidelink signaling comprising a sidelink discontinuous reception configuration for the first UE, wherein a third set of active durations associated with the sidelink discontinuous reception configuration for the first UE at least partially overlap in the time domain with the first and second sets of active durations; and
communicating with the second UE in accordance with the sidelink discontinuous reception configuration for the first UE.

11. The method of claim 10, further comprising:
transmitting, to the first base station and based at least in part on the second sidelink signaling, second control signaling comprising the sidelink discontinuous reception configuration for the first UE.

12. The method of claim 8, further comprising:
transmitting, via the sidelink signaling, an instruction for the second UE to relay the downlink discontinuous reception configuration for the first UE and the sidelink discontinuous reception configuration for the second UE to a second base station in wireless communication with the second UE.

13. The method of claim 8, further comprising:
communicating, with the second UE, one or more parameters associated with the first UE, the second UE, or both;
determining that the first base station comprises a master base station based at least in part on the one or more parameters; and
transmitting, to the first base station, second control signaling comprising an indication that the first base station comprises the master base station, wherein receiving the first control signaling is based at least in part on the second control signaling.

14. The method of claim 13, wherein the one or more parameters comprise a UE identifier associated with the first or second UE, a quality of service requirement associated with the first or second UE, a priority associated with the first or second UE, or any combination thereof.

15. A method for wireless communication at a first base station, comprising:
receiving, at the first base station, first control signaling comprising a first set of candidate downlink discontinuous reception configurations and a first set of candidate sidelink discontinuous reception configurations associated with a first user equipment (UE);
receiving, at the first base station via the first control signaling, second control signaling, or both, a second set of candidate downlink discontinuous reception configurations and a second set of candidate sidelink discontinuous reception configurations associated with a second UE;
selecting, by the first base station based at least in part on the first base station comprising a master base station, a first downlink discontinuous reception configuration and a first sidelink discontinuous reception configuration for the first UE from the first set of candidate downlink discontinuous reception configurations received by the first base station and the first set of candidate sidelink discontinuous reception configurations received by the first base station, respectively, based at least in part on the second set of candidate downlink discontinuous reception configurations and the second set of candidate sidelink discontinuous reception configurations;
selecting, by the first base station based at least in part on the first base station comprising the master base station, a second downlink discontinuous reception configuration and a second sidelink discontinuous reception configuration for the second UE from the second set of candidate downlink discontinuous reception configurations received by the first base station and the second set of candidate sidelink discontinuous reception configurations received by the first base station, respectively, based at least in part on the first set of candidate downlink discontinuous reception configurations and the first set of candidate sidelink discontinuous reception configurations, wherein active durations of the first and second downlink discontinuous reception configurations and the first and second sidelink discontinuous reception configurations at least partially overlap in a time domain;

transmitting, by the first base station based at least in part on the first base station comprising the master base station, third control signaling comprising the first downlink discontinuous reception configuration and the first sidelink discontinuous reception configuration for the first UE; and transmitting, by the first base station based at least in part on the first base station comprising the master base station, and via the third control signaling, fourth control signaling, or both, the second downlink discontinuous reception configuration and the second sidelink discontinuous reception configuration for the second UE.

16. The method of claim 15, further comprising:
receiving the first control signaling from a second base station in wireless communication with the first UE;
receiving the second control signaling from a third base station in wireless communication with the second UE;
transmitting the third control signaling to the second base station, wherein the third control signaling comprises instructions for the second base station to relay the first downlink discontinuous reception configuration and the first sidelink discontinuous reception configuration to the first UE; and
transmitting the fourth control signaling to the third base station, wherein the fourth control signaling comprises instructions for the third base station to relay the second downlink discontinuous reception configuration and the second sidelink discontinuous reception configuration to the second UE.

17. The method of claim 15, further comprising:
receiving the first control signaling from a second base station in wireless communication with the first UE; and
transmitting the third control signaling to the second base station, wherein the third control signaling comprises instructions for the second base station to relay the first downlink discontinuous reception configuration and the first sidelink discontinuous reception configuration to the first UE, and wherein the third control signaling further comprises instructions for the second base station to relay the second downlink discontinuous reception configuration and the second sidelink discontinuous reception configuration to the second UE.

18. The method of claim 15, further comprising:
receiving, via the first control signaling, a first set of parameters associated with existing sidelink connections at the first UE;
receiving, via the first control signaling, the second control signaling, or both, a second set of parameters associated with existing sidelink connections at the second UE; and
selecting the first sidelink discontinuous reception configuration, the second sidelink discontinuous reception configuration, the first downlink discontinuous reception configuration, the second downlink discontinuous reception configuration, or any combination thereof, based at least in part on the first set of parameters, the second set of parameters, or both.

19. The method of claim 18, wherein the first set of parameters, the second set of parameters, or both, comprise one or more UE identities associated with one or more UEs in wireless communication with the first or second UE, one or more pathloss metrics associated with wireless communications with the one or more UEs in wireless communication with the first or second UE, one or more existing sidelink discontinuous reception configurations associated with wireless communications with the one or more UEs in wireless communication with the first or second UE, one or more existing sidelink connections at the one or more UEs in wireless communication with the first or second UE, or any combination thereof.

20. The method of claim 15, wherein the first and second sidelink discontinuous reception configurations and the first and second downlink discontinuous reception configurations comprise connected mode discontinuous reception configurations, the method further comprising:
transmitting, via the third control signaling, a third downlink discontinuous reception configuration for the first UE; and
transmitting, via the third control signaling, the fourth control signaling, or both, a fourth downlink discontinuous reception configuration for the second UE, wherein the third and fourth downlink discontinuous reception configurations comprise inactive mode discontinuous reception configurations.

21. The method of claim 15, wherein the third downlink discontinuous reception configuration is selected from the first set of candidate downlink discontinuous reception configurations associated with the first UE, and wherein the fourth downlink discontinuous reception configuration is selected from the second set of candidate downlink discontinuous reception configurations associated with the second UE.

22. The method of claim 15, wherein:
the third downlink discontinuous reception configuration is based at least in part on the first downlink discontinuous reception configuration, the first sidelink discontinuous reception configuration, or both, and
the fourth downlink discontinuous reception configuration is based at least in part on the second downlink discontinuous reception configuration, the second sidelink discontinuous reception configuration, or both.

23. The method of claim 15, further comprising:
determining that the first base station comprises a master base station, wherein receiving the first control signaling, receiving the second control signaling, transmitting the third control signaling, transmitting the fourth control signaling, or any combination thereof, is based at least in part on the first UE comprising the master base station.

24. A method for wireless communication at a first user equipment (UE), comprising:
transmitting, to a first base station, first control signaling comprising a set of candidate downlink discontinuous reception configurations and a set of candidate sidelink discontinuous reception configurations associated with the first UE;
receiving, based at least in part on the first control signaling, second control signaling comprising a downlink discontinuous reception configuration for the first UE and a sidelink discontinuous reception configuration for a second UE in wireless communication with the first UE, wherein the downlink discontinuous reception configuration is included in the set of candidate downlink discontinuous reception configurations, and wherein the downlink discontinuous reception configuration and the sidelink discontinuous reception configuration are based at least in part on one or more candidate discontinuous reception configurations at the second UE, wherein active durations of the downlink discontinuous reception configuration of the first UE and the sidelink discontinuous reception configuration of the second UE at least partially overlap in a time domain; and communicating with a second base station in accordance with the downlink discontinuous reception configuration, the second base station different from the first base station.

25. The method of claim 24, further comprising:
transmitting, to the second UE, sidelink signaling comprising the sidelink discontinuous reception configuration for the second UE;

receiving, from the second UE, second sidelink signaling comprising an additional sidelink discontinuous reception configuration for the first UE; and communicating with the second UE in accordance with the sidelink discontinuous reception configuration for the second UE and in accordance with the additional sidelink discontinuous reception configuration for the first UE.

26. The method of claim 25, wherein the additional sidelink discontinuous reception configuration for the first UE is included in the set of candidate sidelink discontinuous reception configurations associated with the first UE.

27. The method of claim 24, wherein:
transmitting the first control signaling comprises transmitting the first control signaling via a downlink interface between the first UE and the first base station, transmitting the first control signaling to an additional wireless device for relay to the first base station, or both, and receiving the second control signaling comprises receiving the second control signaling via the downlink interface between the first UE and the first base station, receiving the second control signaling via a wireless connection between the first UE and the additional wireless device, or both.

28. The method of claim 24, further comprising:
transmitting, via the first control signaling, a set of parameters associated with existing sidelink connections at the first UE, wherein the downlink discontinuous reception configuration for the first UE, the sidelink discontinuous reception configuration for the second UE, or both, are based at least in part on the set of parameters.

29. The method of claim 28, wherein the set of parameters comprises one or more UE identities associated with one or more UEs in wireless communication with the first UE, one or more pathloss metrics associated with wireless communications with the one or more UEs in wireless communication with the first UE, one or more existing sidelink discontinuous reception configurations associated with wireless communications with the one or more UEs in wireless communication with the first UE, one or more existing sidelink connections at the one or more UEs in wireless communication with the first UE, or any combination thereof.

30. The method of claim 24, wherein the downlink discontinuous reception configuration comprises a connected mode discontinuous reception configuration, the method further comprising:
receiving, via the second control signaling, a second downlink discontinuous reception configuration for the first UE, the second downlink discontinuous reception configuration comprising an inactive mode discontinuous reception configuration, wherein the second downlink discontinuous reception configuration is based at least in part on the downlink discontinuous reception configuration.

* * * * *